US012724014B2

(12) United States Patent
Wolf et al.

(10) Patent No.: US 12,724,014 B2
(45) Date of Patent: Sep. 1, 2026

(54) QUANTITATIVE CHIRALITY AND CONCENTRATION SENSING OF CHIRAL ANALYTES USING A RELAY ASSAY

(71) Applicant: GEORGETOWN UNIVERSITY, Washington, DC (US)

(72) Inventors: Christian Wolf, Arlington, VA (US); Yushra F. Thanzeel, Washington, DC (US); Balaraman Kaluvu, Arlington, VA (US)

(73) Assignee: GEORGETOWN UNIVERSITY, Washington, DC (US)

( * ) Notice: Subject to any disclaimer, the term of this patent is extended or adjusted under 35 U.S.C. 154(b) by 783 days.

(21) Appl. No.: 17/923,446

(22) PCT Filed: Mar. 8, 2021

(86) PCT No.: PCT/US2021/021316

§ 371 (c)(1),
(2) Date: Nov. 4, 2022

(87) PCT Pub. No.: WO2021/225688

PCT Pub. Date: Nov. 11, 2021

(65) Prior Publication Data

US 2023/0194486 A1 Jun. 22, 2023

Related U.S. Application Data

(60) Provisional application No. 63/021,958, filed on May 8, 2020.

(51) Int. Cl.

| | |
|---|---|
| ***G01N 31/22*** | (2006.01) |
| *G01N 21/63* | (2006.01) |
| *G01N 21/64* | (2006.01) |

(52) U.S. Cl.
CPC ....... *G01N 31/22* (2013.01); *G01N 2021/634* (2013.01); *G01N 2021/6439* (2013.01)

(58) Field of Classification Search
CPC ............. G01N 31/22; G01N 2021/634; G01N 2021/6439
See application file for complete search history.

(56) References Cited

U.S. PATENT DOCUMENTS

| | | | |
|---|---|---|---|
| 2016/0039723 | A1 | 2/2016 | Wolf et al. |
| 2018/0292370 | A1 | 10/2018 | Wolf et al. |

FOREIGN PATENT DOCUMENTS

| | | | |
|---|---|---|---|
| WO | 2020/028396 | A1 | 2/2020 |
| WO | 2020/056012 | A1 | 3/2020 |

OTHER PUBLICATIONS

Quantitative Chiroptical Sensing of Free Amino Acids, Biothiols, Amines, and Amino Alcohols with an Aryl Fluoride Probe F. Yushra Thanzeel, Archita Sripada, Christian Wolf J. Am. Chem. Soc. 2019, 141, 16382-16387 (Year: 2019).*

(Continued)

*Primary Examiner* — Lyle Alexander
*Assistant Examiner* — Dwan A Gerido
(74) *Attorney, Agent, or Firm* — Troutman Pepper Locke LLP (Rochester)

(57) ABSTRACT

The present application relates to an analytical method that includes providing a sample potentially containing a chiral analyte that can exist in stereoisomeric forms, providing certain probes; and providing an indicator. The sample is contacted with an excess of the probe under conditions to permit irreversible covalent binding of the probe to the analyte, if present in the sample. The sample is contacted with the indicator under conditions to permit covalent binding of the indicator to any excess probe that is not bound to the analyte. Based on any binding that occurs between the analyte and probe, the absolute configuration of the analyte (Continued)

in the sample and/or the enantiomeric composition of the analyte in the sample using a chiroptical technique is/are determined. Based on any binding that occurs between the indicator and probe, the concentration of the analyte in the sample is determined using a non-chiroptical technique.

18 Claims, 34 Drawing Sheets

(56) References Cited

OTHER PUBLICATIONS

Determination of enantiomeric excess and concentration of chiral compounds using a 1,8-diheteroarylnaphthalene-derived fluorosensor Xuefeng Mei, Christian Wolf Tetrahedron Letters 47, 2006, 7901-7904 (Year: 2006).*
A dual chromophore sensor for the detection of amines, diols, hydroxy acids, and amino alcohols Mariia Pushina, Sepideh Farshbaf, Elena G. Shcherbakova, Pavel Anzenbacher Jr. Chem. Commun, 2019, 55, 4495 (Year: 2019).*
International Search Report and Written Opinion for Corresponding Application No. PCT/US2021/021316 (mailed May 19, 2021).
Herrera et al., "Optical Analysis of Reaction Yield and Enantiomeric Excess: A New Paradigm Ready for Prime Time," J. Am. Chem. Soc. 140(33):10385-10401 (2018).
Pilicer et al., "Biomimetic Chirality Sensing with Pyridoxal-5'-phosphate," J. Am. Chem. Soc. 139(5):1758-1761 (2017).

* cited by examiner

*Chiroptical concentration and er sensing*

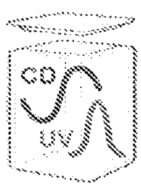

- On-the-fly sensing with CD/UV relay assay
- Determination of sample *er* and total concentration
- Broadly applicable, fast & accurate
- Sensing of alcohols, diols, hydroxy acids, amino alcohols, amines
- Stoichiometric (1:1) sensing, no analyte excess required
- Amenable to automation and HTS equipment

*Probe structures*

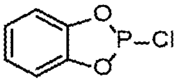 1

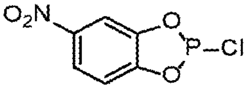 2

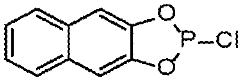 3

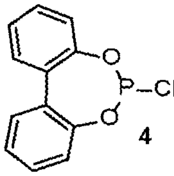 4

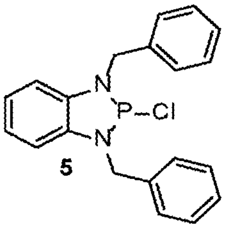 5

*Alcohols*

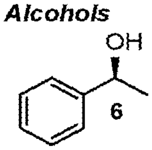 6

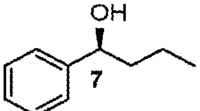 7

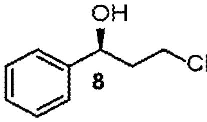 8

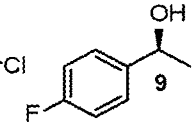 9

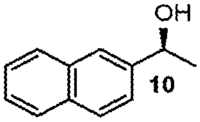 10

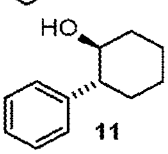 11

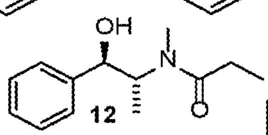 12

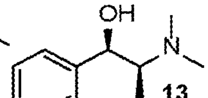 13

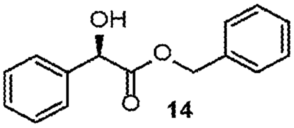 14

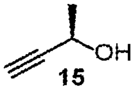 15

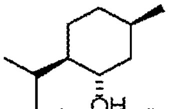 16 (menthol)

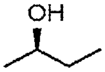 17

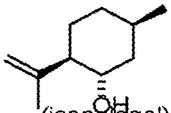 18 (isopulegol)

*Diols and α-hydroxy acids*

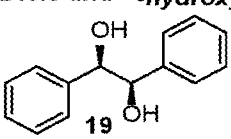 19

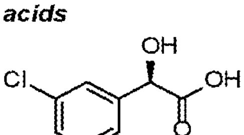 20

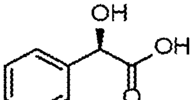 21

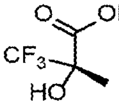 22

*Amino alcohols*

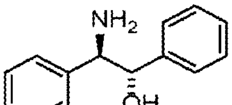 23

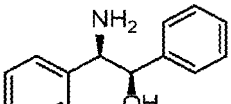 24

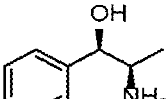 25

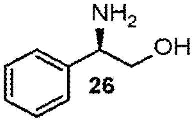 26

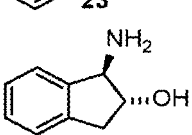 27

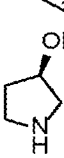 28

*Amines*

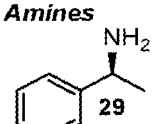 29

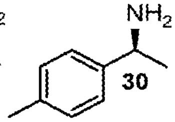 30

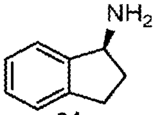 31

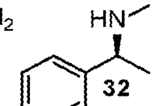 32

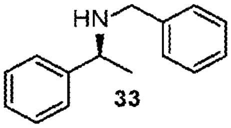 33

16 (menthol)

6

7

8

12

13

14

20

21

22

23

24

25

29

30

31

QUANTITATIVE CHIRALITY AND CONCENTRATION SENSING OF CHIRAL ANALYTES USING A RELAY ASSAY

This application is a national stage application under 35 U.S.C. § 371 of International Application No. PCT/US2021/021316, filed Mar. 8, 2021, which claims the priority benefit of U.S. Provisional Patent Application Ser. No. 63/021,958, filed May 8, 2020, which is hereby incorporated by reference in its entirety.

This invention was made with government support under grant number CHE-1764135 awarded by the National Science Foundation. The government has certain rights in the invention.

FIELD

The present application relates to an analytical method for the determination of the absolute configuration of an analyte in a sample, and/or the concentration of an analyte in a sample, and/or the enantiomeric composition of an analyte in a sample, based on chiroptical testing of a probe and indicator complex.

BACKGROUND

The introduction of high-throughput experimentation methodologies has greatly accelerated scientific discoveries and streamlined efforts in numerous academic and industrial laboratories aimed at solving complex chemical and biological tasks under strict time constraints (McNally et al., *Science* 334:1114-1117 (2011); Santanilla et al., *Science* 347:49-53 (2015); Collins et al., *Nat. Chem.* 6:859-871 (2014)). Despite the undisputable need for quantitative screening methods that can take full advantage of generally available multiwell plate technology with parallel data acquisition and processing capabilities it is still routine to analyze one sample at a time with serial techniques (Kotoni et al., *Anal. Chem.* 84:6805-6813 (2012); Barhate et al., *Chem. Commun.* 53:509 (2017); Yang et al., *ACS Cent. Sci.* 2:332-340 (2016); Storch et al., *Chem. Eur. J.* 23:5414 (2017); Luu et al., *Chem. Sci.* 9:5087-5099 (2018)). The shortage of experimental advances with these endeavors can at least be partially attributed to the difficulty with simultaneous determination of the concentration and enantiomeric ratio (er) of chiral samples, and these tasks are commonly accomplished separately by gravimetric analysis and chiral chromatography, respectively. Recent progress with chiroptical sensing technologies has shown that high-throughput screening of an increasing variety of chiral compounds is now possible (Leung et al., *Chem. Soc. Rev.* 41:448-479 (2012); Wolf et al., *Chem. Soc. Rev.* 42:5408-5424 (2013); Herrera et al., *J. Am. Chem. Soc.* 140:10385-10401 (2018)). The most impressive examples have been achieved with chiral amines, amino alcohols, amino acids, hydroxy acids and diols (Shabbir et al., *Proc. Natl. Acad. Sci. USA* 106:10487-10492 (2009); Nieto et al., *Chem. Eur. J.* 16:227-232 (2010); Bentley et al., *Nat. Commun.* 7:12539 (2016); Shcherbakova et al., *Chem. Eur. J.* 23:10222-10229 (2017); Bentley et al., *Science Advances* 2:e1501162 (2016); Biedermann et al., *Angew. Chem. Int. Ed.* 53:5694-5699 (2014); Feagin et al., *J. Am. Chem. Soc.* 137:4198-4206 (2015); De los Santos et al., *J. Am. Chem. Soc.* 138:13517-13520 (2016); Joyce et al., *Chem. Sci.* 5:2855-2861 (2014); Thanzeel et. al., *Nat. Comm.* 9:5323 (2018); Thanzeel et al., *C. J. Am. Chem. Soc.* 141:16382-16387 (2019); Shirbhate et al., *J. Am. Chem. Soc.* 142:4975-4979 (2020)). But with regard to other compound classes, for example mono-alcohols, chiroptical on-the-fly concentration and er determination needs to be demonstrated. In fact, stereochemical analysis of chiral mono-alcohols by NMR spectroscopy (Wolf et al., *Tetrahedron: Asymm.* 25:163-169 (2014); Yang et al., *ACS Cent. Sci.* 2:332-340 (2016); Bian et al., *Chem. Sci.* 7:932-938 (2016); Seo et al., *Chem. Commun.* 54:6804-6808 (2018)), mass spectrometry (Guo et al., *Angew. Chem. Int. Ed.* 38:1755-1758 (1999); Reetz et al., *Angew. Chem. Int. Ed.* 38:1758-1761 (1999); Markert et al., *Angew. Chem. Int. Ed.* 43:2498-2500 (2004); Markert et al., *J. Am. Chem. Soc.* 130:3234-3235 (2008); Piovesana et al., *Chem. Eur. J.* 19:11478-11494 (2013)) or optical methods (Kobayashi et al., *J. Am. Chem. Soc.* 115:2648-2654 (1993); Lintuluoto et al., *J. Am. Chem. Soc.* 124:13676-13677 (2002); Hayashi et al., *Chem. Commun.* 51:11068-11071 (2015); Shimo et al., *Chem. Eur. J.* 25:3790-3794 (2019); Madry et al., *ACS Omega* 4:3244-3256 (2019); You et al, *Nat. Chem.* 3:943-948 (2011); You et al., *J. Am. Chem. Soc.* 134:7117-7125 (2012); You et al., *J. Am. Chem. Soc.* 134:7126-7134 (2012); Ni et al., *Angew. Chem. Int. Ed.* 57:1300-1305 (2018); Jo et al., *J. Chem. Sci.* 6:6747-6753 (2015)) has remained challenging (Wolf, C., "Dynamic Stereochemistry of Chiral Compounds—Principles and Applications," *RSC Publishing*, Cambridge, UK, 136-179 (2008)).

The present application is directed to overcoming these and other deficiencies in the art.

SUMMARY

The present application relates to an analytical method that includes providing a sample potentially containing a chiral analyte that can exist in stereoisomeric forms, and providing a probe selected from the group consisting of aryl halophosphites, halodiazaphosphites, arylchlorophosphines and analogs thereof, dinitrofluoroarenes and analogs thereof, arylsulfonyl chlorides and analogs thereof, and coumarin-derived Michael acceptors; and providing an indicator. The sample is contacted with an excess of the probe under conditions to permit irreversible covalent binding of the probe to the analyte, if present in the sample. The sample is also contacted with the indicator under conditions to permit covalent binding of the indicator to any excess probe that is not bound to the analyte. Based on any binding that occurs between the analyte and probe, the absolute configuration of the analyte in the sample and/or the enantiomeric composition of the analyte in the sample using a chiroptical technique is/are determined. Based on any binding that occurs between the indicator and probe, the concentration of the analyte in the sample is determined using a non-chiroptical technique.

Analytical methods that allow simultaneous determination of the concentration and enantiomeric composition/analyte configuration of small sample amounts and are also compatible with high-throughput multi-well plate technology have received increasing attention in recent years. This application introduces a new class of broadly useful small-molecule probes and a relay sensing strategy that together accomplish these tasks with five classes of compounds including the challenging group of mono-alcohols—a scope that stands out among previously reported UV, fluorescence and CD assays. Several chlorophosphite probes and aniline indicators have been evaluated and used for on-the-fly CD/UV sensing following a continuous workflow. The wide application range of the readily available sensors is highlighted with almost 30 alcohols, diols, hydroxy acids, amines and amino alcohols, and the accuracy of the stereochemical analysis is showcased with samples covering a wide range of concentrations and enantiomeric ratios.

The optical sensors disclosed herein are broadly useful, fast, and allow for a continuous workflow. Compared to existing technology like NMR spectroscopy and chiral HPLC, the chiroptical sensing technology of the present application is faster and enables parallel analysis of a large number of samples. This is of interest to the pharmaceutical industry where fast methodology development with chiral compounds is essential.

BRIEF DESCRIPTION OF THE DRAWINGS

FIG. 16 shows the structure of chlorophosphite probes 1-5 and chiral alcohol, diol, hydroxy acid, amino alcohol and amine target compounds 6-33. Only one enantiomer is shown.

DETAILED DESCRIPTION

Figure 1:
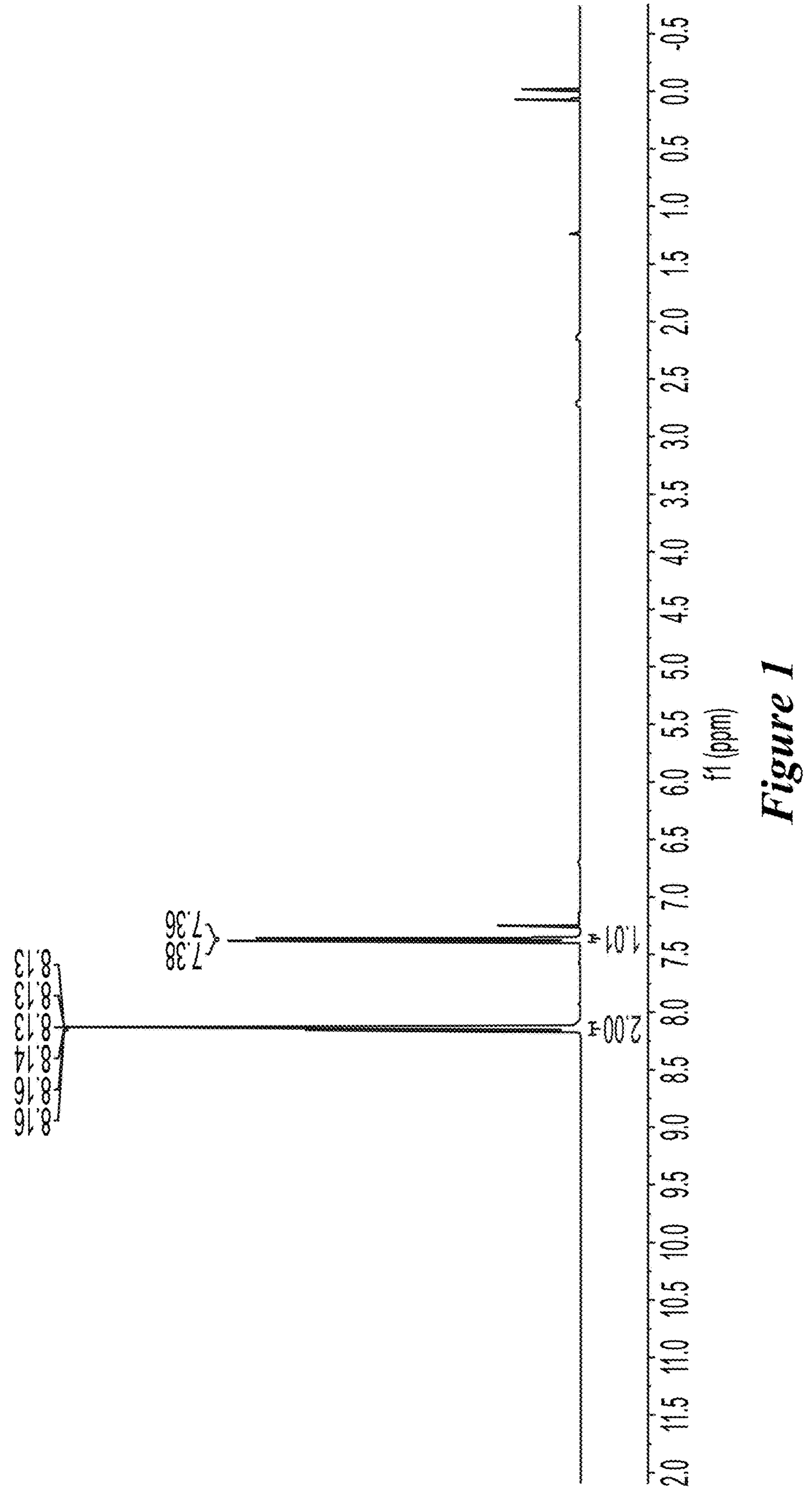
FIG. 1 is the $^{1}$H nuclear magnetic resonance (NMR) spectrum of 2-chloro-5-nitrobenzo[d][1,3,2]dioxaphosphole (2).

The present application relates to an analytical method that includes providing a sample potentially containing a chiral analyte that can exist in stereoisomeric forms, and providing a probe selected from the group consisting of aryl halophosphites, halodiazaphosphites, arylchlorophosphines and analogs thereof, dinitrofluoroarenes and analogs thereof, arylsulfonyl chlorides and analogs thereof, and coumarin-derived Michael acceptors; and providing an indicator. The sample is contacted with an excess of the probe under conditions to permit irreversible covalent binding of the probe to the analyte, if present in the sample. The sample is also contacted with the indicator under conditions to permit covalent binding of the indicator to any excess probe that is not bound to the analyte. Based on any binding that occurs between the analyte and probe, the absolute configuration of the analyte in the sample and/or the enantiomeric composition of the analyte in the sample using a chiroptical technique is/are determined. Based on any binding that occurs between the indicator and probe, the concentration of the analyte in the sample is determined using a non-chiroptical technique.

Analytes

The analytical methods described herein may be used to evaluate a wide range of chiral analytes. The analyte is one that can exist in stereoisomeric forms. This includes enantiomers, diastereomers, and a combination thereof.

In at least one embodiment the analyte is selected from the group consisting of primary amines, secondary amines, amino alcohols, alcohols, diols, carboxylic acids, hydroxy acids, amino acids, thiols, amides, and combinations thereof.

In at least one embodiment the analyte has a low nucleophilicity. Analytes with low nucleophilicity include, for example, alcohols. In at least one embodiment, the analyte is a mono-alcohol.

Probes

The probes of the present application include aryl halophosphites, halodiazaphosphites, arylchlorophosphines and analogs thereof, dinitrofluoroarenes and analogs thereof, arylsulfonyl chlorides and analogs thereof, and coumarin-derived Michael acceptors. Suitable examples include those described in WO2020/028396 to Wolf et al., which is hereby incorporated by reference in its entirety.

In at least one embodiment the probe is an aryl halophosphite of Formula I:

I

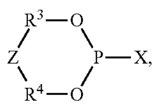

wherein X is a halogen; and (i) wherein:

$R^3$ and $R^4$ are each independently an aryl or heteroaryl, wherein the aryl or heteroaryl is optionally substituted with one or more groups selected from -alkyl, —O-alkyl, —N-alkyl, -alkenyl, -alkynyl, —O-aryl, —O-perfluoroaryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —$NR_c$C(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl; and Z is selected from the group consisting of a bond, —C(O)—, —O—, —$NR_d$—, —S—, and —$CH_2$—, wherein $R_d$ is H, alkyl, aryl, or heteroaryl; or (ii) wherein:

$R^3$ and $R^4$, together with the carbon atoms to which they are attached, form a monocyclic or bicyclic ring system selected from the group consisting of cycloalkyl, heterocycloalkyl, aryl, and heteroaryl, wherein the ring system is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —$NR_c$C(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl; and Z is absent.

In at least one embodiment the probe is an aryl halodiazaphosphite of Formula II:

II

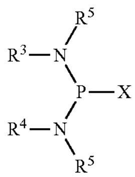

wherein:

X is a halogen;

$R^3$ and $R^4$:

(i) are each independently -aryl or -heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —$NR_c$C(O)$R_c$, —$NO_2$, —CN, -halogen, and —$SO_2$Re; wherein each $R_c$ is independently Ar, alkyl, or $CH_2$Ar, and wherein Ar is an aryl or heteroaryl; or (ii) together with the carbon atoms to which they are attached, form a monocyclic or bicyclic ring system selected from the group consisting of cycloalkyl, heterocycloalkyl, aryl, and heteroaryl, wherein the ring system is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —$NR_c$C(O)$R_c$, —$NO_2$, —CN, -halogen, and —$SO_2$Re; wherein each Re is independently Ar, alkyl, or $CH_2$Ar, and wherein Ar is an aryl or heteroaryl;

and each $R^5$ is independently selected from -alkyl, -aryl, —$CH_2$-aryl, —$CH_2$-heteroaryl, -cycloalkyl, -heterocycloalkyl, and -heteroaryl, wherein the alkyl, aryl, $CH_2$-aryl, $CH_2$-heteroaryl, cycloalkyl, heterocycloalkyl, or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —$NR_c$C(O)$R_c$, —$NO_2$, —CN, -halogen, and —$SO_2R_c$; wherein each Re is independently Ar, alkyl, or $CH_2$Ar, and wherein Ar is an aryl or heteroaryl.

In at least one embodiment the probe is an arylchlorophosphine or analog thereof of Formula III:

III

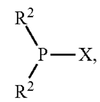

wherein:

X is selected from the group consisting of -halogen, —O-aryl, —O-heteroaryl, —O-cycloalkyl, —O-heterocycloalkyl, —O-alkyl, —O-perfluoroalkyl, and —O-perfluoroaryl; and each $R^2$ is independently an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —$NR_c$C(O)$R_c$, —$NO_2$, —CN, -halogen, and —$SO_2R_c$; wherein each Re is independently Ar, alkyl, or $CH_2$Ar, and wherein Ar is an aryl or heteroaryl.

An analog of an arylchlorophosphine is an arylchlorophosphine in which the chlorine atom has been replaced with another halogen or with —O-aryl, —O-perfluoroaryl, —O-heteroaryl, —O-cycloalkyl, —O-heterocycloalkyl, —O-alkyl, or —O-perfluoroalkyl.

In at least one embodiment the probe is a dinitrofluoroarene or analog thereof of Formula IV:

IV

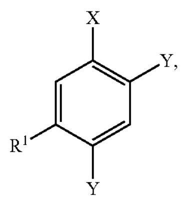

wherein:

each Y is independently selected from the group consisting of —$NO_2$, —CN, —C(O)$R_a$, and —$SO_2R_a$; wherein each $R_a$ is independently selected from the group consisting of —H, -alkyl, —O-alkyl, —N-alkyl, -alkenyl, -alkynyl, -perfluoroalkyl, -aryl, -perfluoroaryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl;

X is a leaving group selected from halogen, —$OR_b$, —OC(O)$R_b$, —OS$(O)_2R_b$, —S$(O)_2$—O—$R_b$, —$N_2^+$, —$N^+(R_b)_3$, —$S^+(R_b)_2$, and —$P^+(R_b)_3$; wherein each $R_b$ is independently selected from the group consisting of -alkyl, —O-alkyl, —N-alkyl, -alkenyl, -alkynyl, -perfluoroalkyl, -perfluoroalkenyl, -perfluoroalkynyl, -aryl, -perfluoroaryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl; and $R^1$ is selected from the group consisting of —$NH_2$, —NHC(O)$CH_2$Ar, —NHC(O)Ar, -hydrogen, -alkyl, —O-alkyl, —N-alkyl, -alkenyl, -alkynyl, -aryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, —N-heterocycloalkyl, —CN, —C(O)$R_c$, —$CO_2R_c$, —$SO_2R_c$, —C(O)NH$R_c$, —S-alkyl, —S-aryl, and —S-heteroaryl; wherein each $R_c$ is independently —Ar, -alkyl, or —$CH_2$Ar; and wherein each Ar is independently an aryl, heteroaryl, cycloalkyl, heterocycloalkyl, perfluoroalkyl, or perfluoroaryl.

An analog of a dinitrofluoroarene is a dinitrofluoroarene in which the fluorine atom has been replaced with a different leaving group.

In at least one embodiment the probe is a arylsulfonyl chloride or analog thereof of Formula V:

V

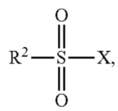

wherein:

X is selected from the group consisting of -halogen, —O-aryl, —O-heteroaryl, —O-cycloalkyl, —O-heterocycloalkyl, —O-alkyl, —O-perfluoroalkyl, —O-perfluoroaryl, —N-aryl, —N-heteroaryl, —N-cycloalkyl, —N-heterocycloalkyl, —N-alkyl, —N-perfluoroalkyl, —N-perfluoroaryl, —N(Ar)$SO_2$Ar, —NH$SO_2$Ar, and —NHAr; wherein Ar is an aryl or heteroaryl; and $R^2$ is an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —N$R_c$C(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl.

An analog of an arylsulfonyl chloride is an arylsulfonyl chloride in which the chlorine atom has been replaced with another halogen or with —O-aryl, —O-perfluoroaryl, —O-heteroaryl, —O-cycloalkyl, —O-heterocycloalkyl, —O-alkyl, or —O-perfluoroalkyl.

In at least one embodiment the probe is a coumarin-derived Michael acceptor of Formula VI:

VI

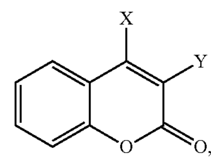

wherein:

Y is hydrogen or an electron withdrawing group selected from the group consisting of —$CF_3$, —C(O)$R_a$, —$SO_2R_a$, —CN, and —$NO_2$; wherein each $R_a$ is independently selected from the group consisting of —H, -alkyl, —O-alkyl, —N-alkyl, -alkenyl, -alkynyl, -aryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl; and X is a leaving group selected from halogen, —$OR_b$, —OC(O)$R_b$, —OS$(O)_2R_b$, —S$(O)_2$—O—$R_b$, —$N_2^+$, —$N^+(R_b)_3$, —$S^+(R_b)_2$, and —$P^+(R_b)_3$; wherein each $R_b$ is independently selected from the group consisting of -alkyl, —O-alkyl, —N-alkyl, -alkenyl, -alkynyl, -perfluoroalkyl, -perfluoroalkenyl, -perfluoroalkynyl, -aryl, -perfluoroaryl, —O-aryl, —N-aryl, —O-perfluoroaryl, —N-perfluoroaryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl.

Y in Formula VI above is hydrogen or an electron withdrawing group. The term "electron withdrawing group" is art-recognized, and generally refers to the tendency of a substituent to attract valence electrons from neighboring atoms, i.e., the substituent is electronegative with respect to neighboring atoms. Examples of electron withdrawing groups include, but are not limited to, halogenated alkyl groups such as trifluoromethyl, acyl, formyl, sulfonyl, sulfonium, sulfate, nitrile, halide, any electron deficient ring as compared to benzene (e.g. a benzene ring with an electron withdrawing group attached to the ring or a nitrogen containing aromatic ring, etc.), or the like. Other non-limiting examples of electron withdrawing groups include esters, perhalogenated alkyls, perhalogenated aryls, nitriles, electron deficient heteroaryls, perfluorinated alkyls, or the like. Non-limiting examples of perfluorinated alkyls include perfluorinated $C_1$-$C_{12}$ alkyls; specific examples include —$CF_3$, —$C_2F_5$, —$C_3F_7$, —$C_4F_9$, —$C_5F_{11}$, —$C_6F_{13}$, —$C_7F_{15}$, —$C_8F_{17}$, —$C_9F_{19}$, —$C_{10}F_{21}$, —$C_{11}F_{23}$, etc.

X in Formula VI above is a leaving group. Suitable leaving groups are substituents that are present on the compound that can be displaced. Suitable leaving groups are apparent to a skilled artisan. Preferably, X is a halogen or $—OS(O)_2R_b$, wherein $R_b$ is as defined above.

Indicators

The indicators used in the present application allow for the determination of the concentration of the analyte in the sample through the use of non-chiroptical spectroscopic methods. Ideally, the indicator reacts quickly with the probe and possesses a functionality that allows for the use of non-chiroptical spectroscopic sensing methods.

In at least one embodiment the indicator has the formula A-B, where A is a nucleophile and B is a non-chiroptical signaling moiety.

The reaction between the probe and the indicator to form a probe-indicator complex can be accomplished through the formation of a covalent bond. The indicator's reactivity with the probe is based on the nucleophilicity of the indicator. As will be apparent to the skilled artisan, a suitable nucleophile can be selected for a given probe/indicator/analyte combination by considering the relative affinity of the nucleophile for the probe as compared to the affinity of the probe for the analyte. In general, the indicator has a nucleophilic group that is strong enough to form a covalent bond with any excess probe, but not so strong as to disrupt any probe-analyte complexes that have already formed (e.g., when the indicator is added after the analyte) or to prevent any probe-analyte complexes from forming (e.g., when the indicator is added first or together with the analyte). Nucleophiles are well known in the art and their selection is within the ordinary skill of one in the art. In some examples, the nucleophilic group of the indicator is an alcohol or an amine moiety.

In at least one embodiment A is a nucleophile selected from the group consisting of —OH, $—NH_2$, and $—NHR^1$;

wherein $R^1$ is H, $C_{1-6}$-alkyl, cycloalkyl, $—(CH_2)_nAr$, or $—CHAr_2$;

wherein:

Ar is an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, $—C(O)R_c$, $—CO_2R_c$, $—O—C(O)R_c$, $—NHC(O)R_c$, $—NR_cC(O)R_c$, $—NO_2$, —CN, -halogen, and $—SO_2R_c$; wherein each Re is independently Ar, alkyl, or $CH_2Ar$, and wherein Ar is an aryl or heteroaryl; and n is an integer from 1-4; and B is a non-chiroptical signaling moiety selected from the group consisting of $—(CH_2)_nAr'$ and $—CHAr'_2$;

wherein:

Ar' is an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, $—C(O)R_c$, $—CO_2R_c$, $—O—C(O)R_c$, $—NHC(O)R_c$, $—NR_cC(O)R_c$, $—NO_2$, —CN, -halogen, and $—SO_2R_c$; wherein each Re is independently Ar, alkyl, or $CH_2Ar$, and wherein Ar is an aryl or heteroaryl; and n is an integer from 0-4.

The non-chiroptical spectroscopic activity of the indicators can be accomplished through a non-chiroptical signaling moiety, such as a UV/Vis chromophore or fluorophore on the indicator, which will be apparent to those of ordinary skill in the art. The non-chiroptical signaling moiety is generally aromatic or possesses an extended conjugated pi system. Such signaling moieties are well known in the art and their selection is within the ordinary skill of one in the art.

A UV chromophore shows a good absorption behavior in the spectral range of the UV rays or preferably an absorption maximum above 250 nm. The chromophore absorbs the energy of the ultraviolet light and preferably does not change chemically as a result. The energy can be released as heat or phosphorescence/fluorescence. Visible chromophores include compounds with absorption from about 380 nm to 740 nm, which absorb light in the visible spectrum. UV/Vis chromophores have a conjugated pi system, such as those found in aromatic compounds.

A fluorophore refers to a molecule or a functional group in a molecule that absorbs energy of a specific wavelength and re-emits energy at a different wavelength. Fluorescence of organic molecules is closely associated with delocalized electronic structure, such as seen in extended conjugated $\pi$ systems, which absorb UV or visible light (Fu et al., "Small-Molecule Fluorescent Probes and Their Design," *RSC Adv.* 8:29051-61 (2018), which is hereby incorporated by reference in its entirety). Absorbance of light by a conjugated $\pi$ system result when the energy of incoming UV and/or visible light matches the electronic gap between the bonding to non-bonding electronic orbital levels ($\pi/\pi^*$) (id.). This allows for the excitation of an electron to a higher energy orbital. Fluorescence is the emission of a photon of energy from the relaxation of the excited electron (id.). Because the excitation and emission wavelengths are different, emission intensity can be measured with little interference from the incoming excitation light (id.). Exemplary fluorophore moieties that may be useful in the present application are disclosed in U.S. Patent Publication No. 2016/0033521 to Higgs, U.S. Pat. No. 7,381,818 to Lokhov et al., and U.S. Pat. No. 6,766,183 to Walsh et al., each of which is hereby incorporated by reference in its entirety.

Chemical Formulae

As used herein, the term "alkyl" refers to a straight or branched, saturated aliphatic radical containing one to about twenty (e.g., 1, 2, 3, 4, 5, 6, 7, 8, 9, 10, 11, 12, 13, 14, 15, 16, 17, 18, 19, 20, 1-2, 1-3, 1-4, 1-5, 1-6, 1-7, 1-8, 1-9, 1-10, 1-11, 1-12, 1-13, 1-14, 1-15, 1-16, 1-17, 1-18, 1-19, 1-20, 2-3, 2-4, 2-5, 2-6, 2-7, 2-8, 2-9, 2-10, 2-11, 2-12, 2-13, 2-14, 2-15, 2-16, 2-17, 2-18, 2-19, 2-20, 3-4, 3-5, 3-6, 3-7, 3-8, 3-9, 3-10, 3-11, 3-12, 3-13, 3-14, 3-15, 3-16, 3-17, 3-18, 3-19, 3-20, 4-5, 4-6, 4-7, 4-8, 4-9, 4-10, 4-11, 4-12, 4-13, 4-14, 4-15, 4-16, 4-17, 4-18, 4-19, 4-20, 5-6, 5-7, 5-8, 5-9, 5-10, 5-11, 5-12, 5-13, 5-14, 5-15, 5-16, 5-17, 5-18, 5-19, 5-20, 6-7, 6-8, 6-9, 6-10, 6-11, 6-12, 6-13, 6-14, 6-15, 6-16, 6-17, 6-18, 6-19, 6-20, 7-8, 7-9, 7-10, 7-11, 7-12, 7-13, 7-14, 7-15, 7-16, 7-17, 7-18, 7-19, 7-20, 8-9, 8-10, 8-11, 8-12, 8-13, 8-14, 8-15, 8-16, 8-17, 8-18, 8-19, 8-20, 9-10, 9-11, 9-12, 9-13, 9-14, 9-15, 9-16, 9-17, 9-18, 9-19, 9-20, 10-11, 10-12, 10-13, 10-14, 10-15, 10-16, 10-17, 10-18, 10-19, 10-20, 11-12, 11-13, 11-14, 11-15, 11-16, 11-17, 11-18, 11-19, 11-20, 12-13, 12-14, 12-15, 12-16, 12-17, 12-18, 12-19, 12-20, 13-14, 13-15, 13-16, 13-17, 13-18, 13-19, 13-20, 14-15, 14-16, 14-17, 14-18, 14-19, 14-20, 15-16, 15-17, 15-18, 15-19, 15-20, 16-17, 16-18, 16-19, 16-20, 17-18, 17-19, 17-20, 18-19, 18-20, 19-20) carbon atoms and, unless otherwise indicated, may be optionally substituted. In at least one embodiment, the alkyl is a $C_1$-$C_{10}$ alkyl. In at least one embodiment, the alkyl is a $C_1$-$C_6$ alkyl. Suitable examples include, without limitation, methyl, ethyl, propyl, isopropyl, butyl, sec-butyl, isobutyl, tert-butyl, 3-pentyl, and the like.

As used herein, the term "alkenyl" refers to a straight or branched aliphatic unsaturated hydrocarbon of formula $C_nH_{2n}$ having from two to about twenty (e.g., 2, 3, 4, 5, 6, 7, 8, 9, 10, 11, 12, 13, 14, 15, 16, 17, 18, 19, 20, 2-3, 2-4, 2-5, 2-6, 2-7, 2-8, 2-9, 2-10, 2-11, 2-12, 2-13, 2-14, 2-15, 2-16, 2-17, 2-18, 2-19, 2-20, 3-4, 3-5, 3-6, 3-7, 3-8, 3-9, 3-10, 3-11, 3-12, 3-13, 3-14, 3-15, 3-16, 3-17, 3-18, 3-19, 3-20, 4-5, 4-6, 4-7, 4-8, 4-9, 4-10, 4-11, 4-12, 4-13, 4-14, 4-15, 4-16, 4-17, 4-18, 4-19, 4-20, 5-6, 5-7, 5-8, 5-9, 5-10, 5-11, 5-12, 5-13, 5-14, 5-15, 5-16, 5-17, 5-18, 5-19, 5-20, 6-7, 6-8, 6-9, 6-10, 6-11, 6-12, 6-13, 6-14, 6-15, 6-16, 6-17, 6-18, 6-19, 6-20, 7-8, 7-9, 7-10, 7-11, 7-12, 7-13, 7-14, 7-15, 7-16, 7-17, 7-18, 7-19, 7-20, 8-9, 8-10, 8-11, 8-12, 8-13, 8-14, 8-15, 8-16, 8-17, 8-18, 8-19, 8-20, 9-10, 9-11, 9-12, 9-13, 9-14, 9-15, 9-16, 9-17, 9-18, 9-19, 9-20, 10-11, 10-12, 10-13, 10-14, 10-15, 10-16, 10-17, 10-18, 10-19, 10-20, 11-12, 11-13, 11-14, 11-15, 11-16, 11-17, 11-18, 11-19, 11-20, 12-13, 12-14, 12-15, 12-16, 12-17, 12-18, 12-19, 12-20, 13-14, 13-15, 13-16, 13-17, 13-18, 13-19, 13-20, 14-15, 14-16, 14-17, 14-18, 14-19, 14-20, 15-16, 15-17, 15-18, 15-19, 15-20, 16-17, 16-18, 16-19, 16-20, 17-18, 17-19, 17-20, 18-19, 18-20, 19-20) carbon atoms in the chain and, unless otherwise indicated, may be optionally substituted. Exemplary alkenyls include, without limitation, ethylenyl, propylenyl, n-butylenyl, and i-butylenyl.

As used herein, the term "alkynyl" refers to a straight or branched aliphatic unsaturated hydrocarbon of formula $C_nH_{2n-2}$ having from two to about twenty (e.g., 2, 3, 4, 5, 6, 7, 8, 9, 10, 11, 12, 13, 14, 15, 16, 17, 18, 19, 20, 2-3, 2-4, 2-5, 2-6, 2-7, 2-8, 2-9, 2-10, 2-11, 2-12, 2-13, 2-14, 2-15, 2-16, 2-17, 2-18, 2-19, 2-20, 3-4, 3-5, 3-6, 3-7, 3-8, 3-9, 3-10, 3-11, 3-12, 3-13, 3-14, 3-15, 3-16, 3-17, 3-18, 3-19, 3-20, 4-5, 4-6, 4-7, 4-8, 4-9, 4-10, 4-11, 4-12, 4-13, 4-14, 4-15, 4-16, 4-17, 4-18, 4-19, 4-20, 5-6, 5-7, 5-8, 5-9, 5-10, 5-11, 5-12, 5-13, 5-14, 5-15, 5-16, 5-17, 5-18, 5-19, 5-20, 6-7, 6-8, 6-9, 6-10, 6-11, 6-12, 6-13, 6-14, 6-15, 6-16, 6-17, 6-18, 6-19, 6-20, 7-8, 7-9, 7-10, 7-11, 7-12, 7-13, 7-14, 7-15, 7-16, 7-17, 7-18, 7-19, 7-20, 8-9, 8-10, 8-11, 8-12, 8-13, 8-14, 8-15, 8-16, 8-17, 8-18, 8-19, 8-20, 9-10, 9-11, 9-12, 9-13, 9-14, 9-15, 9-16, 9-17, 9-18, 9-19, 9-20, 10-11, 10-12, 10-13, 10-14, 10-15, 10-16, 10-17, 10-18, 10-19, 10-20, 11-12, 11-13, 11-14, 11-15, 11-16, 11-17, 11-18, 11-19, 11-20, 12-13, 12-14, 12-15, 12-16, 12-17, 12-18, 12-19, 12-20, 13-14, 13-15, 13-16, 13-17, 13-18, 13-19, 13-20, 14-15, 14-16, 14-17, 14-18, 14-19, 14-20, 15-16, 15-17, 15-18, 15-19, 15-20, 16-17, 16-18, 16-19, 16-20, 17-18, 17-19, 17-20, 18-19, 18-20, 19-20) carbon atoms in the chain and, unless otherwise indicated, may be optionally substituted. Exemplary alkynyls include acetylenyl, propynyl, butynyl, 2-butynyl, 3-methylbutynyl, and pentynyl.

As used herein, the term "cycloalkyl" refers to a non-aromatic saturated or unsaturated monocyclic or polycyclic (e.g., bicyclyic, tricyclic, tetracyclic) ring system which may contain 3 to 24 (3, 4, 5, 6, 7, 8, 9, 10, 11, 12, 13, 14, 15, 16, 17, 18, 19, 20, 21, 22, 23, 24, 3-4, 3-5, 3-6, 3-7, 3-8, 3-9, 3-10, 3-11, 3-12, 3-13, 3-14, 3-15, 3-16, 3-17, 3-18, 3-19, 3-20, 3-21, 3-22, 3-23, 3-24, 4-5, 4-6, 4-7, 4-8, 4-9, 4-10, 4-11, 4-12, 4-13, 4-14, 4-15, 4-16, 4-17, 4-18, 4-19, 4-20, 4-21, 4-22, 4-23, 4-24, 5-6, 5-7, 5-8, 5-9, 5-10, 5-11, 5-12, 5-13, 5-14, 5-15, 5-16, 5-17, 5-18, 5-19, 5-20, 5-21, 5-22, 5-23, 5-24, 6-7, 6-8, 6-9, 6-10, 6-11, 6-12, 6-13, 6-14, 6-15, 6-16, 6-17, 6-18, 6-19, 6-20, 6-21, 6-22, 6-23, 6-24, 7-8, 7-9, 7-10, 7-11, 7-12, 7-13, 7-14, 7-15, 7-16, 7-17, 7-18, 7-19, 7-20, 7-21, 7-22, 7-23, 7-24, 8-9, 8-10, 8-11, 8-12, 8-13, 8-14, 8-15, 8-16, 8-17, 8-18, 8-19, 8-20, 8-21, 8-22, 8-23, 8-24, 9-10, 9-11, 9-12, 9-13, 9-14, 9-15, 9-16, 9-17, 9-18, 9-19, 9-20, 9-21, 9-22, 9-23, 9-24, 10-11, 10-12, 10-13, 10-14, 10-15, 10-16, 10-17, 10-18, 10-19, 10-20, 10-21, 10-22, 10-23, 10-24, 11-12, 11-13, 11-14, 11-15, 11-16, 11-17, 11-18, 11-19, 11-20, 11-21, 11-22, 11-23, 11-24, 12-13, 12-14, 12-15, 12-16, 12-17, 12-18, 12-19, 12-20, 12-21, 12-22, 12-23, 12-24, 13-14, 13-15, 13-16, 13-17, 13-18, 13-19, 13-20, 13-21, 13-22, 13-23, 13-24, 14-15, 14-16, 14-17, 14-18, 14-19, 14-20, 14-21, 14-22, 14-23, 14-24, 15-16, 15-17, 15-18, 15-19, 15-20, 15-21, 15-22, 15-23, 15-24, 16-17, 16-18, 16-19, 16-20, 16-21, 16-22, 16-23, 16-24, 17-18, 17-19, 17-20, 17-21, 17-22, 17-23, 17-24, 18-19, 18-20, 18-21, 18-22, 18-23, 18-24, 19-20, 19-21, 19-22, 19-23, 19-24, 20-21, 20-22, 20-23, 20-24, 21-22, 22-23, 22-24, 23-24) carbon atoms, which may include at least one double bond and, unless otherwise indicated, the ring system may be optionally substituted. Exemplary cycloalkyl groups include, without limitation, cyclopropyl, cyclobutyl, cyclopentyl, cyclohexyl, cyclopropenyl, cyclobutenyl, cyclopentenyl, cyclohexenyl, anti-bicyclopropane, and syn-bicyclopropane.

As used herein, the term "heterocycloalkyl" refers to a cycloalkyl group as defined above having at least one O, S, and/or N interrupting the carbocyclic ring structure. Examples of heterocycloalkyls include, without limitation, piperidine, piperazine, morpholine, thiomorpholine, pyrrolidine, tetrahydrofuran, pyran, tetrahydropyran, and oxetane. Unless otherwise indicated, the heterocycloalkyl ring system may be optionally substituted.

As used herein, the term "aryl" refers to an aromatic monocyclic or polycyclic (e.g., bicyclyic, tricyclic, tetracyclic) ring system from 6 to 24 (6, 7, 8, 9, 10, 11, 12, 13, 14, 15, 16, 17, 18, 19, 20, 21, 22, 23, 24, 6-7, 6-8, 6-9, 6-10, 6-11, 6-12, 6-13, 6-14, 6-15, 6-16, 6-17, 6-18, 6-19, 6-20, 6-21, 6-22, 6-23, 6-24, 7-8, 7-9, 7-10, 7-11, 7-12, 7-13, 7-14, 7-15, 7-16, 7-17, 7-18, 7-19, 7-20, 7-21, 7-22, 7-23, 7-24, 8-9, 8-10, 8-11, 8-12, 8-13, 8-14, 8-15, 8-16, 8-17, 8-18, 8-19, 8-20, 8-21, 8-22, 8-23, 8-24, 9-10, 9-11, 9-12, 9-13, 9-14, 9-15, 9-16, 9-17, 9-18, 9-19, 9-20, 9-21, 9-22, 9-23, 9-24, 10-11, 10-12, 10-13, 10-14, 10-15, 10-16, 10-17, 10-18, 10-19, 10-20, 10-21, 10-22, 10-23, 10-24, 11-12, 11-13, 11-14, 11-15, 11-16, 11-17, 11-18, 11-19, 11-20, 11-21, 11-22, 11-23, 11-24, 12-13, 12-14, 12-15, 12-16, 12-17, 12-18, 12-19, 12-20, 12-21, 12-22, 12-23, 12-24, 13-14, 13-15, 13-16, 13-17, 13-18, 13-19, 13-20, 13-21, 13-22, 13-23, 13-24, 14-15, 14-16, 14-17, 14-18, 14-19, 14-20, 14-21, 14-22, 14-23, 14-24, 15-16, 15-17, 15-18, 15-19, 15-20, 15-21, 15-22, 15-23, 15-24, 16-17, 16-18, 16-19, 16-20, 16-21, 16-22, 16-23, 16-24, 17-18, 17-19, 17-20, 17-21, 17-22, 17-23, 17-24, 18-19, 18-20, 18-21, 18-22, 18-23, 18-24, 19-20, 19-21, 19-22, 19-23, 19-24, 20-21, 20-22, 20-23, 20-24, 21-22, 22-23, 22-24, 23-24) carbon atoms and, unless otherwise indicated, the ring system may be optionally substituted. Aryl groups of the present technology include, but are not limited to, groups such as phenyl, naphthyl, azulenyl, phenanthrenyl, anthracenyl, fluorenyl, pyrenyl, triphenylenyl, chrysenyl, naphthacenyl, biphenyl, triphenyl, and tetraphenyl. In at least one embodiment, an aryl within the context of the present technology is a 6 or 10 membered ring. In at least one embodiment, each aryl is phenyl or naphthyl.

As used herein, the term "heteroaryl" refers to an aryl group as defined above having at least one O, S, and/or N interrupting the carbocyclic ring structure. Examples of heteroaryl groups include, without limitation, pyrrolyl, pyrazolyl, imidazolyl, triazolyl, furyl, thiophenyl, oxazolyl, isoxazolyl, thiazolyl, isothiazolyl, oxadiazolyl, thiadiazolyl, pyridyl, pyrazinyl, pyrimidinyl, pyridazinyl, triazinyl, thienopyrrolyl, furopyrrolyl, indolyl, azaindolyl, isoindolyl, indolinyl, indolizinyl, indazolyl, benzimidazolyl, imidazopyridinyl, benzotriazolyl, benzoxazolyl, benzoxadiazolyl, benzothiazolyl, pyrazolopyridinyl, triazolopyridinyl, thienopyridinyl, benzothiadiazolyl, benzofuyl, benzothiophenyl, quinolinyl, isoquinolinyl, tetrahydroquinolyl, tetrahydroisoquinolyl, cinnolinyl, quinazolinyl, quinolizilinyl, phthalazinyl, benzotriazinyl, chromenyl, naphthyridinyl, acrydinyl, phenanzinyl, phenothiazinyl, phenoxazinyl, pteridinyl, and purinyl. Additional heteroaryls are described in COMPREHENSIVE HETEROCYCLIC CHEMISTRY: THE STRUCTURE, REACTIONS, SYNTHESIS AND USE OF HETEROCYCLIC COMPOUNDS (Katritzky et al. eds., 1984), which is hereby incorporated by reference in its entirety. Unless otherwise indicated, the heteroaryl ring system may be optionally substituted.

As used herein, the terms “perfluoroalkyl”, “perfluoroalkenyl”, “perfluoroalkynyl”, and “perfluoroaryl” refer to an alkyl, alkenyl, alkynyl, or aryl group as defined above in which the hydrogen atoms on at least one of the carbon atoms have all been replaced with fluorine atoms.

The term “monocyclic” as used herein indicates a molecular structure having one ring.

The term “polycyclic” as used herein indicates a molecular structure having two or more rings, including, but not limited to, fused, bridged, spiro, or covalently bound rings. In at least one embodiment, the polycyclic ring system is a bicyclic, tricyclic, or tetracyclic ring system. In at least one embodiment, the polycyclic ring system is fused. In at least one embodiment, the polycyclic ring system is a bicyclic ring system such as naphthyl or biphenyl.

As used herein, the term “optionally substituted” indicates that a group may have a substituent at each substitutable atom of the group (including more than one substituent on a single atom), provided that the designated atom’s normal valency is not exceeded and the identity of each substituent is independent of the others. “Unsubstituted” atoms bear all of the hydrogen atoms dictated by their valency. When a substituent is keto (i.e., =O), then two hydrogens on the atom are replaced. Combinations of substituents and/or variables are permissible only if such combinations result in stable compounds; by “stable compound” is meant a compound that is sufficiently robust to survive isolation to a useful degree of purity from a reaction mixture, and formulation into an efficacious agent.

As used herein, the term “halogen” includes fluorine, bromine, chlorine, and iodine.

Reaction Conditions

In at least one embodiment the contacting step is carried out in a solvent selected from aqueous solvents, protic solvents, aprotic solvents, and any combination thereof. Exemplary solvents include, but are not limited to, chloroform, dichloromethane, acetonitrile, toluene, tetrahydrofuran, methanol, ethanol, isopropanol, water, dimethyl sulfoxide (DMSO), dimethylformamide (DMF), hexane, hexane isomers, ether, dichloroethane, acetone, ethyl acetate, butanone, and mixtures of any combination thereof. Additionally, the contacting can be carried out in air, and/or in an aqueous environment.

In at least one embodiment of any analytical method herein, contacting is carried out for about 1 to about 300 minutes (e.g., carried out for a duration range having an upper limit of about 5, about 10, about 20, about 30, about 40, about 50, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, about 290, or about 300 minutes, and a lower limit of about 1, about 5, about 10, about 20, about 30, about 40, about 50, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, or about 290 minutes, or any combination thereof). In all embodiments, contacting is carried out for a time that is sufficient for the probe to bind to any analyte present in the sample. As will be apparent to the skilled chemist, the speed at which binding takes place will depend on various factors, including the particular probe selected and the analyte, whether a catalyst is present, and the temperature.

As will be apparent to the skilled chemist, the analytical methods may be carried out at room temperature, at high temperatures (e.g., about 50° C. to about 100° C., e.g., a temperature range with an upper limit of about 55° C., about 60° C., about 65° C., about 70° C., about 75° C., about 80° C., about 85° C., about 90° C., about 95° C., or about 100° C., and a lower limit of about 50° C., about 55° C., about 60° C., about 65° C., about 70° C., about 75° C., about 80° C., about 85° C., about 90° C., or about 95° C., or any combination thereof), or at low temperatures (e.g., below about 25° C., e.g., below about 25° C., below about 20° C., below about 15° C., below about 10° C., below about 5° C., below about 0° C., below about −5° C., below about −10° C., below about −15° C., below about −20° C., below about −25° C., below about −30° C., below about −35° C., below about −40° C., below about −45° C., below about −50° C., below about −55° C., below about −60° C., below about −65° C., below about −70° C., or below about −75° C., preferably no lower than about −78° C.; e.g., a temperature range with an upper limit of about 25° C., about 20° C., about 15° C., about 10° C., about 5° C., about 0° C., about −5° C., about −10° C., about −15° C., about −20° C., about −25° C., about −30° C., about −35° C., about −40° C., about −45° C., about −50° C., about −55° C., about −60° C., about −65° C., about −70° C., or about −75° C., and a lower limit of about 20° C., about 15° C., about 10° C., about 5° C., about 0° C., about −5° C., about −10° C., about −15° C., about −20° C., about −25° C., about −30° C., about −35° C., about −40° C., about −45° C., about −50° C., about −55° C., about −60° C., about −65° C., about −70° C., about −75° C., or about −78° C., or any combination thereof). Furthermore, the analytical methods may be carried out under ambient conditions (e.g., 23±3° C. and 38±5% relative humidity).

For example, the temperature could be increased to speed up the binding reaction. Some analyte-probe or indicator-probe combinations may have side reactions at certain temperatures; the temperature could be decreased to prevent such side reactions.

The analytical methods could also optionally be carried out in the presence of a base. The analytical methods described herein may generate an acid. Adding an equivalent of base could be helpful, e.g., to avoid side reactions. The base could be organic or inorganic.

In the analytical methods described herein, binding between the probe and analyte is irreversible, while binding between the probe and indicator can be either reversible or irreversible. Thus, the indicator can always be added after any probe-analyte complexes form. As will be apparent to one of skill in the art, contacting of the probe, analyte, and indicator can also occur in other orders (simultaneously or the indicator added before the probe-analyte complexes form) depending on the properties and relative reactivities of the probe, analyte, and indicator.

For example, if the covalent bond between the probe and the indicator is reversible, then the indicator can be added before the analyte or simultaneously with the analyte, as long as any analyte present in the sample has a stronger affinity for the probe and will thereby displace the indicator from the probe. If the analyte is not able to displace the indicator from any probe-indicator complexes that form, either because the covalent bond between the probe and the indicator is not reversible or because the analyte has a weaker affinity for the probe, then the indicator should be added after any probe-analyte complexes are formed.

Similarly, if the analyte and indicator do not react with each other and the probe has a stronger affinity for the analyte than for the indicator, all materials can be mixed together simultaneously or in any order. However, if the indicator can react irreversibly with the analyte, then the probe and analyte should be contacted together first and the indicator added only after the irreversible probe-analyte complexes are formed. Furthermore, if the analyte and indicator are capable of forming a reversible bond, but the probe will displace the indicator from any analyte present in the sample, then the probe, analyte, and indicator can be mixed together simultaneously or in any order.

Analysis

In the analytical methods described herein, an excess of the probe, based on the maximum amount of analyte possible in the sample, is reacted with the analyte to form probe-analyte complexes through an irreversible covalent bond between the probe and the analyte. The probe-analyte complexes generate a chiroptical signal that can be used to determine the enantiomeric composition and/or absolute configuration of the analyte. The remaining excess of unreacted probe is captured with an indicator to generate a quantifiable non-chiroptical signal that can be used to determine the original analyte concentration.

The enantiomeric composition of the analyte can be determined by correlating the chiroptical signal of the probe-analyte complexes that form to the enantiomeric composition of the analyte. The absolute configuration of the analyte can also be assigned from the chiroptical signal of the probe-analyte complexes that form. The configuration assignment can be based on the sense of chirality induction with a reference or by analogy. The chiroptical signal of the probe-analyte complexes can be measured using standard techniques, which will be apparent to the skilled artisan. Such techniques include circular dichroism spectroscopy (e.g., STEREOCHEMISTRY OF ORGANIC COMPOUNDS 1003-07 (E. L. Eliel & S. H. Wilen eds., 1994); DYNAMIC STEREOCHEMISTRY OF CHIRAL COMPOUNDS 140-43 (Christian Wolf ed., 2008), each of which is hereby incorporated by reference in its entirety), optical rotatory dispersion (e.g., STEREOCHEMISTRY OF ORGANIC COMPOUNDS 999-1003 (E. L. Eliel & S. H. Wilen eds., 1994), which is hereby incorporated by reference in its entirety), and polarimetry (e.g., STEREOCHEMISTRY OF ORGANIC COMPOUNDS 217-21, 1071-80 (E. L. Eliel & S. H. Wilen eds., 1994); DYNAMIC STEREOCHEMISTRY OF CHIRAL COMPOUNDS 140-43 (Christian Wolf ed., 2008), each of which is hereby incorporated by reference in its entirety). By way of example, stereomerically pure samples of each isomer of an analyte of interest can be mixed with the particular probe (and, optionally, the indicator or probe-indicator complexes) to generate standard samples, and their optical spectra obtained. The chiroptical signal of the probe-analyte complexes in the test sample can be measured by generating an optical spectrum of the test sample. The enantiomeric composition and/or absolute configuration of the analyte originally present in the sample can then be determined by comparing the optical spectrum of the test sample to that of the standard sample(s).

The concentration of the analyte can be determined by correlating a non-chiroptical spectroscopic signal of the probe-indicator complexes that form to the concentration of excess probe in the sample, thereby allowing the calculation of the concentration of the analyte originally in the sample. The non-chiroptical spectroscopic signal can be measured using standard techniques, which will be apparent to the skilled artisan. Such techniques include, but are not limited to, UV/Vis spectroscopy (PRINCIPLES OF INSTRUMENTAL ANALYSIS 342-47 (Douglas A. Skoog et al. eds., $5^{th}$ ed. 1998), which is hereby incorporated by reference in its entirety) and fluorescence spectroscopy. By way of example, the concentration of the probe-indicator complexes can be compared to a standard (e.g., a plot of known concentrations of the probe-indicator complexes) to determine the amount of excess probe in the reaction, which can then be correlated to the amount of analyte in the sample. By way of example, serial titrations of the probe-indicator complexes (optionally mixed with probe-analyte complexes) can be used to generate standard samples and their spectra (e.g., UV, fluorescence) obtained. The spectroscopic signal (e.g., UV, fluorescence) of the probe-indicator complexes can be measured by generating a spectrum (e.g., UV, fluorescence) of the test probe-indicator samples. The total concentration of the excess probe originally present in the assay can then be determined by comparing the spectrum of the test sample to the titration curve of the standard samples. The concentration of the excess probe in the assay will allow for the calculation of the original amount of analyte in the sample, and therefore the concentration of the analyte in the sample. As will be apparent to the skilled artisan, if the stereoisomeric excess of the analyte is also determined, the concentration of individual isomers originally present in the test sample can be determined by comparing the stereoisomeric excess to the total analyte concentration.

The analytical methods of the present application provide, among other things, rapid and convenient tools for simultaneously determining the concentration as well as the enantiomeric composition and/or absolute configuration of chiral analytes. These analytical methods may be particularly useful, for example, for evaluating high-throughput reactions whose desired product is chiral. For example, the present methods can be used to determine the enantiomeric composition of the desired product, thus indicating the stereoselectivity of the reaction. Similarly, the present methods can be used to determine the concentration of the total product and/or the desired isomer, thus indicating the overall or individual yield of the reaction.

Herein is introduced a chiral alcohol relay sensing strategy that can accomplish three tasks, i.e., determination of the absolute configuration, sample concentration and enantiomeric composition, altogether. A series of chromophoric phosphite and amidophosphite probes were studied that expedite comprehensive stereochemical analysis of chiral mono-alcohols via simultaneous UV/CD analysis from a single sample. In addition, the usefulness of this new class of sensors was proved by demonstrating a wide application spectrum that includes alcohols but also extends to diols, hydroxy acids, amines and amino alcohols. The unique molecular recognition and chiroptical sensing features are based on irreversible formation of alkyl (amido)phosphite products exhibiting characteristic UV and circular dichroism (CD) signals that allow combined concentration and er analysis. While most chirality sensors introduced to date have a narrow substrate scope, the phosphite probes of the present application are very broadly useful.

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

The present technology may be further illustrated by reference to the following examples.

EXAMPLES

The examples below are intended to exemplify the practice of embodiments of the disclosure but are by no means intended to limit the scope thereof.

Example 1—Materials and Methods

Commercially available 2-chlorobenzo[d][1,3,2]dioxaphosphole (1), naphthalene-2,3-diol, 2,2'-biphenol, 4-nitrocatechol, all reagents and solvents were used as purchased without further purification. N,N$^2$-Dibenzylbenzene-1,2-diamine (36) (Jois and Gibson, *J. Org. Chem.* 56:865-867 (1991); Cetinkaya, et al., *J. Chem. Soc. Perk. Trans.* 1. 2047-2054 (1998), which are hereby incorporated by reference in their entirety), 6-chlorodibenzo[d,f][1,3,2]dioxaphosphepine (4) (Smith and RajanBabu, *Org. Lett.* 10:1657-1659 (2008), which is hereby incorporated by reference in its entirety) and 2-chloronaphtho[2,3-d][1,3,2]dioxaphosphole (3) (Voropai et al., *Zh. Obshch. Khim.* 55: 65-73 (1985), which is hereby incorporated by reference in its entirety) were synthesized by following literature procedures. NMR spectra were obtained at 400 MHz ($^1$H NMR) and 100 MHz ($^{13}$C NMR) in deuterated chloroform. Chemical shifts are reported in ppm relative to TMS. Reaction products were purified by column chromatography on silica gel (particle size 40-63 m). The CD spectra were collected with a standard sensitivity of 100 mdeg, a data pitch of 0.5 nm, a bandwidth of 1 nm, in a continuous scanning mode with a scanning speed of 500 nm/min and a response of 1 s, using a quartz cuvette (1 cm path length). The data were baseline corrected and smoothed using a binomial equation.

Example 2—Synthetic Procedures

General Procedure for the Synthesis of Chlorophosphites and Chlorodiazaphosphites A 25-mL two-necked round-bottomed flask equipped with a magnetic stirring bar, and reflux condenser was flame-dried and purged with nitrogen. The flask was charged with 2,2'-biphenol (558 mg, 3.0 mmol) and phosphorus trichloride (2.51 mL, 28.8 mmol) under nitrogen. N-Methyl-2-pyrrolidinone (5 mol %) was added and the reaction mixture was refluxed at 92° C. for 2 hours. After cooling, the reaction mixture was transferred to a 100 mL round-bottom flask and the remaining $PCl_3$ was removed under reduced pressure. Trace amounts of $PCl_3$ were evaporated with dry toluene (3×20 mL). The resulting colorless amorphous solid was directly used for chirality sensing of alcohols without further purification.

Product Isolation and Characterization

2-Chloro-5-nitrobenzo[d][1,3,2]dioxaphosphole (2)

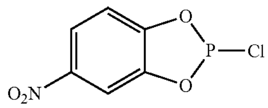

Figure 2:
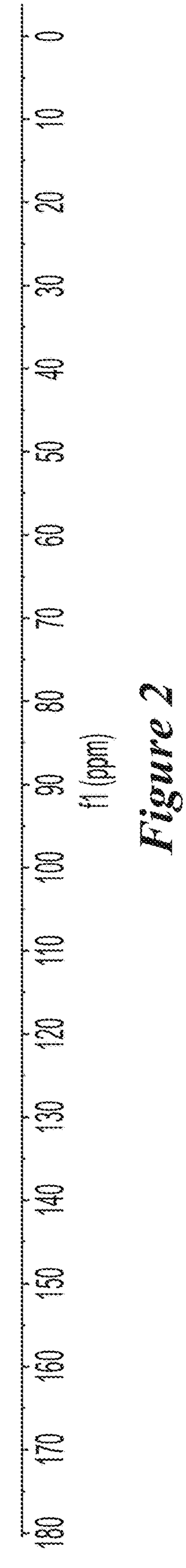
FIG. 2 is the $^{13}$C NMR spectrum of 2-chloro-5-nitrobenzo[d][1,3,2]dioxaphosphole (2).

Compound 2 was obtained as a yellow amorphous solid in 89% yield (584 mg, 2.67 mmol) from 4-nitrobenzene-1,2-diol (465 mg, 3.0 mmol) and phosphorus trichloride (2.51 mL, 28.8 mmol) in the presence of 5 mol % of NMP by following the general procedure described above. $^1$H NMR (400 MHz, Chloroform-d) δ=8.20-8.10 (m, 2H), 7.37 (d, J=8.6 Hz, 1H); $^{13}$C NMR (100 MHz, Chloroform-d) δ=149.5 (d, $J_{C-P}$=8.0 Hz), 145.1 (d, $J_{C-P}$=8.0 Hz), 144.7, 121.2, 113.8, 110.4; Anal. Calcd. for $C_6H_3ClNO_4P$: C, 32.83; H, 1.38; N, 6.38. Found: C, 32.58; H, 1.67; N, 6.45. The $^1$H NMR spectrum and $^{13}$C NMR spectrum of compound 2 are shown in FIG. 1 and FIG. 2, respectively.

2-Chloronaphtho[2,3-d][1,3,2]dioxaphosphole (3)

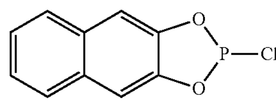 [SMILES: ClP1Oc2cc3ccccc3cc2O1]

Compound 3 was obtained as a yellow amorphous solid in 96% yield (645 mg, 2.88 mmol) from naphthalene-2,3-diol (480 mg, 3.0 mmol) and phosphorus trichloride (2.51 mL, 28.8 mmol) by following the general procedure described above. Characterization and spectroscopic data were in agreement with literature values (Voropai et al., *Zh. Obshch. Khim.* 55: 65-73 (1985), which is hereby incorporated by reference in its entirety).

6-Chlorodibenzo[d,f][1,3,2]dioxaphosphepine (4)

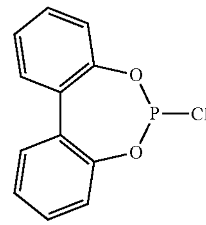 [SMILES: Clp1oc2ccccc2c2ccccc2o1]

Compound 4 was obtained as a yellow amorphous solid in 94% yield (705 mg, 2.82 mmol) from 2,2'-biphenol (558 mg, 3.0 mmol) and phosphorus trichloride (2.51 mL, 28.8 mmol) by following the general procedure described above. Characterization and spectroscopic data were in agreement with literature values (Smith and RajanBabu, Org. Lett. 10:1657-1659 (2008), which is hereby incorporated by reference in its entirety).

1,3-Dibenzyl-2-chloro-2,3-dihydro-1H-benzo[d][1,3,2]diazaphosphole (5)

Scheme 1. Synthesis of probe 5

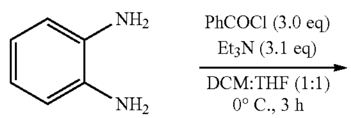

34

-continued

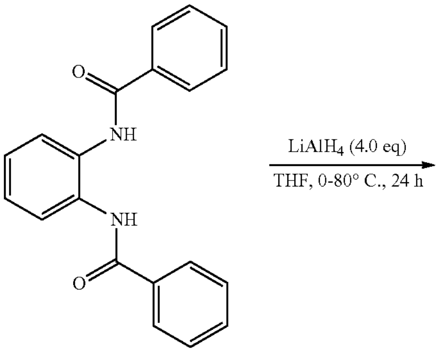

35
99% yield

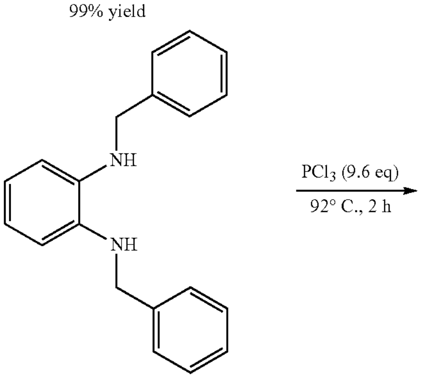

36
98% yield

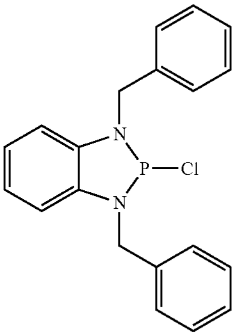

5
96% yield

Compound 5 was synthesized as shown in Scheme 1 following literature procedures (Jois and Gibson, *J. Org. Chem.* 56:865-867 (1991); Cetinkaya, et al., *J. Chem. Soc. Perk. Trans.* 1. 2047-2054 (1998), which are hereby incorporated by reference in their entirety).

Figure 3:
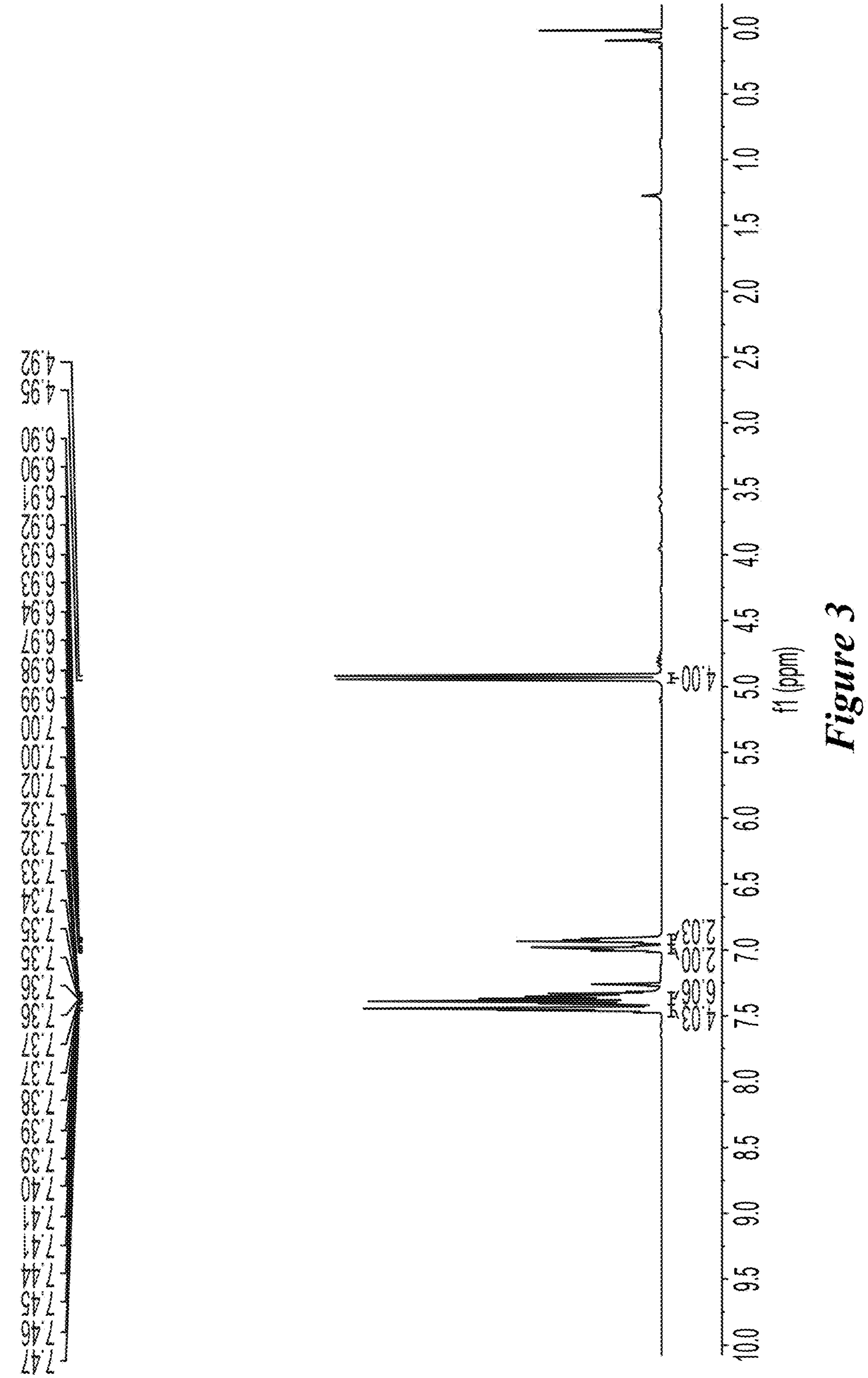
FIG. 3 is the $^{1}$H NMR spectrum of 1,3-dibenzyl-2-chloro-2,3-dihydro-1H-benzo[d][1,3,2]diazaphosphole (5).
Figure 4:
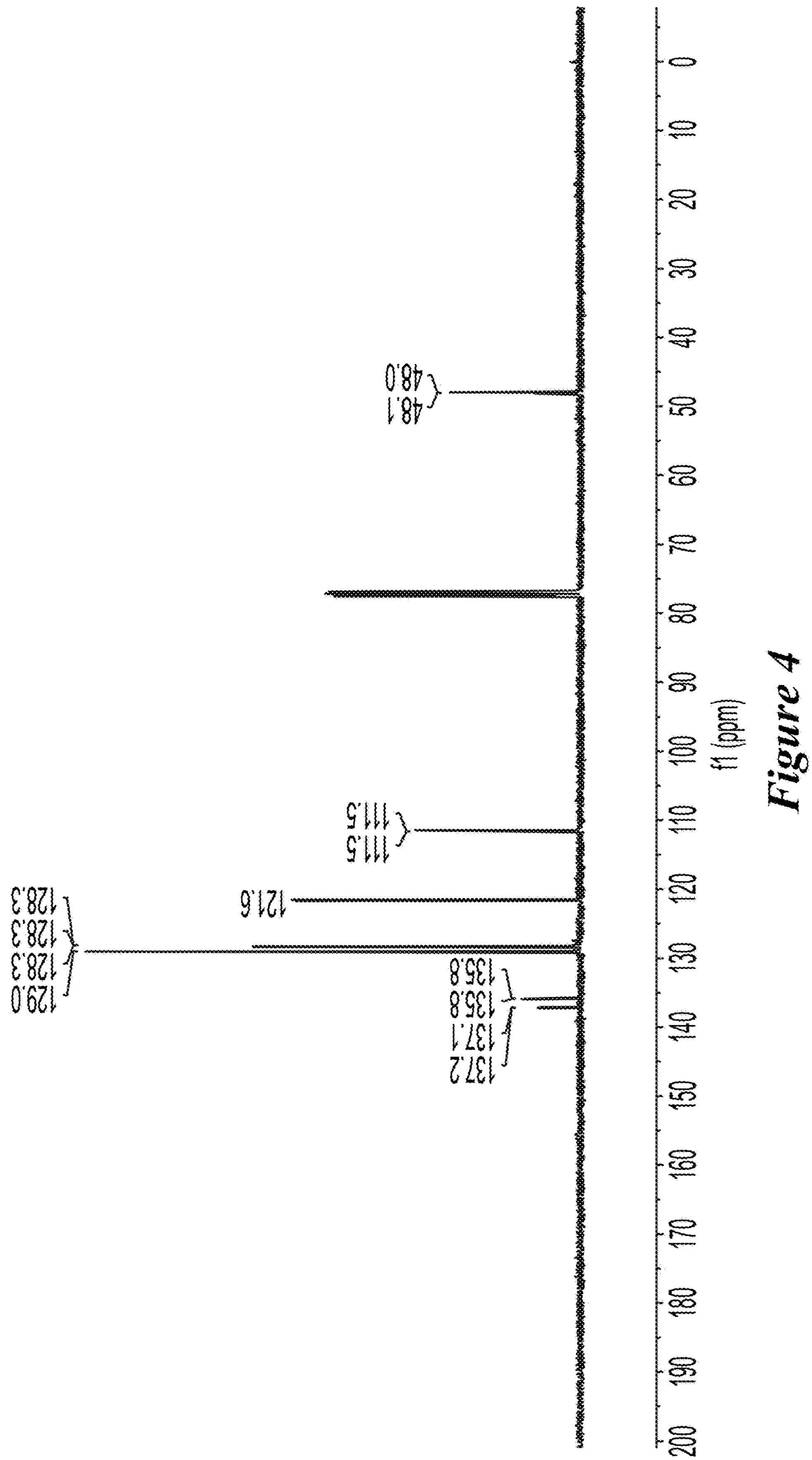
FIG. 4 is the $^{13}$C NMR spectrum of 1,3-dibenzyl-2-chloro-2,3-dihydro-1H-benzo[d][1,3,2]diazaphosphole (5).
Figure 5:
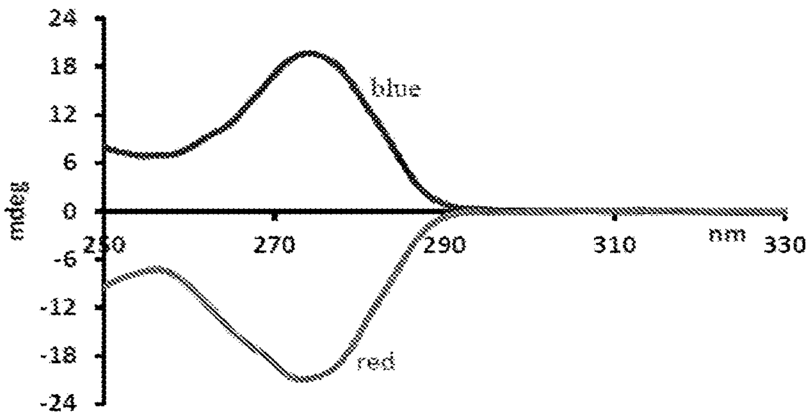
FIG. 5 is the circular dichroism ("CD") spectra of (S)-1-phenylbutanol (7) (red) and (R)-1-phenylbutanol (7) (blue) with probe 1. CD measurements were taken at 0.61 mM in chloroform.
Figure 6:
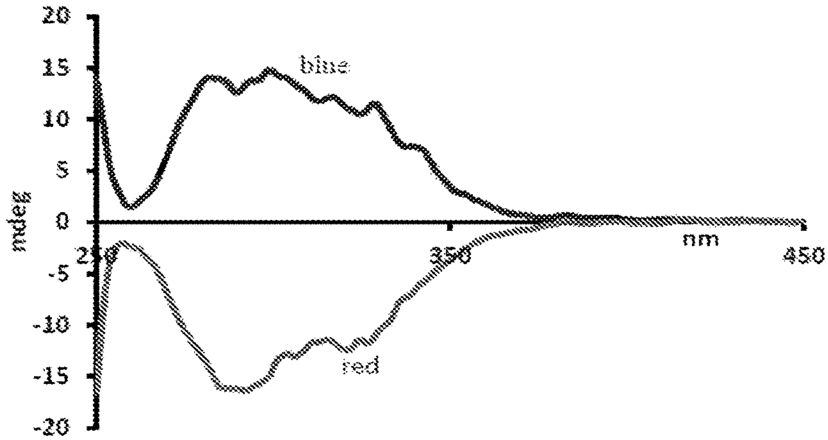
FIG. 6 is the CD spectra of (5)-1-phenylbutanol (7) (red) and (R)-1-phenylbutanol (7) (blue) with probe 2. CD measurements were taken at 0.37 mM in chloroform.
Figure 7:
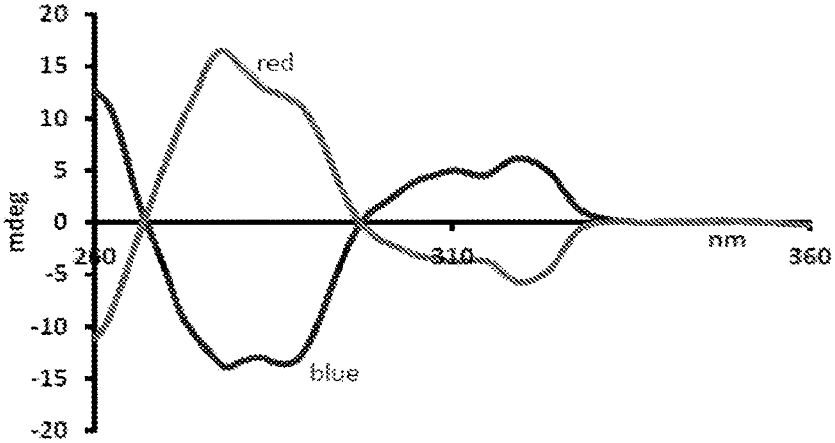
FIG. 7 is the CD spectra of (5)-1-phenylbutanol (7) (red) and (R)-1-phenylbutanol (7) (blue) with probe 3. CD measurements were taken at 0.25 mM in chloroform.
Figure 8:
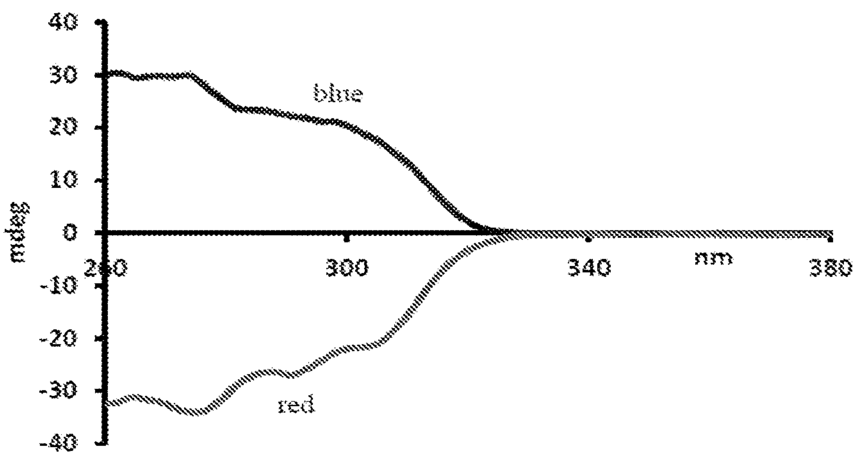
FIG. 8 is the CD spectra of (5)-1-phenylbutanol (7) (red) and (R)-1-phenylbutanol (7) (blue) with probe 4. CD measurements were taken at 0.25 mM in chloroform.
Figure 9:
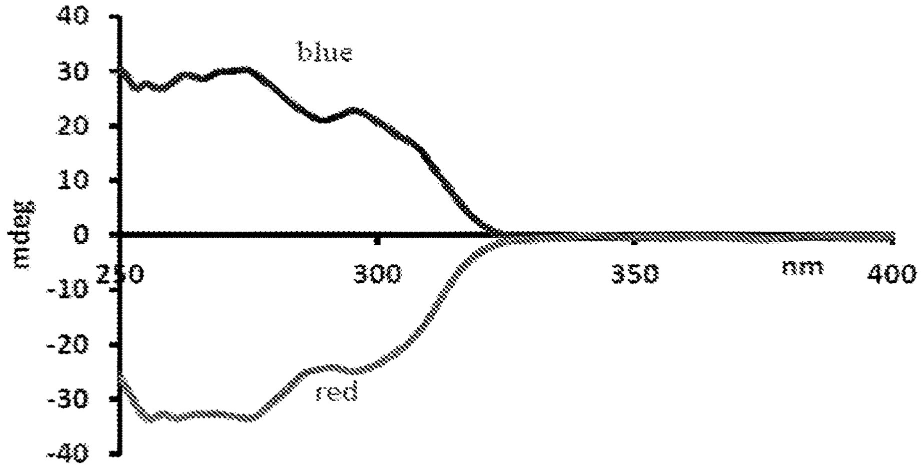
FIG. 9 is the CD spectra of (5)-1-phenylbutanol (7) (red) and (R)-1-phenylbutanol (7) (blue) with probe 5. CD measurements were taken at 0.25 mM in chloroform.

Compound 5 was obtained as a pale yellow amorphous solid in 96% yield (1.013 g, 2.87 mmol) from $N^1$,$N^2$-dibenzylbenzene-1,2-diamine (34) (865 mg, 3.0 mmol) and phosphorus trichloride (2.51 mL, 28.8 mmol) in the presence of 5 mol % NMP by following the general procedure described above. $^1$H NMR (400 MHz, Chloroform-d) δ=7.46-7.40 (m, 4H), 7.40-7.30 (m, 6H), 6.98 (m, 2H), 6.90 (m, 2H), 4.92 (d, $J_{H-P}$=12.1 Hz, 4H); $^{13}$C NMR (100 MHz, Chloroform-d) δ=137.2 (d, $J_{C-P}$=10.5 Hz), 135.9 (d, $J_{C-P}$=7.1 Hz), 129.0, 128.3 (d, $J_{C-P}$=1.3 Hz), 128.2, 121.6, 111.5 (d, $J_{C-P}$=1.3 Hz), 48.1 (d, $J_{C-P}$=17.7 Hz); Anal. Calcd. for $C_{20}H_{18}ClN_2P$: C, 68.09; H, 5.14; N, 7.94. Found: C, 67.88; H, 5.36; N, 7.66. The $^1$H NMR spectrum and $^{13}$C NMR spectrum of compound 5 are shown in FIG. 3 and FIG. 4, respectively.

Example 3—Probe Development

Initially, the reactions were performed with 1-phenylbutanol (7) as described below to identify a probe with superior chiroptical properties.

The CD spectra were collected with a standard sensitivity of 100 mdeg, a data pitch of 0.5 nm, a bandwidth of 1 nm, in a continuous scanning mode with a scanning speed of 500 nm/min and a response of 1 s, using a quartz cuvette (1 cm path length). The data were baseline corrected and smoothed using a binomial equation.

Figure 10:
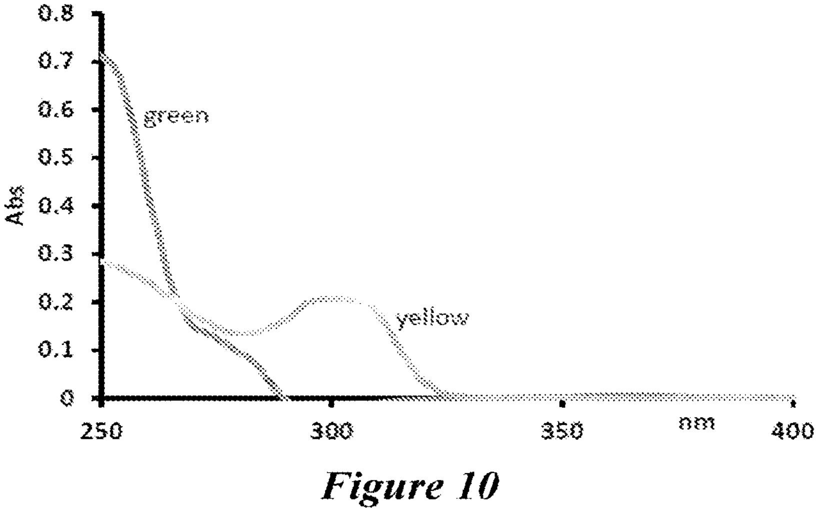
FIG. 10 shows the UV spectra of (S)-1-phenylbutanol (7) with probe 4 (yellow) and of the probe 4 by itself (green). UV measurements were taken at 0.12 mM after diluting with chloroform.
Figure 11:
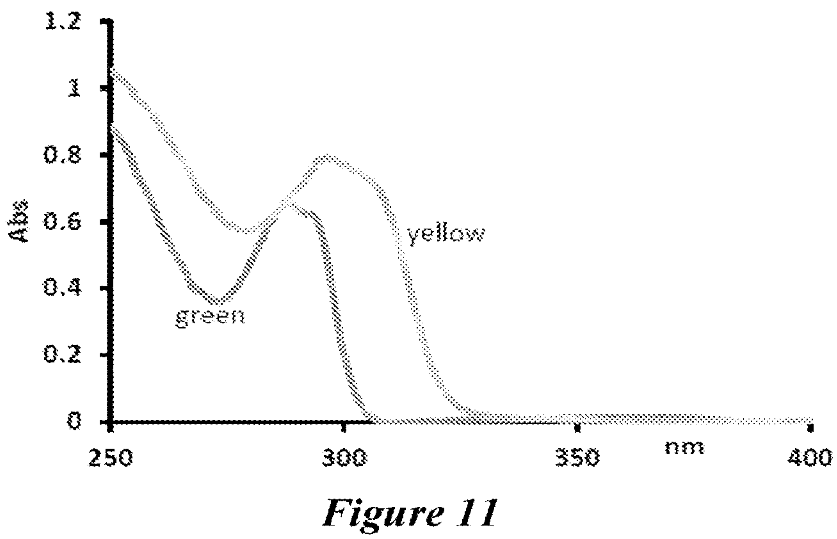
FIG. 11 shows the UV spectra of (S)-1-phenylbutanol (7) with probe 5 (yellow) and of the probe 5 by itself (green). UV measurements were taken at 0.10 mM after diluting with chloroform.
Figure 12:
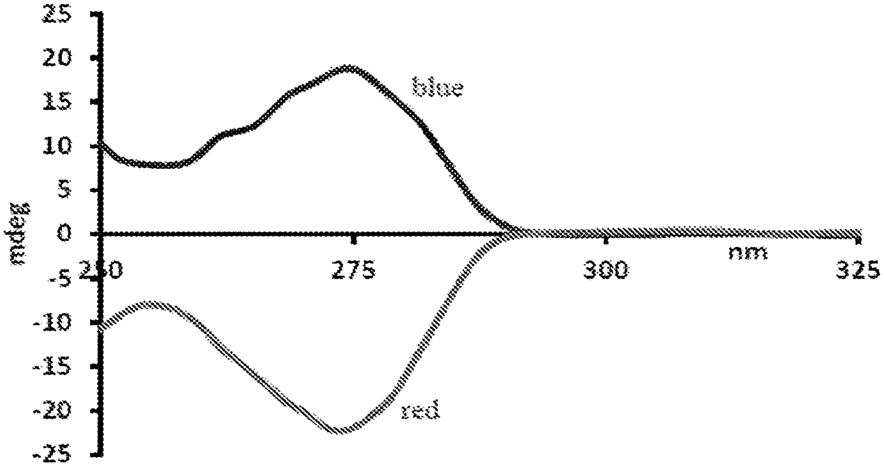
FIG. 12 is the CD spectra of (S)-1-phenylbutanol (7) (red) and (R)-1-phenylbutanol (blue) with probe 1 in chloroform. CD measurements were taken at 0.68 mM after diluting with chloroform.
Figure 13:
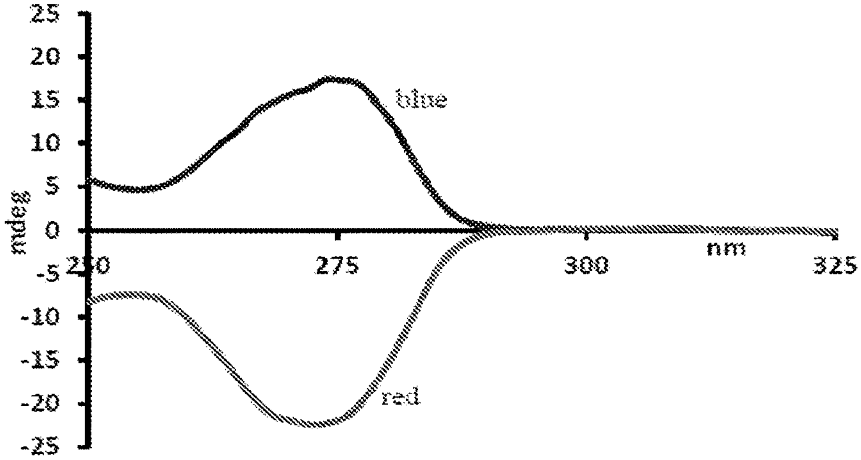
FIG. 13 is the CD spectra of (S)-1-phenylbutanol (7) (red) and (R)-1-phenylbutanol (7) (blue) with probe 1 in acetonitrile. CD measurements were taken at 0.68 mM after diluting with acetonitrile.
Figure 14:
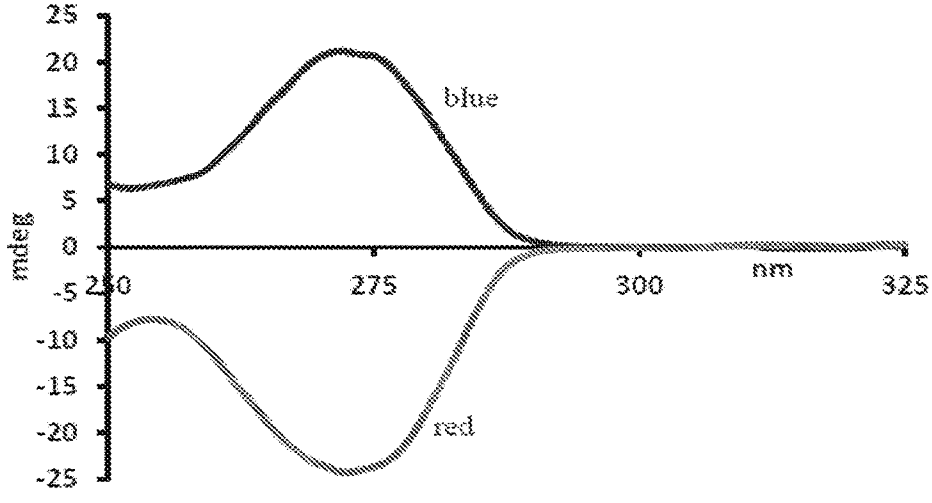
FIG. 14 is the CD spectra of (S)-1-phenylbutanol (7) (red) and (R)-1-phenylbutanol (7) (blue) with probe 1 in THF. CD measurements were taken at 0.49 mM after diluting with THF.
Figure 15:
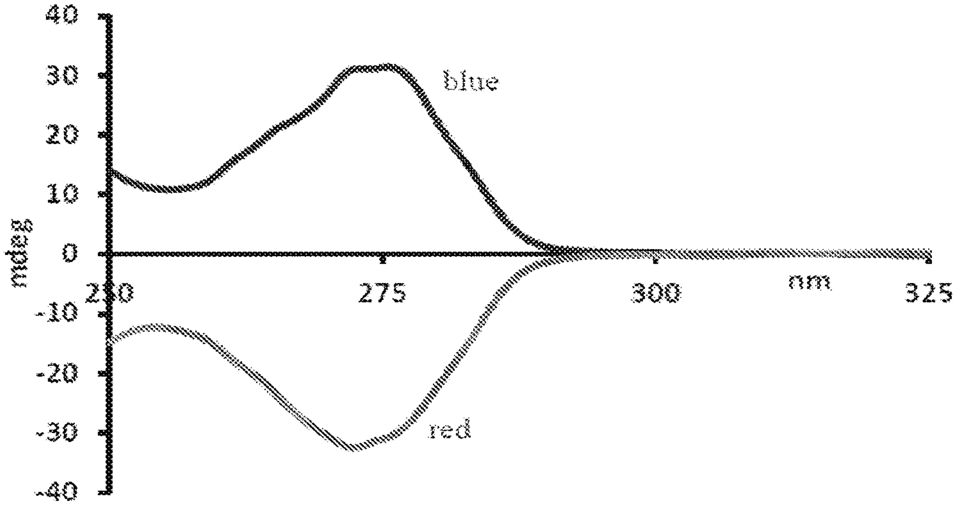
FIG. 15 is the CD spectra of (S)-1-phenylbutanol (7) (red) and (R)-1-phenylbutanol (7) (blue) with probe 1 in dichloromethane. CD measurements were taken at 0.68 mM after diluting with dichloromethane.
Figure 17:
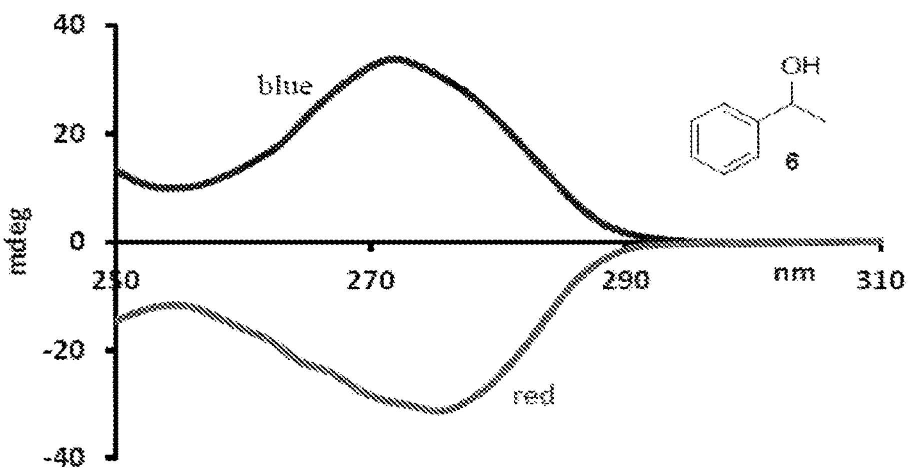
FIG. 17 is the CD spectra of the product of probe 1 with (S)-6 (red) and (R)-6 (blue). CD measurements were taken at 0.75 mM in chloroform.
Figure 18:
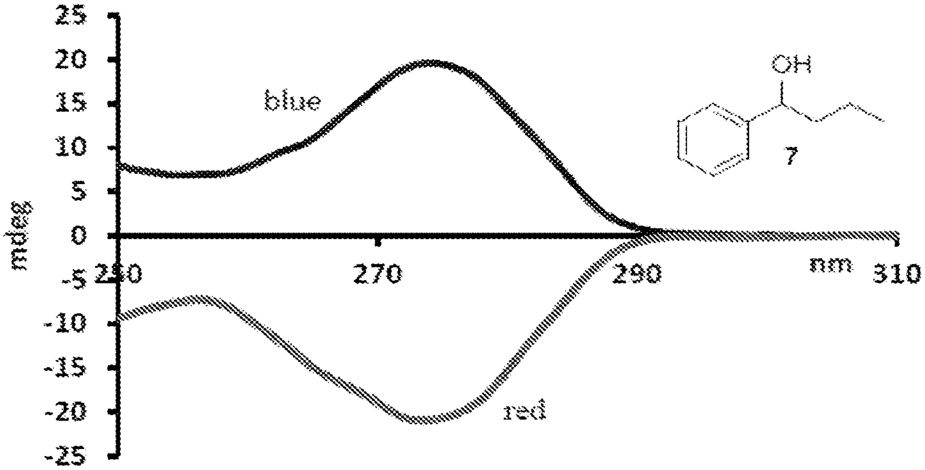
FIG. 18 is the CD spectra of the product of probe 1 with (S)-7 (red) and (R)-7 (blue). CD measurements were taken at 0.61 mM in chloroform.
Figure 19:
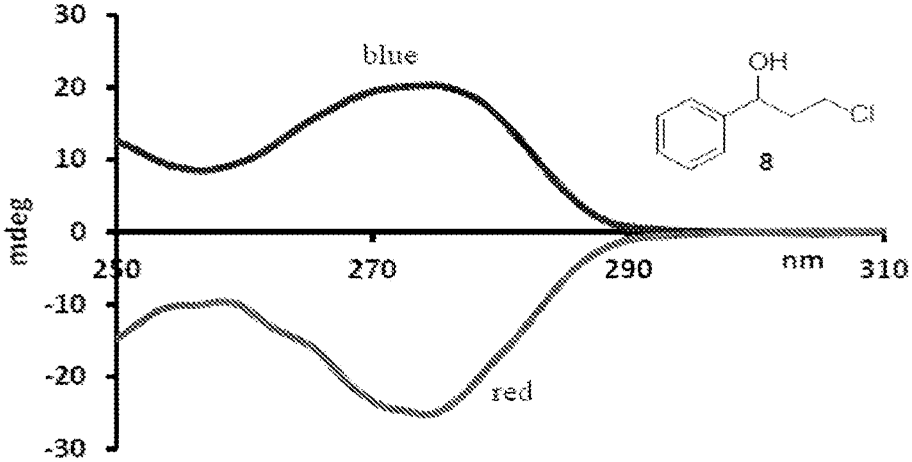
FIG. 19 is the CD spectra of the product of probe 1 with (S)-8 (red) and (R)-8 (blue). CD measurements were taken at 0.75 mM in chloroform.
Figure 20:
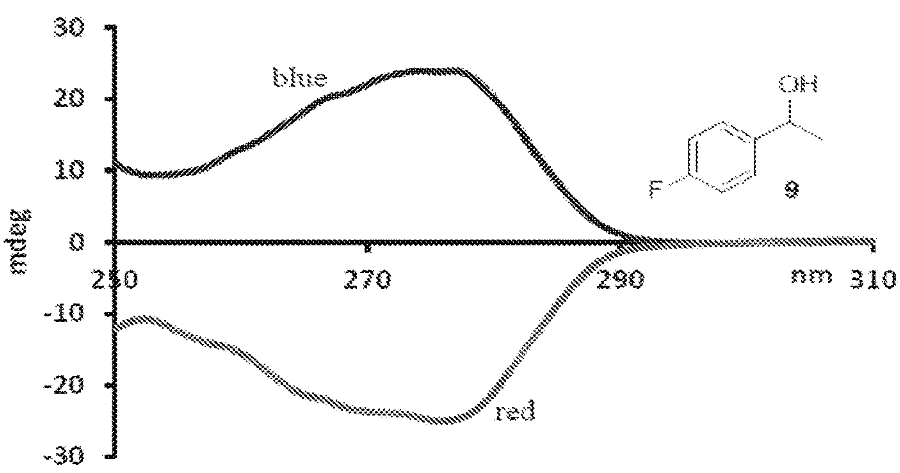
FIG. 20 is the CD spectra of the product of probe 1 with (S)-9 (red) and (R)-9 (blue). CD measurements were taken at 0.75 mM in chloroform.
Figure 21:
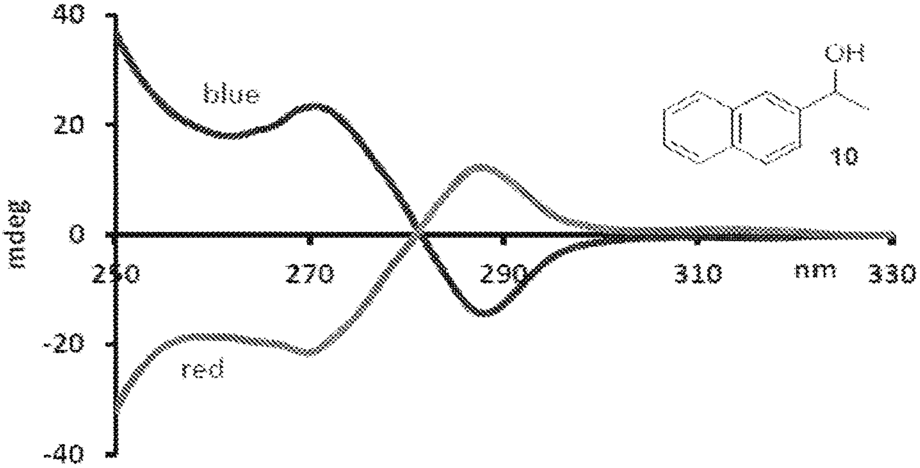
FIG. 21 is the CD spectra of the product of probe 1 with (S)-10 (red) and (R)-10 (blue). CD measurements were taken at 0.25 mM in chloroform.
Figure 22:
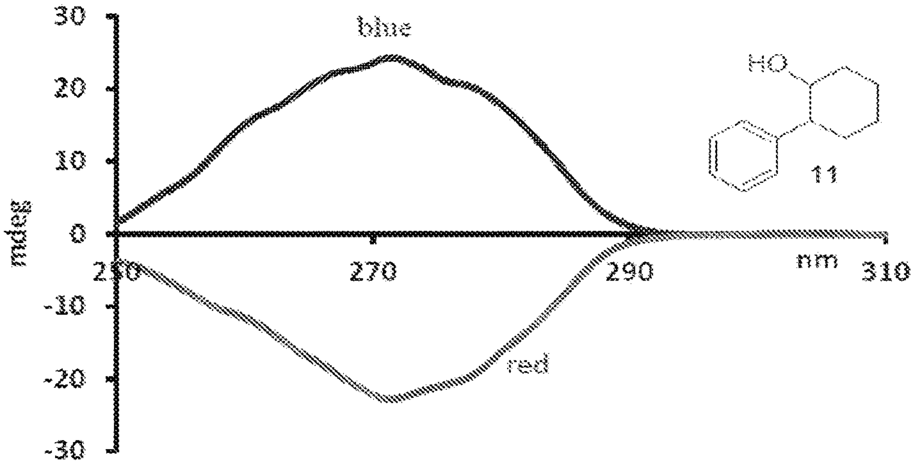
FIG. 22 is the CD spectra of the product of probe 1 with trans-(1S,2R)-11 (red) and trans-(1R,2S)-11 (blue). CD measurements were taken at 0.61 mM in chloroform.
Figure 23:
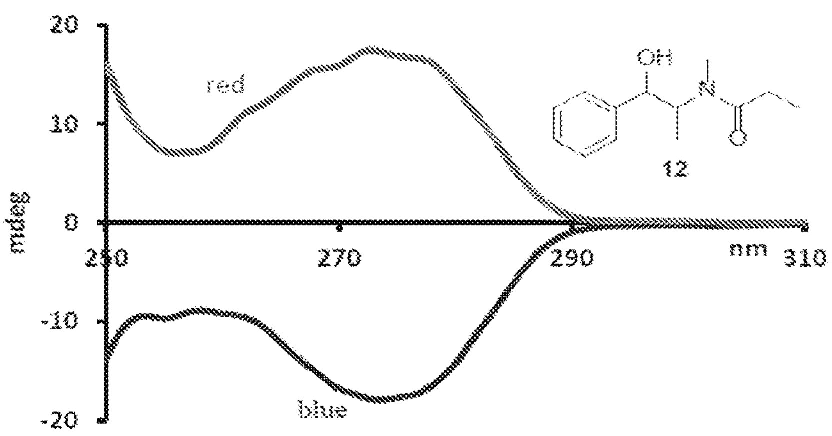
FIG. 23 is the CD spectra of the product of probe 1 with anti-(1S,2S)-12 (red) and anti-(1R,2R)-12 (blue). CD measurements were taken at 0.40 mM in chloroform.
Figure 24:
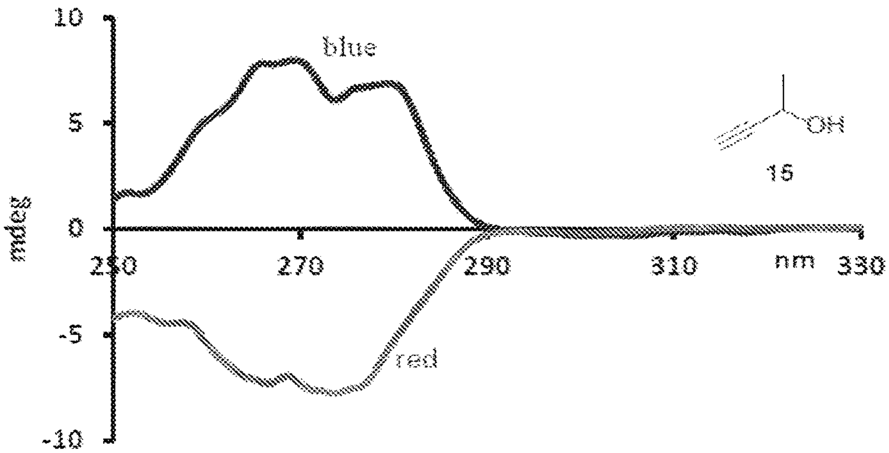
FIG. 24 is the CD spectra of the product of probe 1 with (5)-15 (red) and (R)-15 (blue). CD measurements were taken at 0.81 mM in chloroform.
Figure 25:
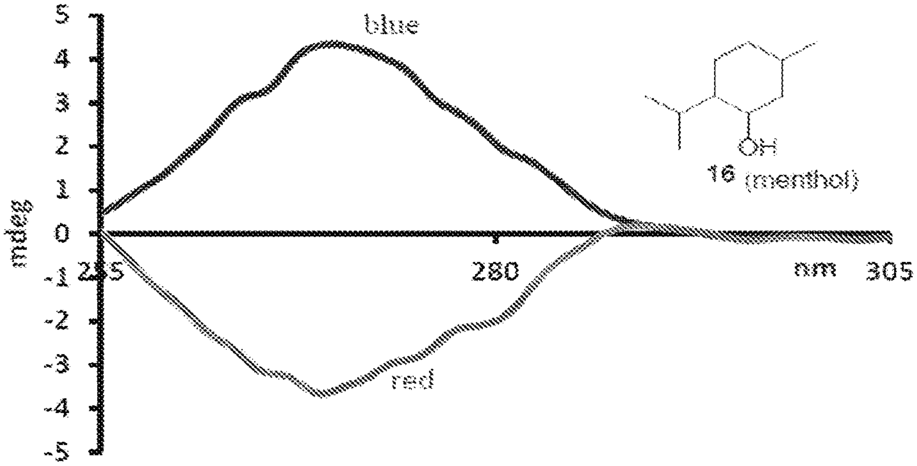
FIG. 25 is the CD spectra of the product of probe 1 with (1S,2R,5S)-16 (red) and (1R,2S,5R)-16 (blue). CD measurements were taken at 0.90 mM in chloroform.
Figure 26:
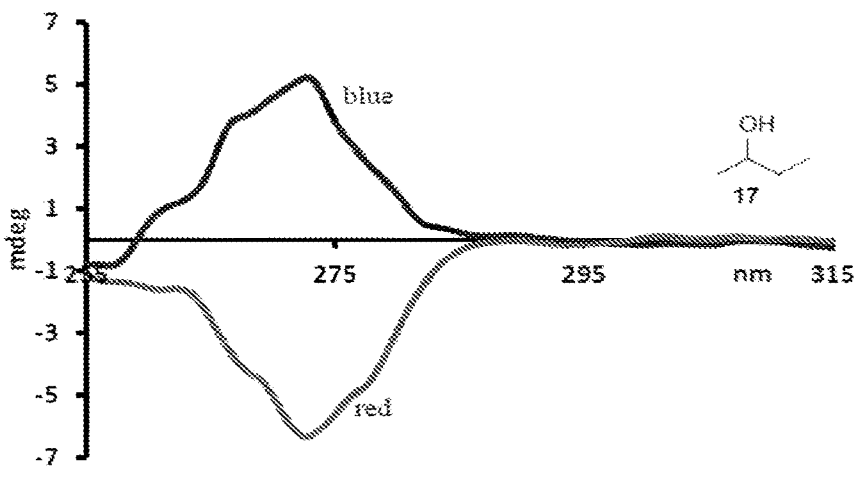
FIG. 26 is the CD spectra of the product of probe 1 with (S)-17 (red) and (R)-17 (blue). CD measurements were taken at 0.61 mM in acetonitrile.
Figure 27:
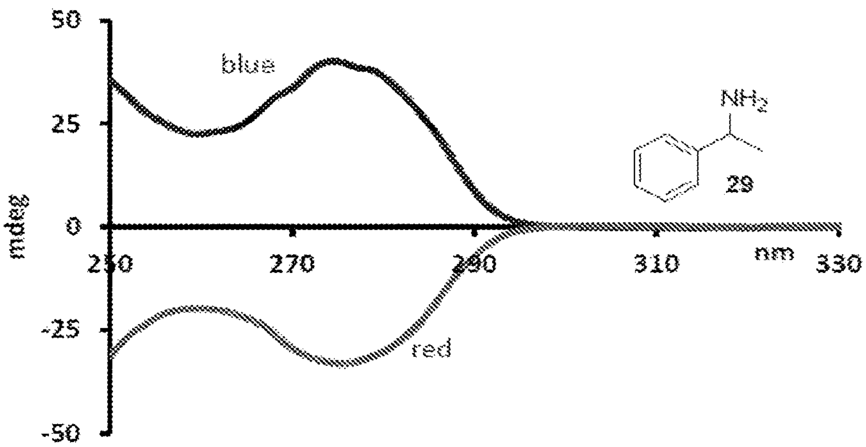
FIG. 27 is the CD spectra of the product of probe 1 with (S)-29 (red) and (R)-29 (blue). CD measurements were taken at 0.34 mM in chloroform.
Figure 28:
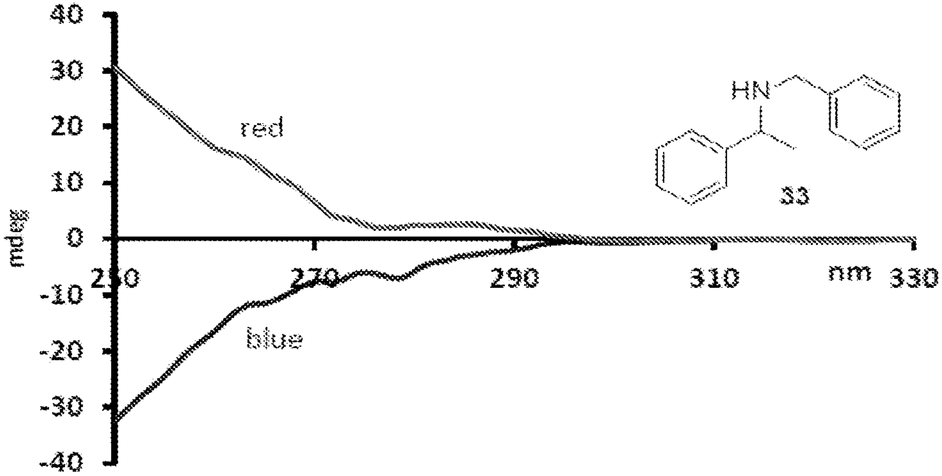
FIG. 28 is the CD spectra of the product of probe 1 with (S)-33 (red) and (R)-33 (blue). CD measurements were taken at 0.61 mM in chloroform.
Figure 29:
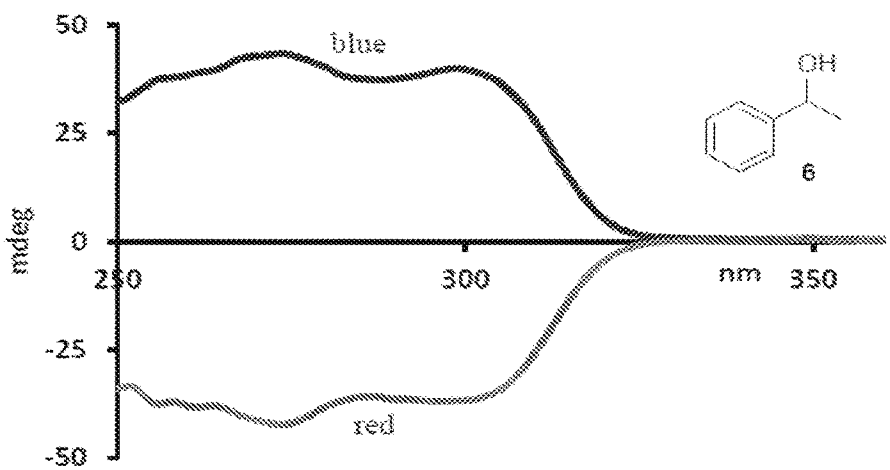
FIG. 29 is the CD spectra of the product of probe 5 with (S)-6 (red) and (R)-6 (blue). CD measurements were taken at 0.22 mM in chloroform.
Figure 30:
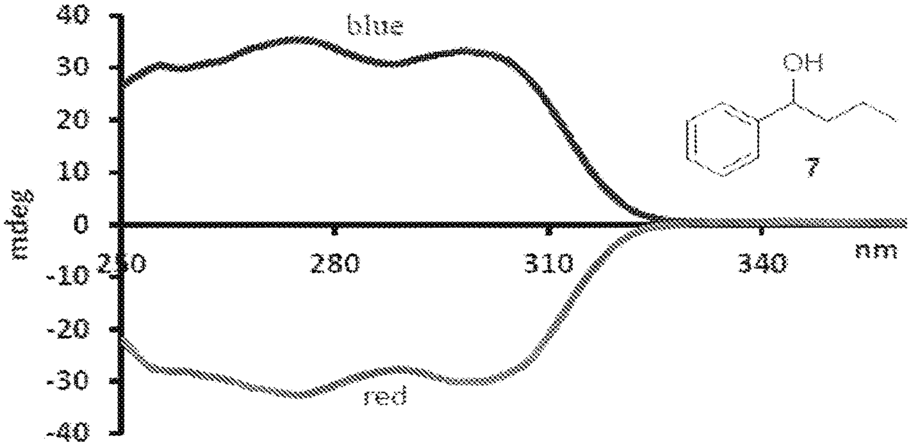
FIG. 30 is the CD spectra of the product of probe 5 with (S)-7 (red) and (R)-7 (blue). CD measurements were taken at 0.25 mM in chloroform.
Figure 31:
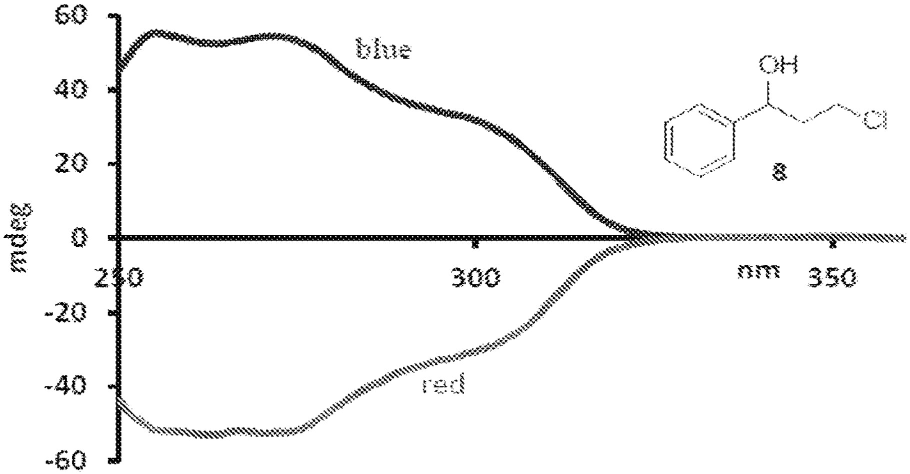
FIG. 31 is the CD spectra of the product of probe 5 with (S)-8 (red) and (R)-8 (blue). CD measurements were taken at 0.22 mM in chloroform.
Figure 32:
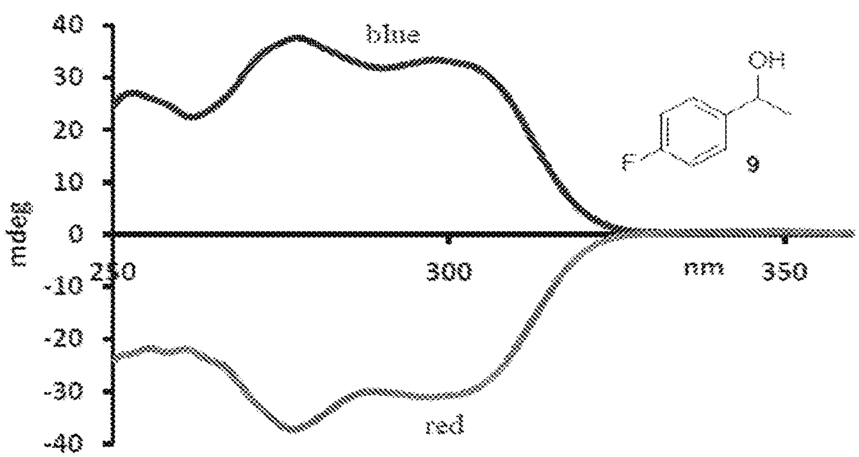
FIG. 32 is the CD spectra of the product of probe 5 with (S)-9 (red) and (R)-9 (blue). CD measurements were taken at 0.22 mM in chloroform.
Figure 33:
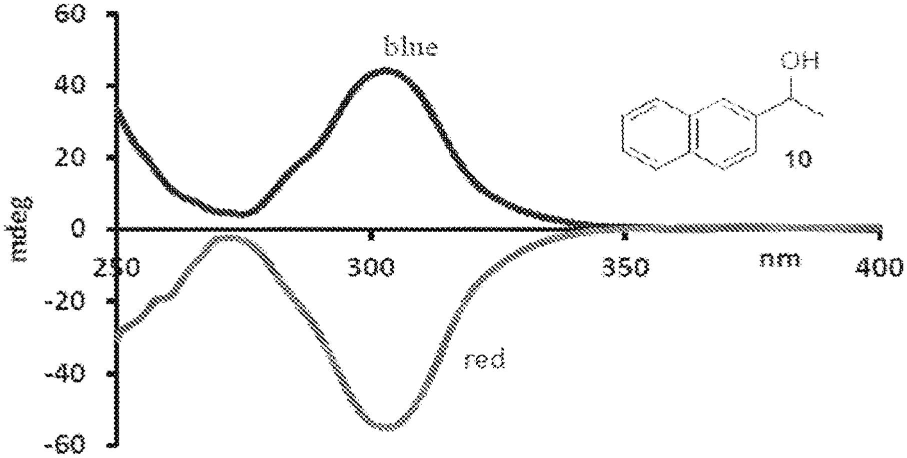
FIG. 33 is the CD spectra of the product of probe 5 with (S)-10 (red) and (R)-10 (blue). CD measurements were taken at 0.17 mM in chloroform.
Figure 34:
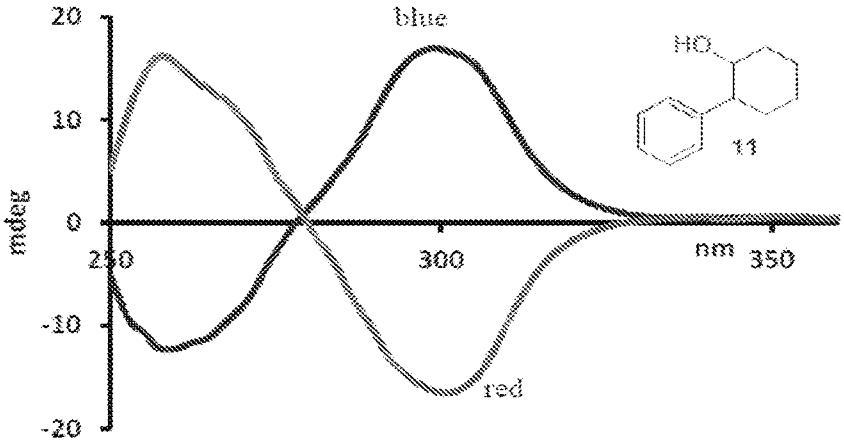
FIG. 34 is the CD spectra of the product of probe 5 with trans-(1S,2R)-11 (red) and trans-(1R,2S)-11 (blue). CD measurements were taken at 0.22 mM in chloroform.
Figure 35:
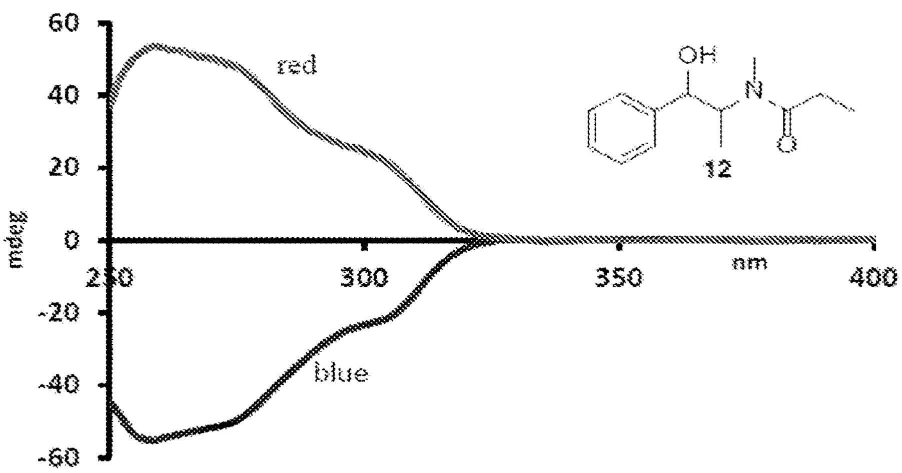
FIG. 35 is the CD spectra of the product of probe 5 with anti-(1S,2S)-12 (red) and anti-(1R,2R)-12 (blue). CD measurements were taken at 0.25 mM in chloroform.
Figure 36:
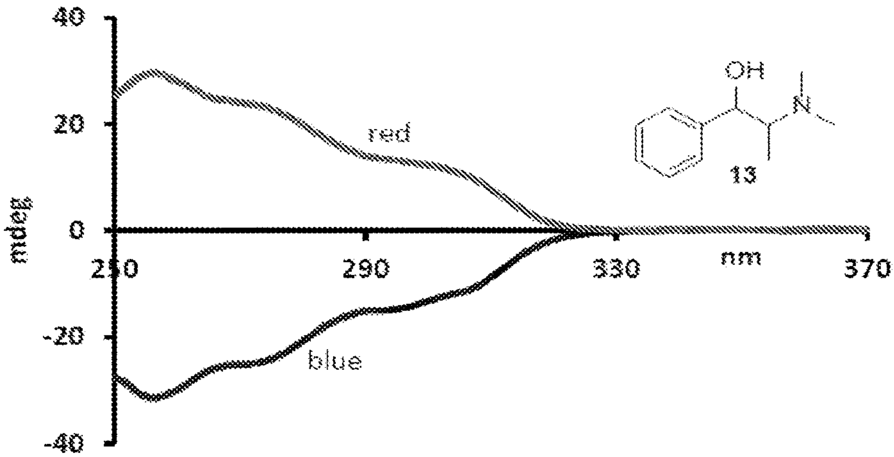
FIG. 36 is the CD spectra of the product of probe 5 with (1S,2R)-13 (red) and (1R,2S)-13 (blue). CD measurements were taken at 0.20 mM in chloroform.
Figure 37:
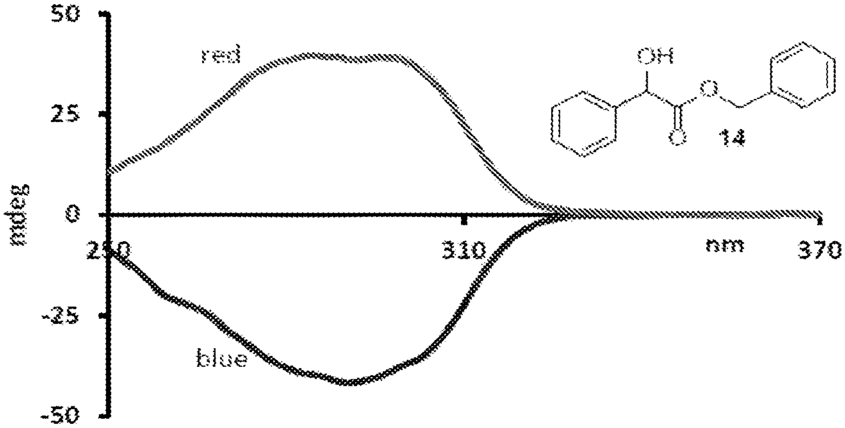
FIG. 37 is the CD spectra of the product of probe 5 with (S)-14 (red) and (R)-14 (blue). CD measurements were taken at 0.25 mM in chloroform.
Figure 38:
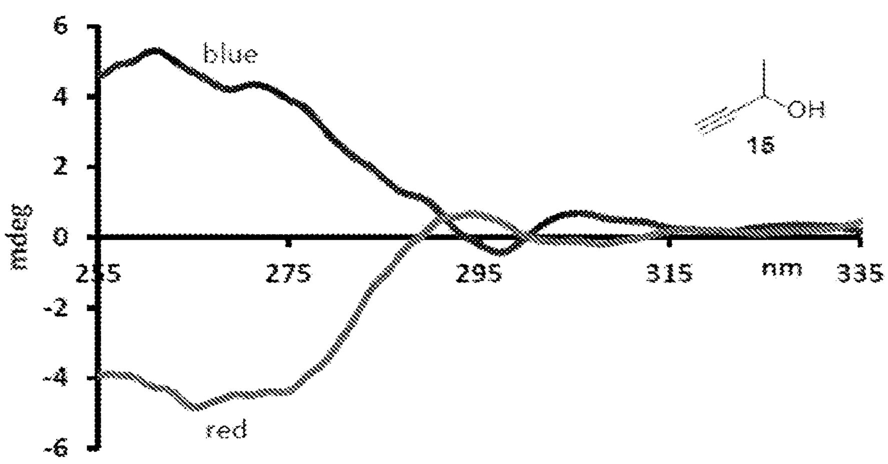
FIG. 38 is the CD spectra of the product of probe 5 with (5)-15 (red) and (R)-15 (blue). CD measurements were taken at 0.22 mM in chloroform.
Figure 39:
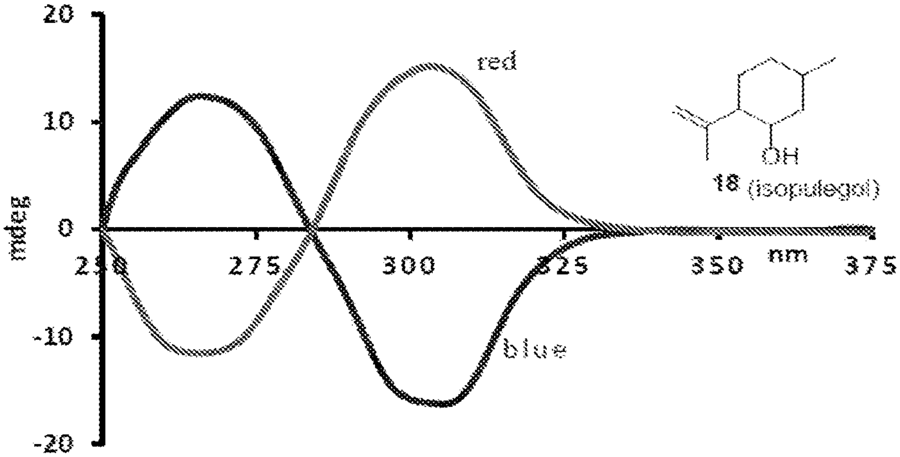
FIG. 39 is the CD spectra of the product of probe 5 with (1S,2R,5S)-18 (red) and (1R,2S,5R)-18 (blue). CD measurements were taken at 0.30 mM in chloroform.
Figure 40:
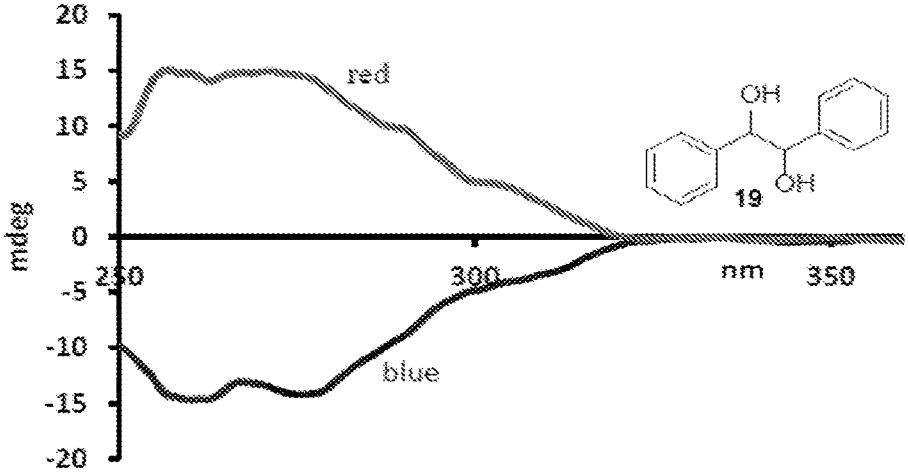
FIG. 40 is the CD spectra of the product of probe 5 with (S,S)-19 (red) and (R,R)-19 (blue). CD measurements were taken at 0.13 mM in chloroform.
Figure 41:
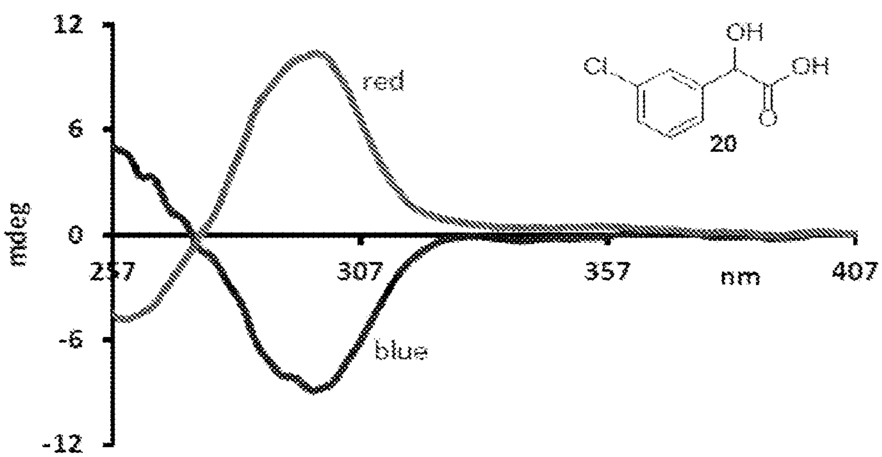
FIG. 41 is the CD spectra of the product of probe 5 with (S)-20 (red) and (R)-20 (blue). CD measurements were taken at 0.13 mM in chloroform.
Figure 42:
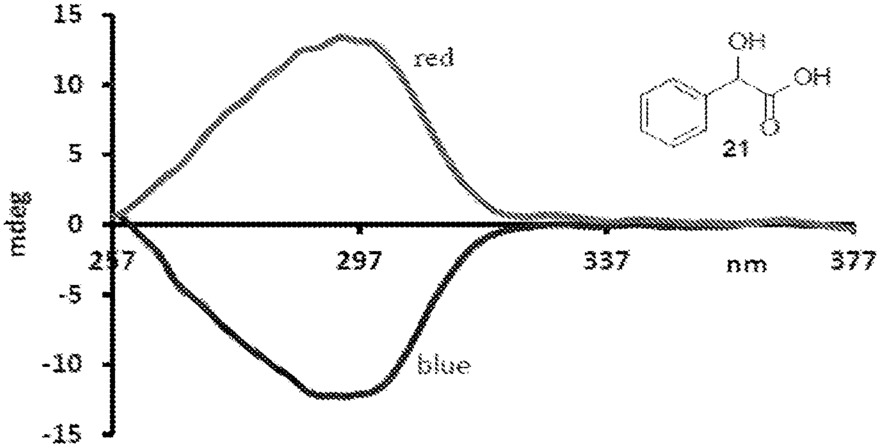
FIG. 42 is the CD spectra of the product of probe 5 with (S)-21 (red) and (R)-21 (blue). CD measurements were taken at 0.13 mM in chloroform.
Figure 43:
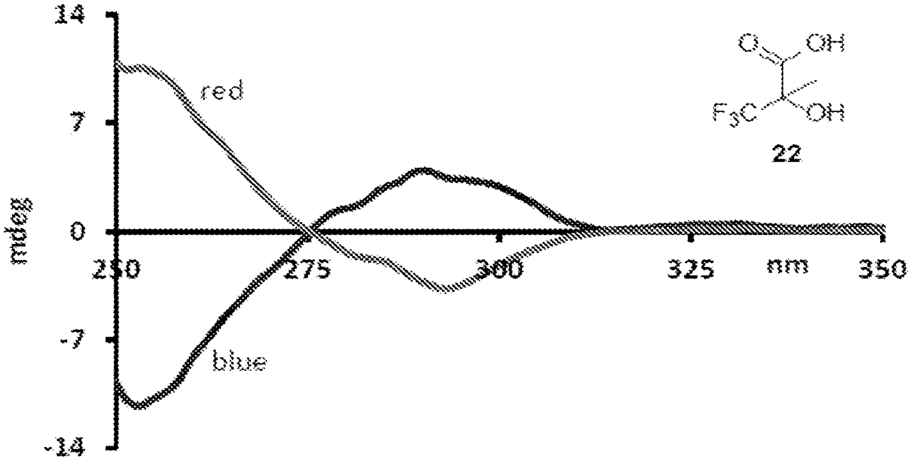
FIG. 43 is the CD spectra of the product of probe 5 with (S)-22 (red) and (R)-22 (blue). CD measurements were taken at 0.13 mM in chloroform.
Figure 44:
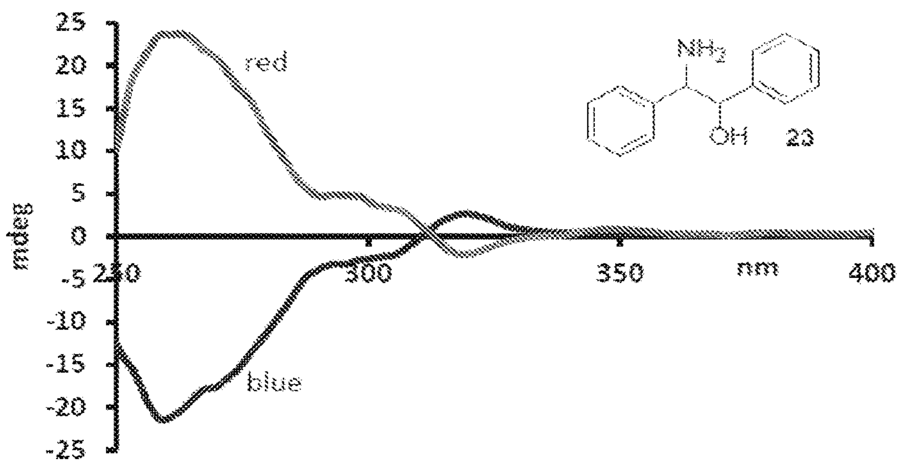
FIG. 44 is the CD spectra of the product of probe 5 with anti-(1S,2R)-23 (red) and anti-(1R,2S)-23 (blue). CD measurements were taken at 0.13 mM in chloroform.
Figure 45:
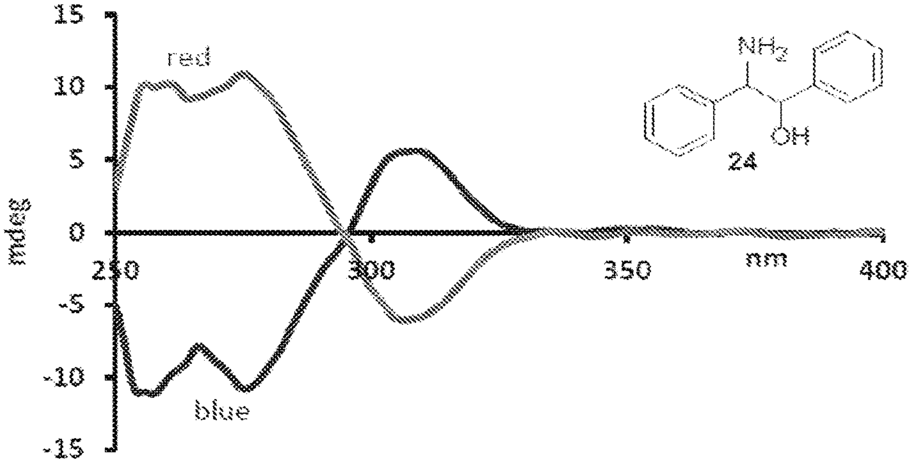
FIG. 45 is the CD spectra of the product of probe 5 with syn-(1S,2S)-24 (red) and syn-(1R,2R)-24 (blue). CD measurements were taken at 0.13 mM in chloroform.
Figure 46:
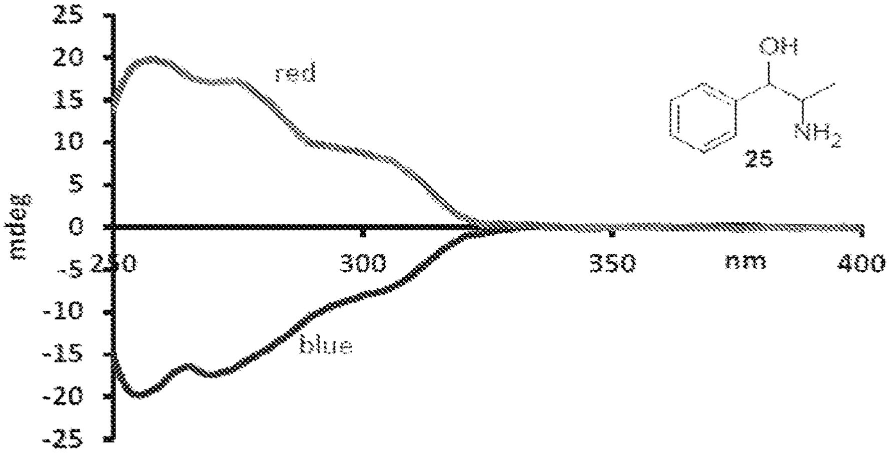
FIG. 46 is the CD spectra of the product of probe 5 with anti-(1S,2R)-25 (red) and anti-(1R,2S)-25 (blue). CD measurements were taken at 0.13 mM in chloroform.
Figure 47:
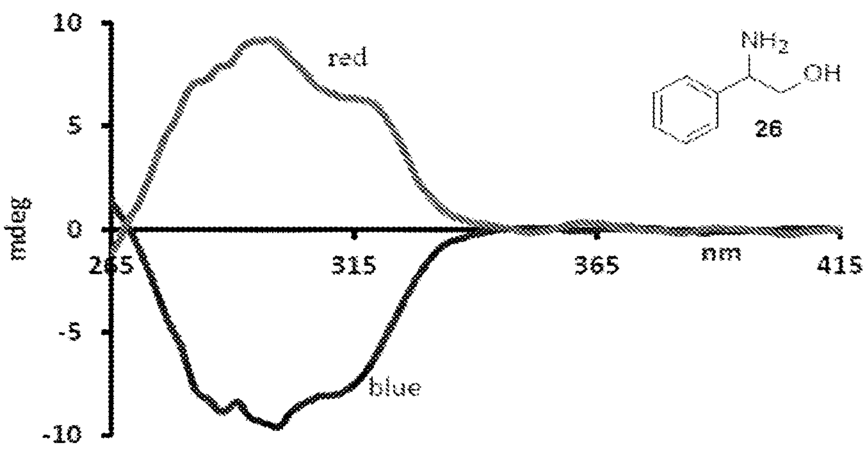
FIG. 47 is the CD spectra of the product of probe 5 with (S)-26 (red) and (R)-26 (blue). CD measurements were taken at 0.13 mM in chloroform.
Figure 48:
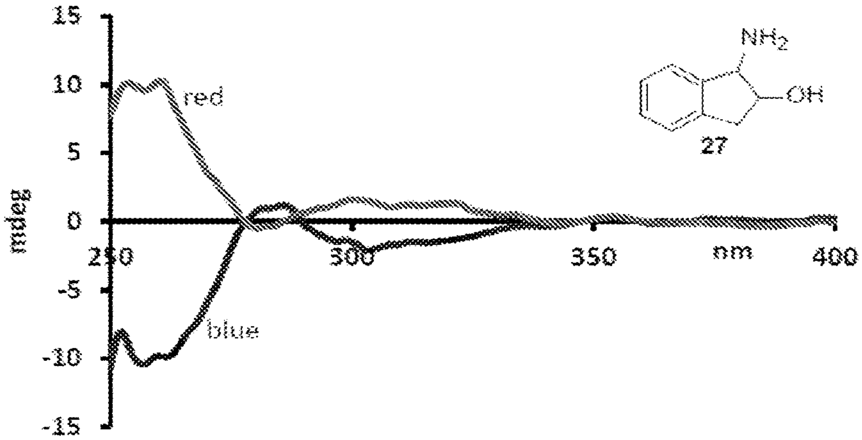
FIG. 48 is the CD spectra of the product of probe 5 with trans-(1S,2S)-27 (red) and trans-(1R,2R)-27 (blue). CD measurements were taken at 0.13 mM in chloroform.
Figure 49:
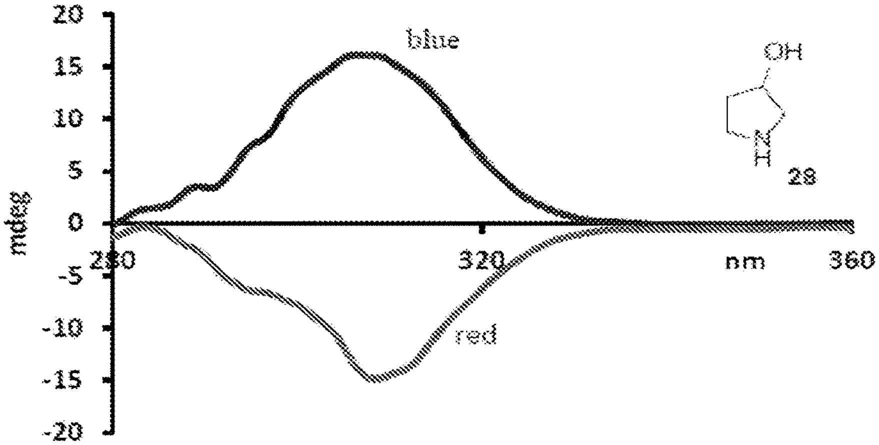
FIG. 49 is the CD spectra of the product of probe 5 with (S)-28 (red) and (R)-28 (blue). CD measurements were taken at 0.13 mM in chloroform.
Figure 50:
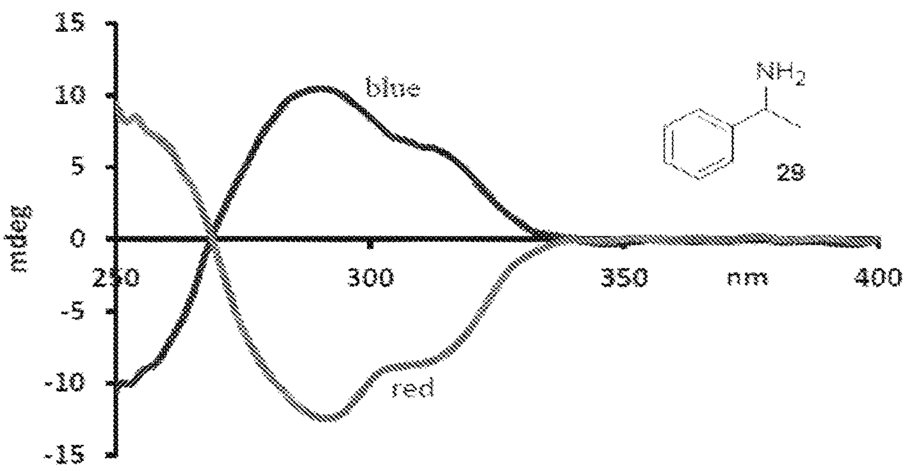
FIG. 50 is the CD spectra of the product of probe 5 with (S)-29 (red) and (R)-29 (blue). CD measurements were taken at 0.25 mM in chloroform.
Figure 51:
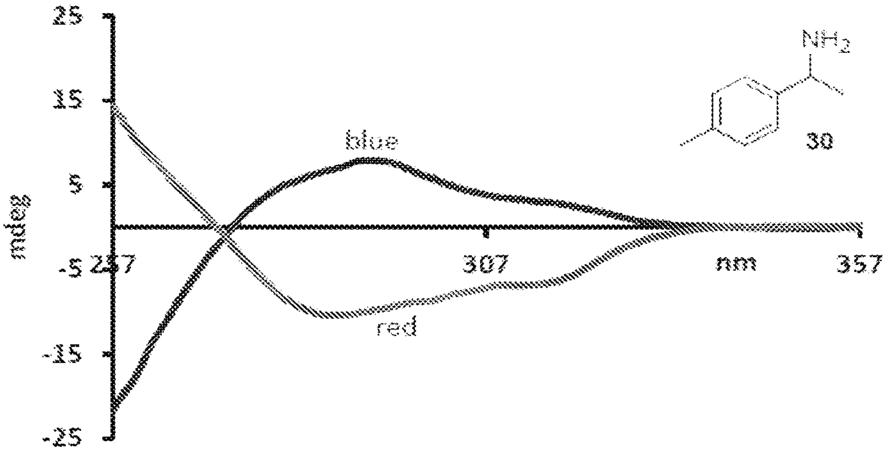
FIG. 51 is the CD spectra of the product of probe 5 with (S)-30 (red) and (R)-30 (blue). CD measurements were taken at 0.25 mM in chloroform.
Figure 52:
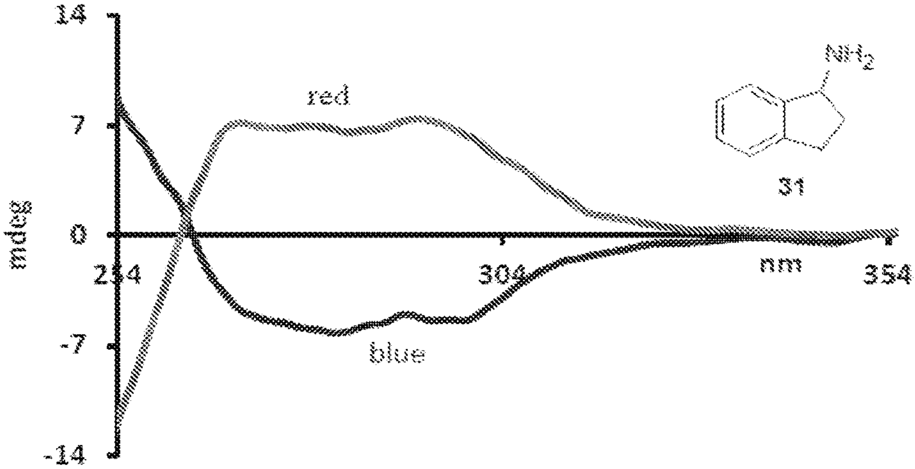
FIG. 52 is the CD spectra of the product of probe 5 with (S)-31 (red) and (R)-31 (blue). CD measurements were taken at 0.25 mM in chloroform.
Figure 53:
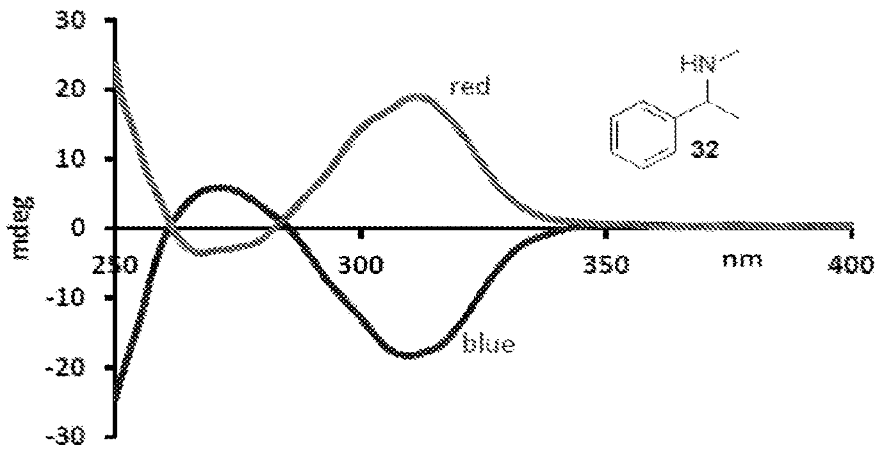
FIG. 53 is the CD spectra of the product of probe 5 with (S)-32 (red) and (R)-32 (blue). CD measurements were taken at 0.25 mM in chloroform.
Figure 54:
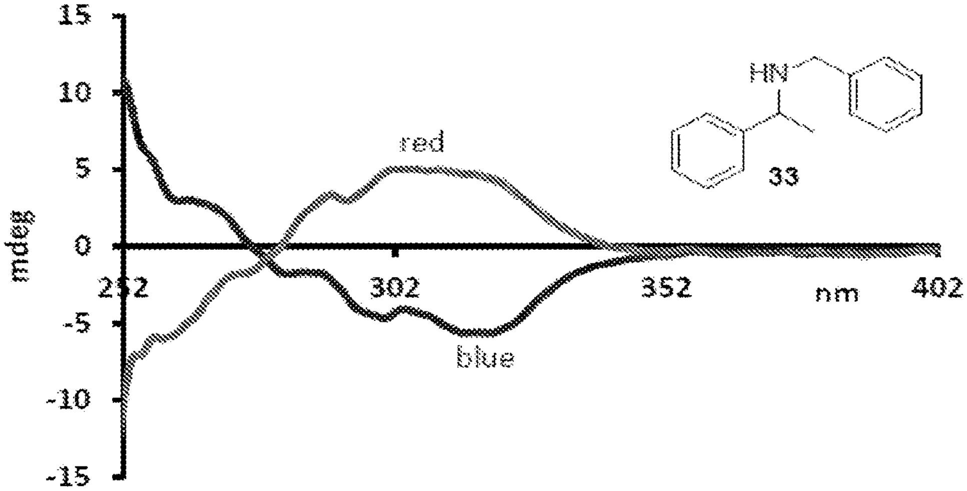
FIG. 54 is the CD spectra of the product of probe 5 with (S)-33 (red) and (R)-33 (blue). CD measurements were taken at 0.25 mM in chloroform.

Solutions containing probe 1, 2, 3, 4 or 5 (25.0 mM) with 1-phenylbutanol (7) (20.0 mM) and DIPEA (40.0 mM) in 1.0 mL of chloroform were stirred for 2 hours and subjected to CD analysis. FIGS. 5-9 show the CD analysis of the product of probes 1, 2, 3, 4, or 5 with (S)-1-phenylbutanol (7), respectively. FIG. 10 shows the UV sensing of probe 4, and the product of probe 4 with (S)-1-phenylbutanol (7). FIG. 11 shows the UV sensing of probe 5, and the product of probe 5 with (S)-1-phenylbutanol (7).

Example 4—Reaction Solvent & CD Solvent

A solution of probe 1 (25.0 mM), 1-phenylbutanol (7) (20.0 mM) and DIPEA (40.0 mM) in 1.0 mL of solvent was stirred for 2 hours and subjected to CD analysis. FIGS. 12-15 show the CD analysis of the product of probe 1 with (S)-1-phenylbutanol (7) in solvents including chloroform, acetonitrile, THF, and dichloromethane.

Reaction performed in hexanes resulted in precipitation. Considering the CD intensity and volatility of solvents, chloroform was selected as the optimal reaction and CD solvent for future studies.

Example 5—Sensing Scope

All CD spectra were collected with a standard sensitivity of 100 mdeg, a data pitch of 0.5 nm, a bandwidth of 1 nm, in a continuous scanning mode with a scanning speed of 500 nm/min and a response of 1 s, using a quartz cuvette (1 cm path length). The data were baseline corrected and smoothed using a binomial equation. The probes and analytes used are shown in FIG. 16.

Probe 1

A solution of probe 1 (25.0 mM), the chiral substrates (20.0 mM) and DIPEA (40.0 mM) in 1.0 mL of chloroform was stirred for 2 hours and subjected to CD analysis. The CD results of the product of probe 1 with chiral analytes 6, 7, 8, 9, 10, 11, 12, 15, 16, 17, 29, and 33 are shown in FIGS. 17-28.

Probe 5

A solution of probe 5 (25.0 mM), chiral alcohols or amines (20.0 mM) and DIPEA (40.0 mM) in 1.0 mL of chloroform was stirred for 2 hours and subjected to CD analysis. The sensing of amino alcohols and diols were performed using probe 5 (33.3 mM), the substrate (13.3 mM) and DIPEA (53.3 mM) in 1.5 mL of chloroform. After sensing for 24 hours, CD analysis was performed after further dilution. The same concentrations and protocol except for DIPEA (39.9 mM) was used for sensing of hydroxy acids.

The CD results of the product of probe 5 with chiral analytes 6, 7, 8, 9, 10, 11, 12, 13, 14, 15, 18, 19, 20, 21, 22, 23, 24, 25, 26, 27, 28, 29, 30, 31, 32, and 33 are shown in FIGS. 29-54.

Example 6—Mechanistic Studies

Sensing Speed

Figure 55:
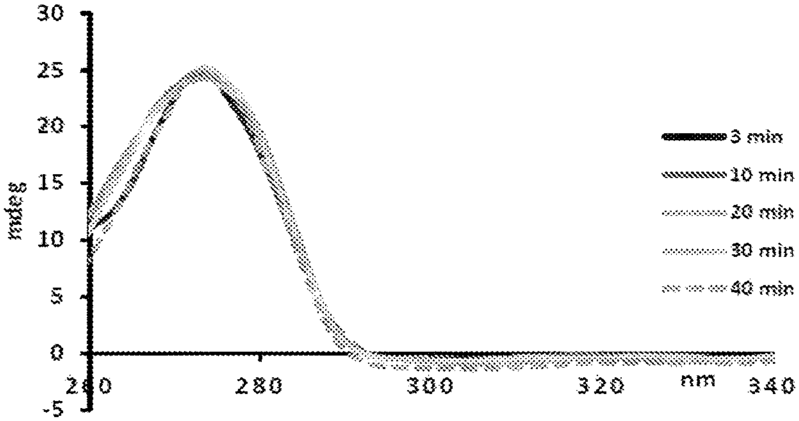
FIG. 55 is the CD spectra of the reaction of probe 1 with 1-phenylethanol (6) at different time intervals.
Figure 56:
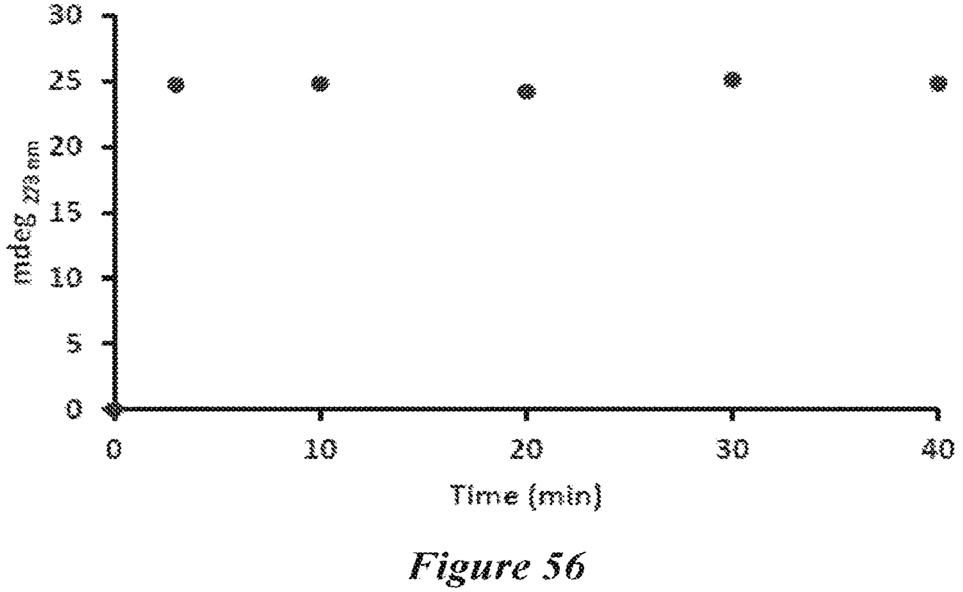
FIG. 56 is a plot of the CD intensity at 273 nm vs time for the reaction of probe 1 with 1-phenylethanol (6).

A solution of probe 1 (25.0 mM), 1-phenylethanol (6) (20.0 mM) and DIPEA (40.0 mM) in 1.0 mL of solvent was stirred and subjected to CD analysis at different time intervals. CD measurements were taken by diluting 60 μL of the reaction mixture with 2 mL of chloroform. FIGS. 55 and 56 show the CD intensity at different time intervals.

ESI-MS Analysis

Figure 57:
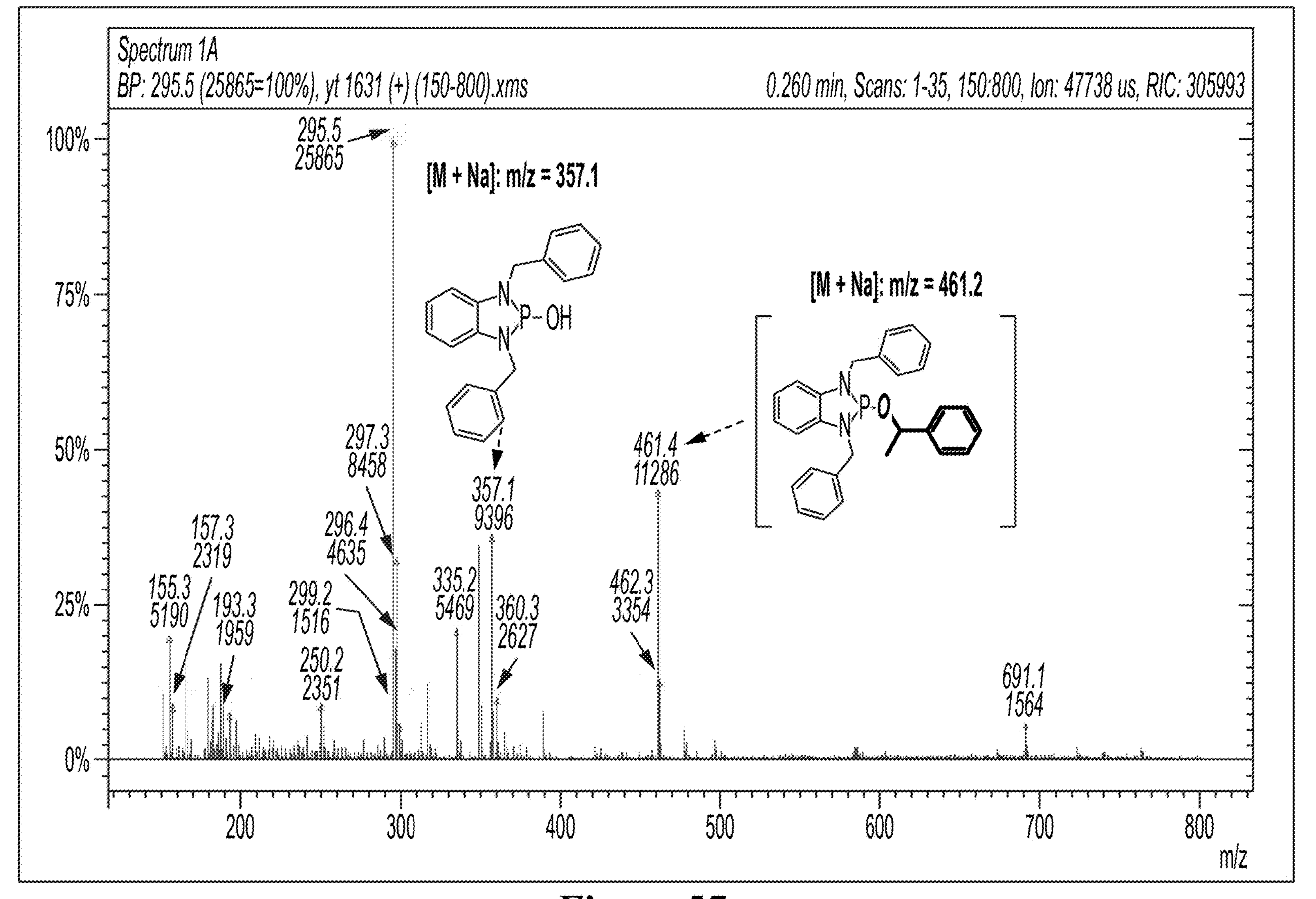
FIG. 57 is the electrospray ionization mass spectrometry (ESI-MS) spectrum of probe 5 with 1-phenylethanol (6) (positive ion mode).

ESI-MS analysis of the reaction between (R)-1-phenylethanol (6) (20 mM) and probe 5 (25 mM) in the presence of DIPEA (40 mM) in 0.5 mL of chloroform was performed. After 2 hours, the reaction mixture was diluted to 10 mL using ACN. An 8.0 μL aliquot of this mixture was diluted to 2 mL with ACN for ESI-MS analysis (FIG. 57).

Figure 58:
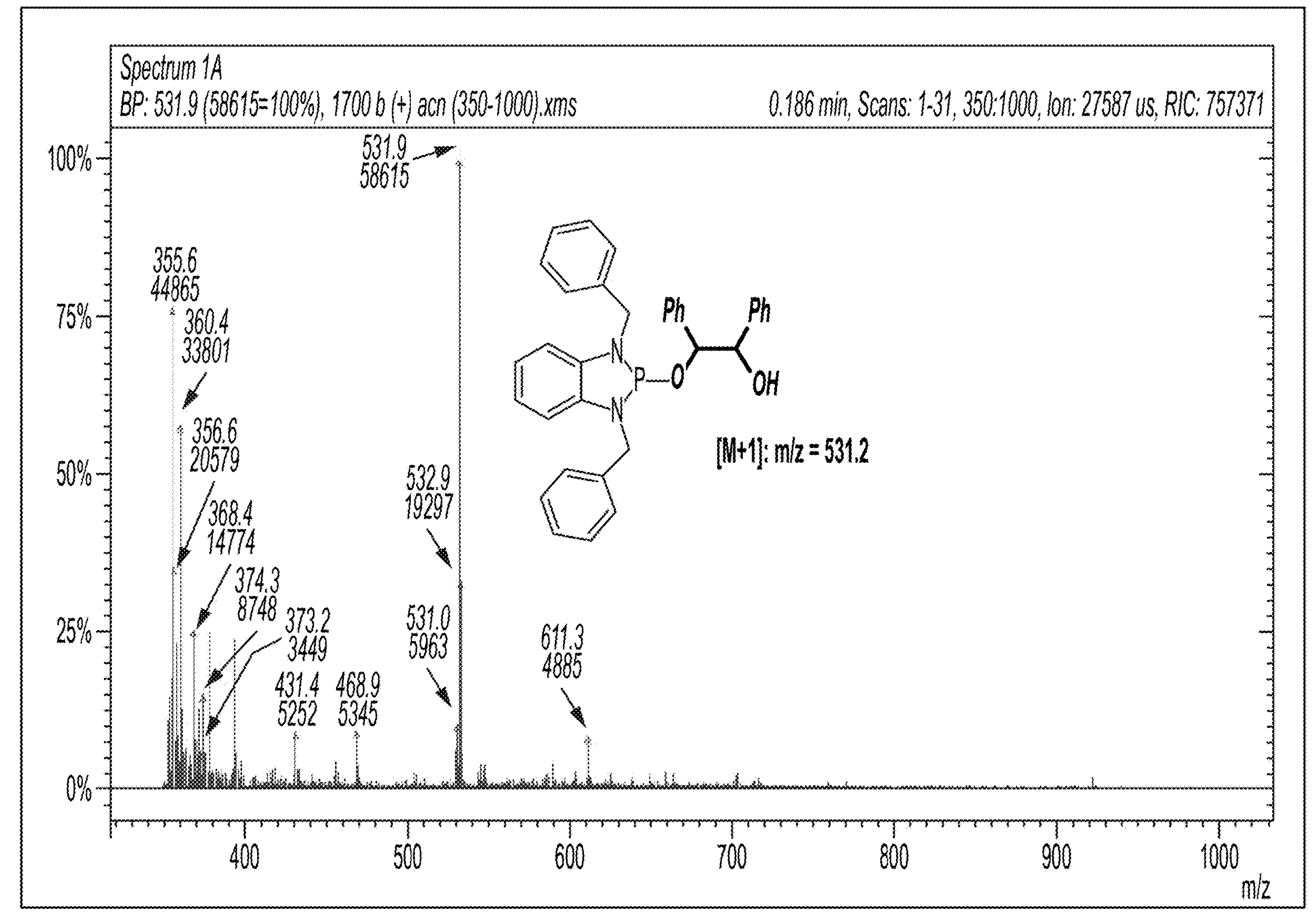
FIG. 58 is the ESI-MS spectrum of probe 5 with (R,R)-hydrobenzoin (19) (positive ion mode).

ESI-MS analysis of the reaction between (R,R)-hydrobenzoin (19) (13.3 mM) and probe 5 (33.3 mM) in the presence of DIPEA (53.3 mM) in 0.75 mL of chloroform was performed. After 2 hours, the reaction mixture was diluted to 10 mL using ACN. An 8.0 μL aliquot of this mixture was diluted to 2 mL with ACN for ESI-MS analysis (FIG. 58).

Figure 59:
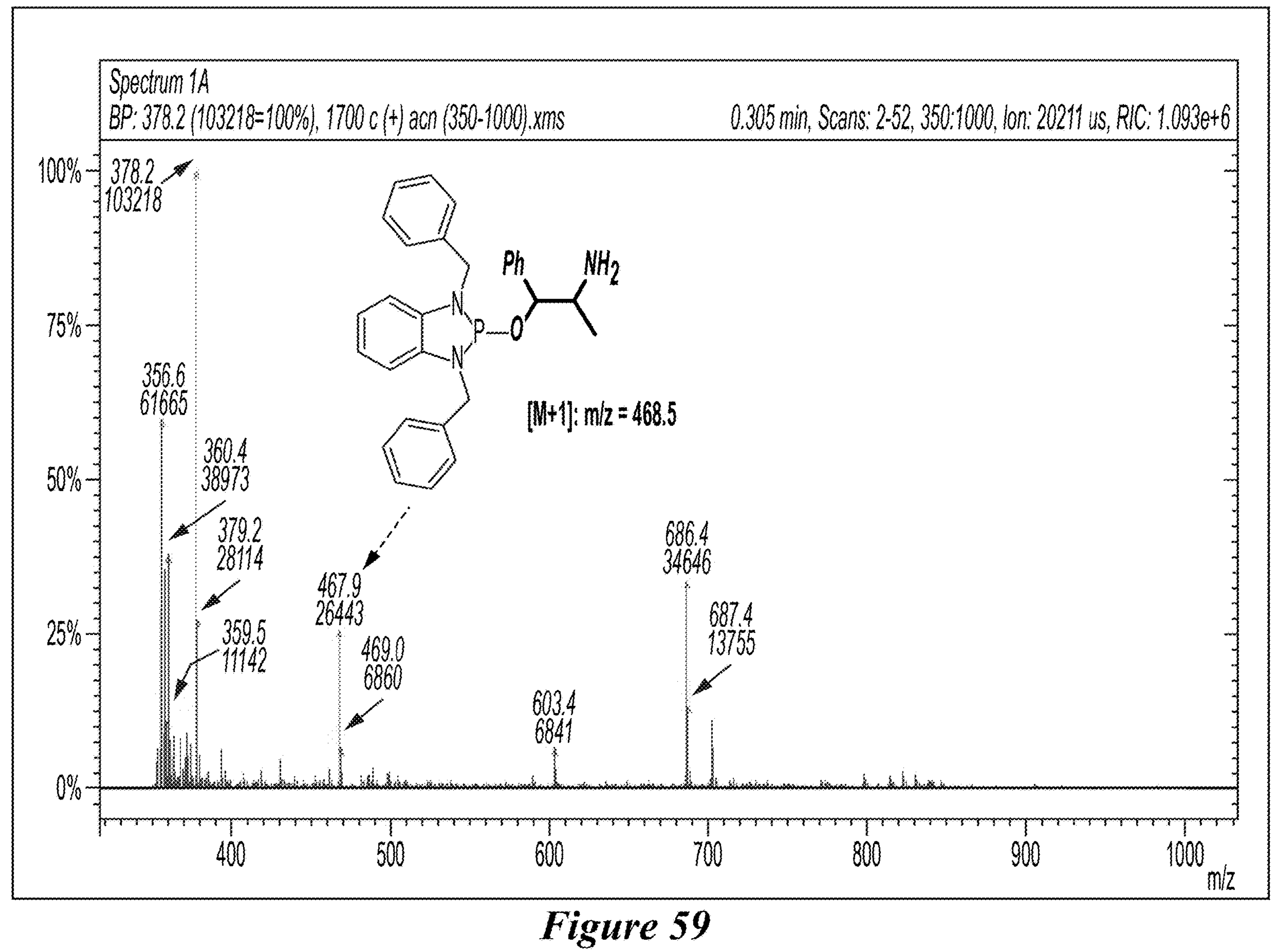
FIG. 59 is the ESI-MS spectrum of probe 5 with (1S,2R)-(−)-norephedrine (25) (positive ion mode).

ESI-MS analysis of the reaction between (1S,2R)-(−)-norephedrine (25) (13.3 mM) and probe 5 (33.3 mM) in the presence of DIPEA (53.3 mM) in 0.75 mL of chloroform was performed. After 2 hours, the reaction mixture was diluted to 10 mL using ACN. An 8.0 μL aliquot of this mixture was diluted to 2 mL with ACN for ESI-MS analysis (FIG. 59).

Figure 60:
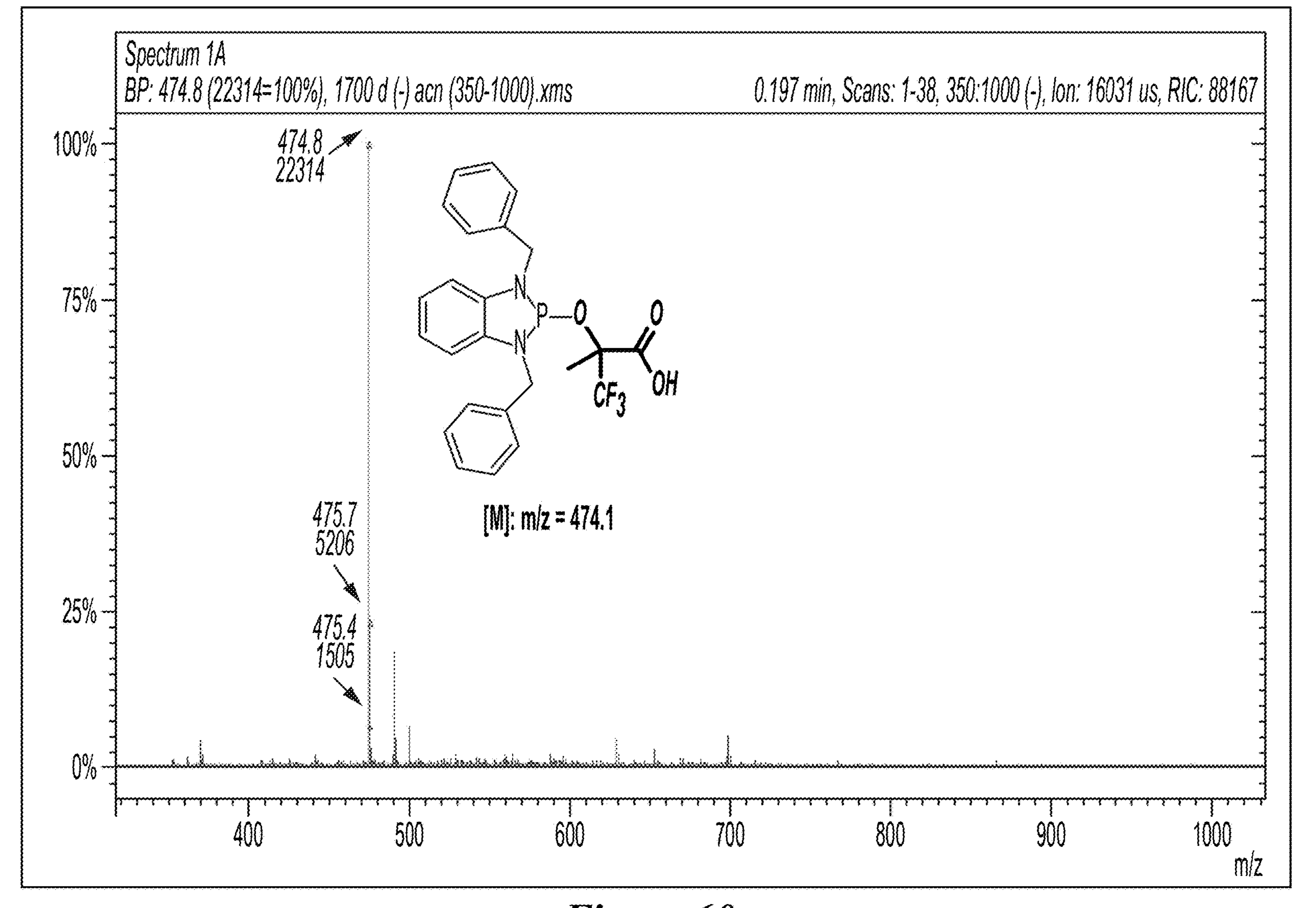
FIG. 60 is the ESI-MS spectrum of probe 5 with (S)-3,3,3-trifluoro-2-hydroxy-2-methylpropionic acid (22) (negative ion mode).

ESI-MS analysis of the reaction between (S)-3,3,3-trifluoro-2-hydroxy-2-methylpropionic acid (22) (13.3 mM) and probe 5 (33.3 mM) in the presence of DIPEA (39.9 mM) in 0.75 mL of chloroform was performed. After 2 hours, the reaction mixture was diluted to 10 mL using ACN. An 8.0 μL aliquot of this mixture was diluted to 2 mL with ACN for ESI-MS analysis (FIG. 60).

Figure 61:
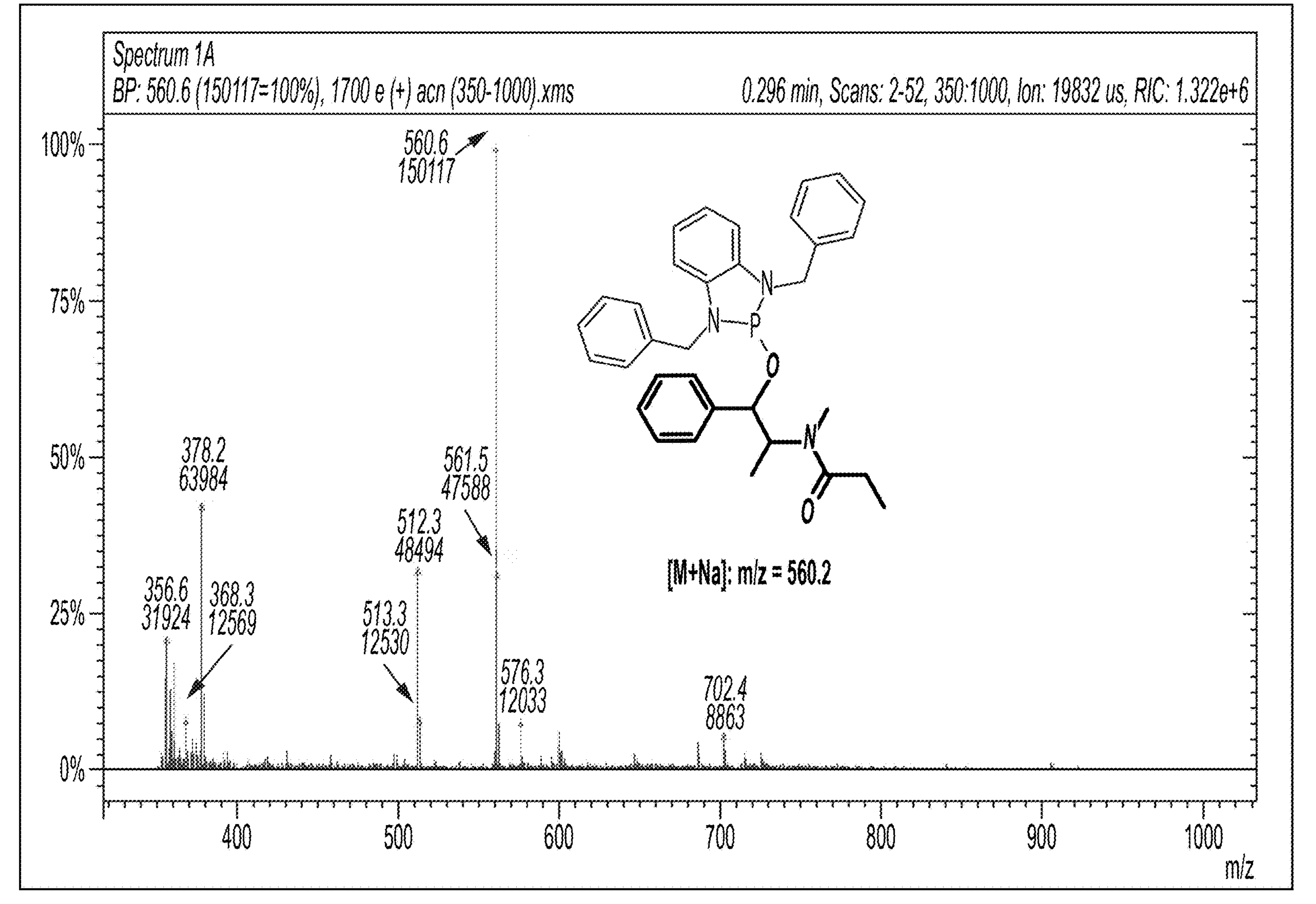
FIG. 61 is the ESI-MS spectrum of probe 5 with (1R,2R)-(−)-pseudoephedrinepropionamide (12) (positive ion mode).

ESI-MS analysis of the reaction between (1R,2R)-(−)-pseudoephedrinepropionamide (12) (20 mM) and probe 5 (25 mM) in the presence of DIPEA (40 mM) in 0.5 mL of chloroform was performed. After 2 hours, the reaction mixture was diluted to 10 mL using ACN. An 8.0 μL aliquot of this mixture was diluted to 2 mL with ACN for ESI-MS analysis (FIG. 61).

Figure 62:
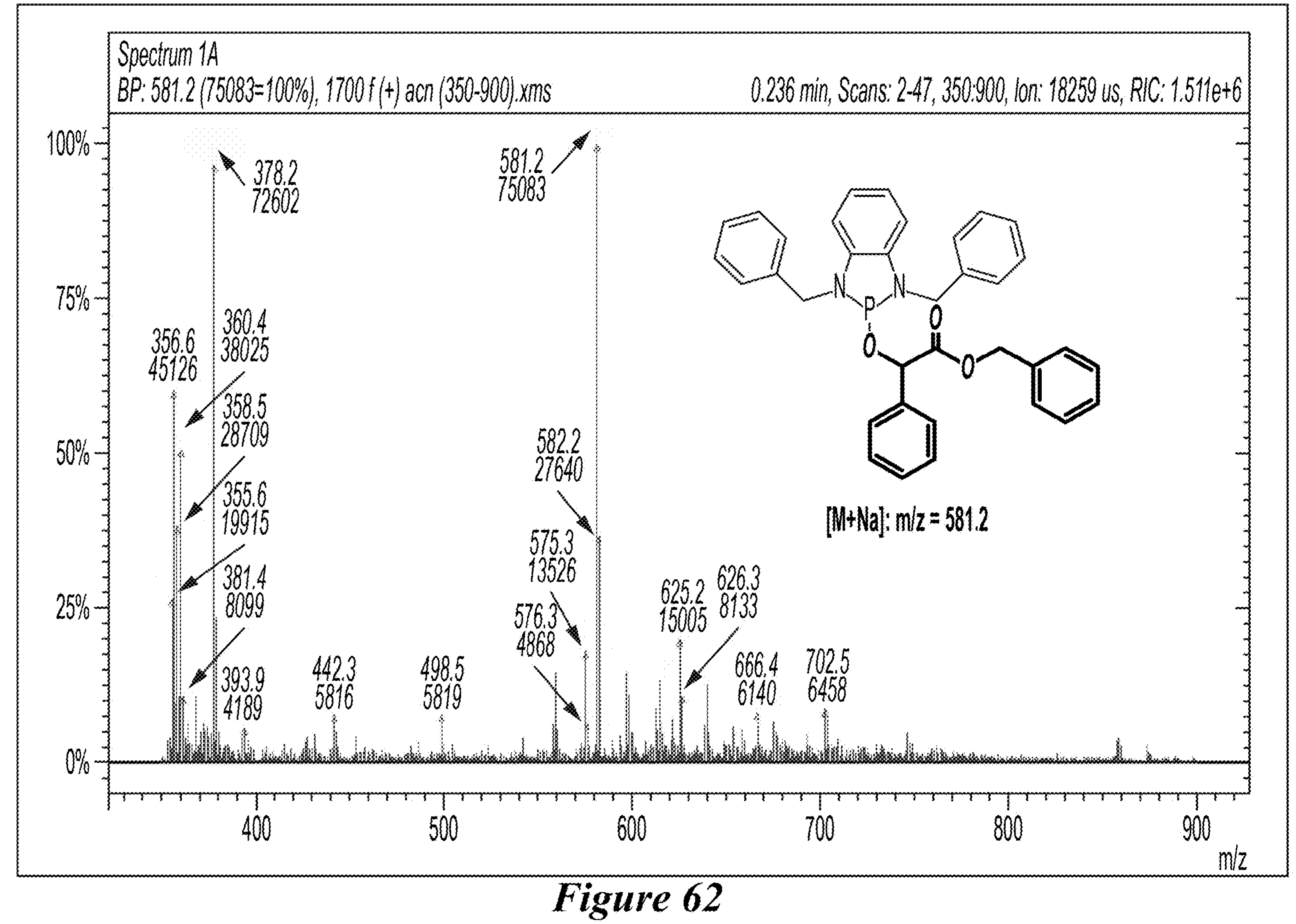
FIG. 62 is the ESI-MS spectrum of probe 5 with (R)-(−)-mandelate (14) (positive ion mode).

ESI-MS analysis of the reaction between benzyl (R)-(−)-mandelate (14) (20 mM) and probe 5 (25 mM) in the presence of DIPEA (40 mM) in 0.5 mL of chloroform was performed. After 2 hours, the reaction mixture was diluted to 10 mL using ACN. An 8.0 μL aliquot of this mixture was diluted to 2 mL with ACN for ESI-MS analysis (FIG. 62).

Example 7—Comprehensive Sensing: Absolute Configuration, Enantiomeric Composition and Total Concentration

Concentration and ee Analysis of 1-phenylethanol (6) Using Probe 5

Scheme 2. Comprehensive sensing of 1-phenylethanol (6) using probe 5

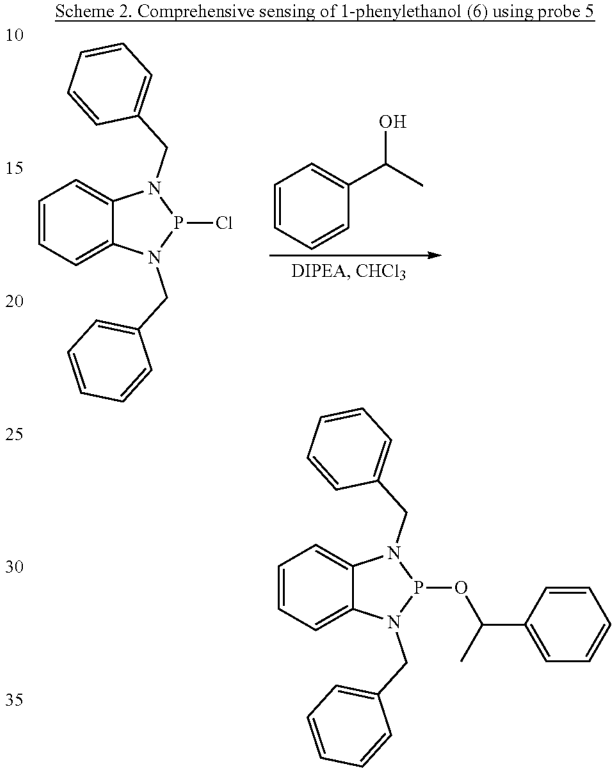

Figure 63:
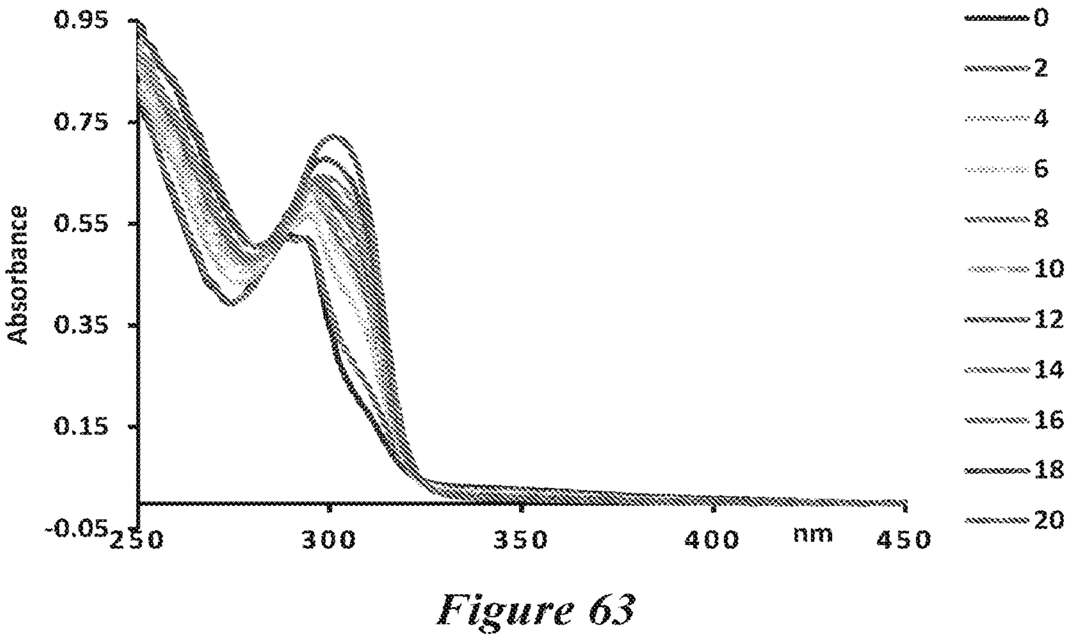
FIG. 63 is the UV spectra obtained from the reaction between probe 5 and varying amounts of (R)-1-phenylethanol (6). (See FIG. 64 for a corresponding absorbance plot.)
Figure 64:
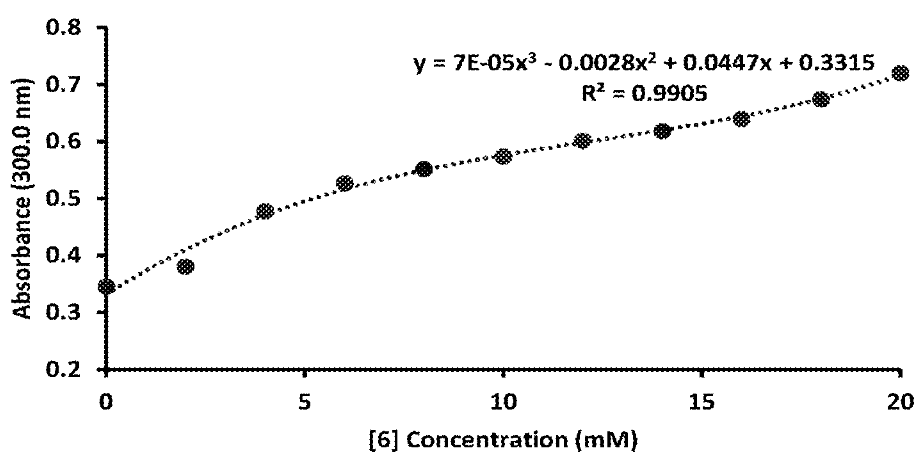
FIG. 64 is a plot of the absorbance at 300.0 nm against the concentration of (R)-1-phenylethanol (6).

The change in the UV absorbance of probe 5 upon (R)-1-phenylethanol (6) sensing was analyzed. Probe 5 (25.0 mM) and (R)-1-phenylethanol (6) in varying concentrations (0.0-20.0 mM) were dissolved in the presence of DIPEA (40.0 mM) in 1.0 mL of chloroform under inert atmosphere and the solution was stirred for 2 hours (see Scheme 2). An aliquot of 10 L was diluted with chloroform (2.0 mL) and the mixture was subjected to UV analysis. The UV absorbance at 300 nm increased as the concentration of (R)-1-phenylethanol (6) in the original samples changed from 0 to 20 mM (FIG. 63). The UV absorbance change at 300.0 nm was plotted against concentration (mM) of (R)-1-phenylethanol (6) (FIG. 64).

Figure 65:
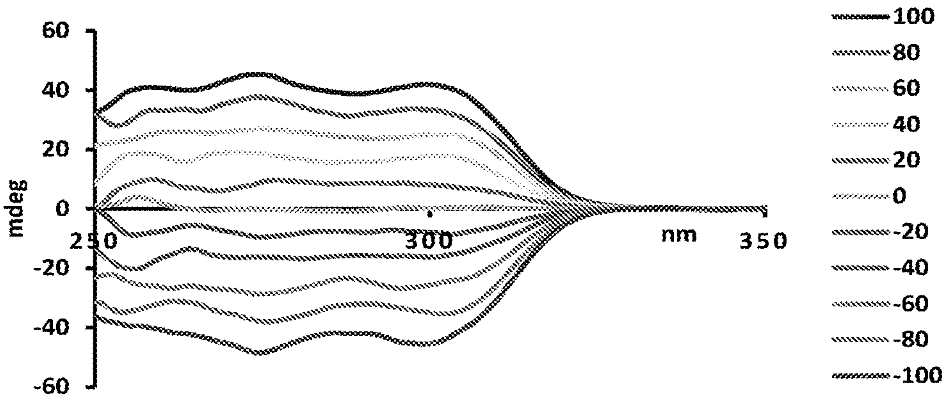
FIG. 65 is the chiroptical response of probe 5 to scalemic samples of 1-phenylethanol (6). (See FIG. 66 for a corresponding CD amplitude plot.)
Figure 66:
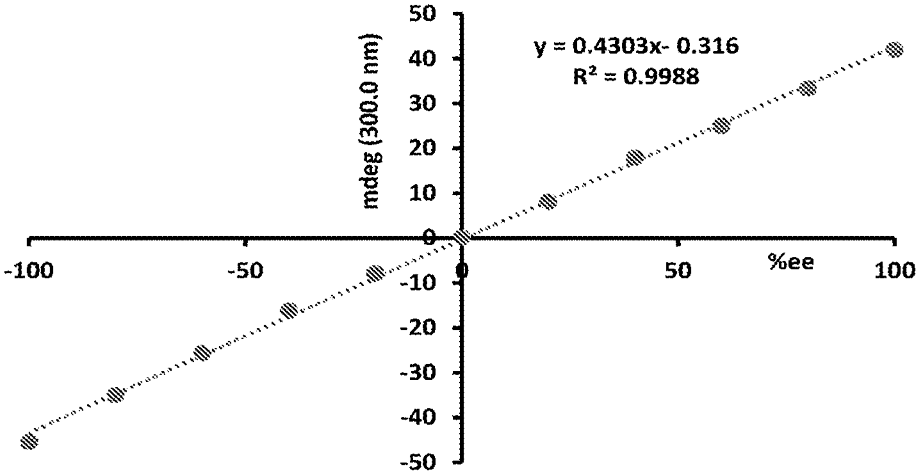
FIG. 66 is the plot of the CD amplitudes at 300 nm versus sample % ee of the product of probe 5 to scalemic samples of 1-phenylethanol (6).

A calibration curve was constructed using samples containing 1-phenylethanol (6) with varying enantiomeric composition. Probe 5 (25.0 mM) and 1-phenylethanol (6) (20.0 mM) with varying ee's (+100, +80, +60, +40, +20, 0, −20, −40, −60, −80, −100%) were dissolved in the presence of DIPEA (40.0 mM) in 1.0 mL of chloroform. After 2 hours, CD analysis was carried out by diluting 30 μL of the reaction mixture with chloroform (2.0 mL) (FIGS. 65 and 66).

Enantiomeric Ratio and Absolute Configuration Determination of 1-Phenylethanol (6)

Five samples containing 1-phenylethanol (6) with varying ee's were prepared in 1.0 mL of chloroform and subjected to simultaneous analysis of the enantiomeric excess and absolute configuration using probe 5 (25.0 mM). CD spectra were obtained as described above. The enantiomeric excess was calculated using Equation 1 below. The absolute configuration was determined using the sign of the Cotton effect.

$$\text{Concentration of 1-phenylethanol} = x \text{ (in mM)} \qquad \text{(Equation 1)}$$

Enantiomeric excess of 1-phenylethanol =

$$\%\ ee = \frac{\left(\frac{(mdeg \times 20)}{x} + 0.316\right)}{0.4303}$$

Concentration and Er Analysis of 1-Phenylethanol (6) Using CD Probe 1 and p-Anisidine as UV Indicator Several indicators were screened for this assay and the most distinct UV change and shortest reaction time was obtained with p-anisidine.

Scheme 3. Comprehensive sensing of 1-phenylethanol (6) using probe 1 and p-anisidine

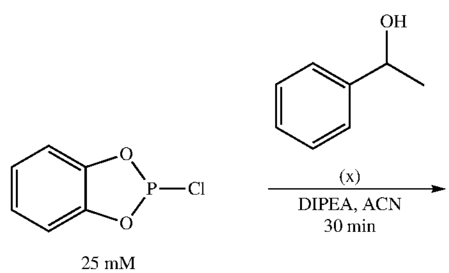

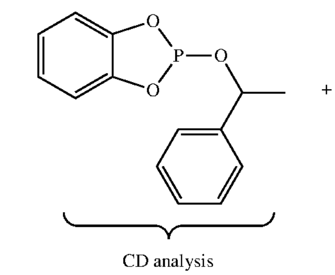

CD analysis

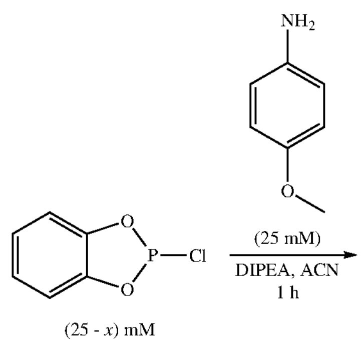

-continued

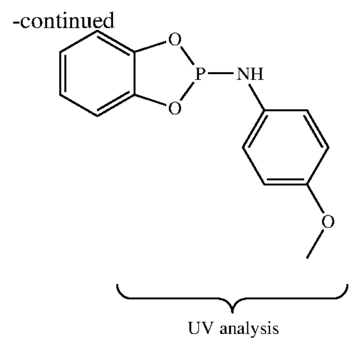

UV analysis

Figure 67:
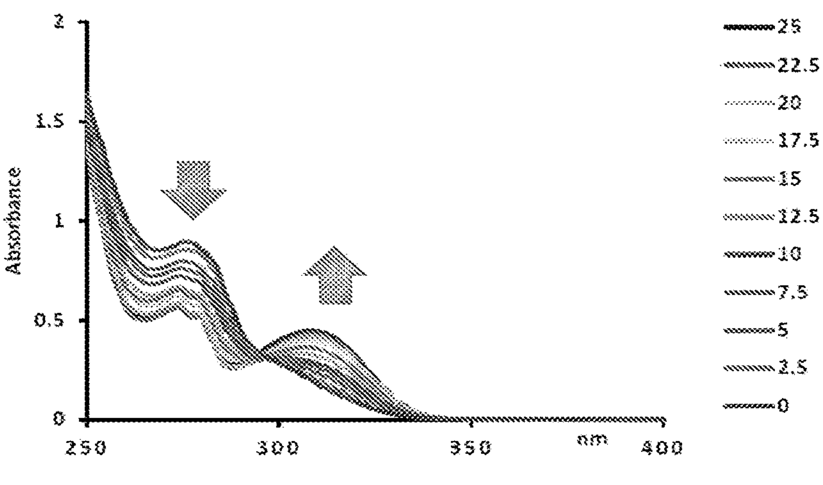
FIG. 67 is UV response of probe 1 to different concentrations of 1-phenylethanol (6). (See FIG. 68 for a corresponding absorbance plot.)
Figure 68:
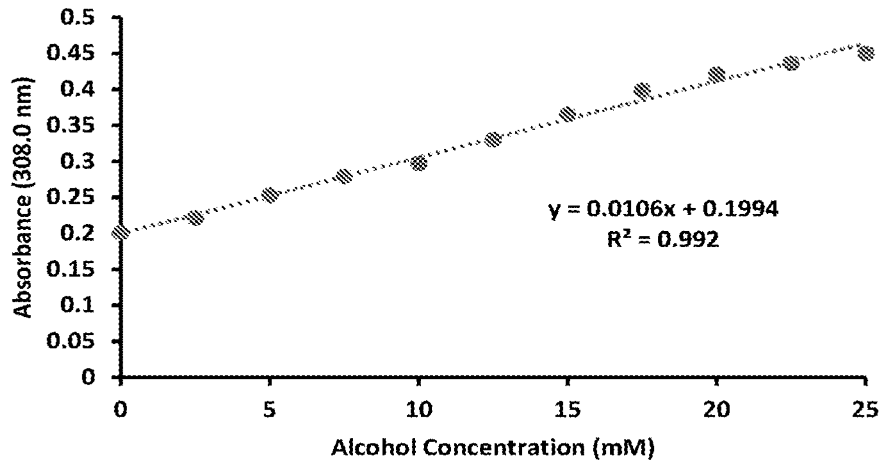
FIG. 68 is a plot of the UV absorbance at 308.0 nm versus sample concentration of 1-phenylethanol (6).

The change in the UV absorbance of probe 1 upon (R)-1-phenylethanol (6) sensing was analyzed. Probe 1 (25.0 mM) and (R)-1-phenylethanol (6) in varying concentrations (0.0-25.0 mM) were dissolved in the presence of DIPEA (40.0 mM) in 1.0 mL of acetonitrile under inert atmosphere and the solution was stirred for 30 minutes. p-Anisidine (25.0 mM) was then added as an indicator and the solution was stirred for another hour. An aliquot of 20 μL was diluted with acetonitrile (2.0 mL) and the mixture was subjected to UV analysis (see Scheme 3). The UV absorbance at 308.0 nm increased as the concentration of (R)-1-phenylethanol (6) in the original samples changed from 0 to 25 mM (FIG. 67). The UV absorbance change at 308.0 nm was plotted against concentration (mM) of (R)-1-phenylethanol (6) (FIG. 68).

Figure 69:
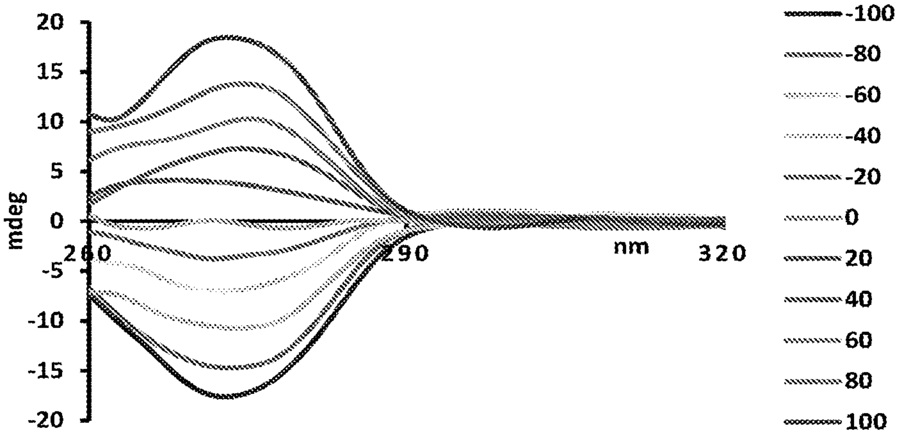
FIG. 69 is the chiroptical response of probe 1 to scalemic samples of 1-phenylethanol (6). (See FIG. 70 for a corresponding CD amplitude plot.)
Figure 70:
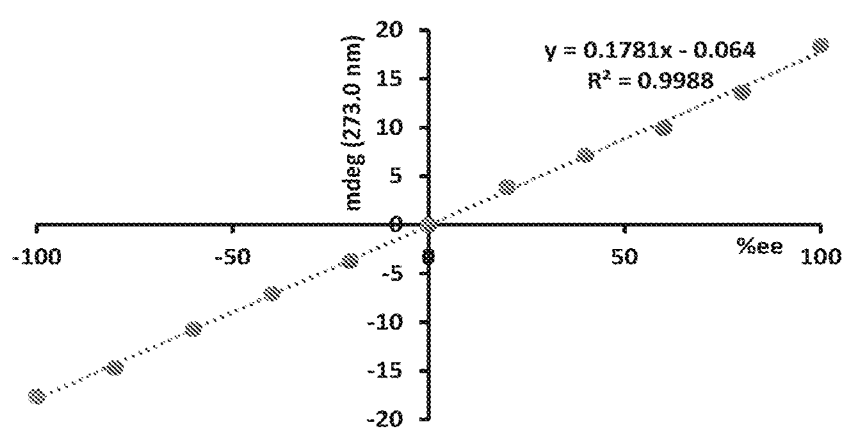
FIG. 70 is the plot of the CD amplitude at 273.0 nm versus sample % ee for the reaction of probe 1 to scalemic samples of 1-phenylethanol (6).
Figure 71A:
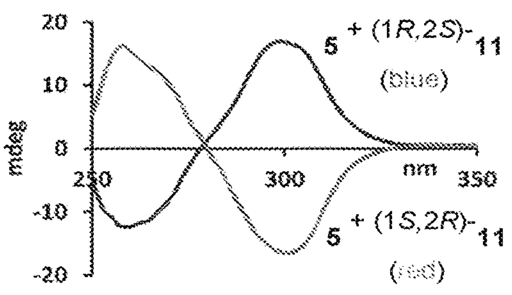
FIGS. 71A-71H shows the representative CD responses of probes 1 and 5 to alcohols, hydroxy acids, amino alcohols and amines (see FIG. 16 for compound structures). The CD responses are shown for the reactions of probe 5 with compound 11 (FIG. 71A); probe 1 with compound 12 (FIG. 71B); probe 5 with compound 14 (FIG. 71C); probe 5 with compound 18 (FIG. 71D); probe 5 with compound 22 (FIG. 71E); probe 5 with compound 28 (FIG. 71F); probe 1 with compound 29 (FIG. 71G); and probe 5 with compound 32 (FIG. 71H). All measurements were performed at 0.13-0.40 mM in chloroform.
Figure 71B:
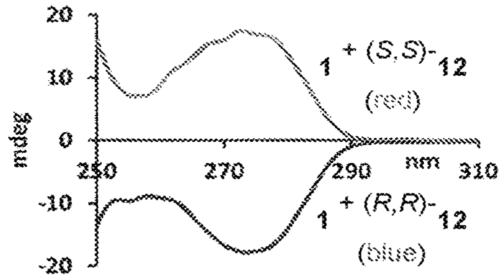
Figure 71C:
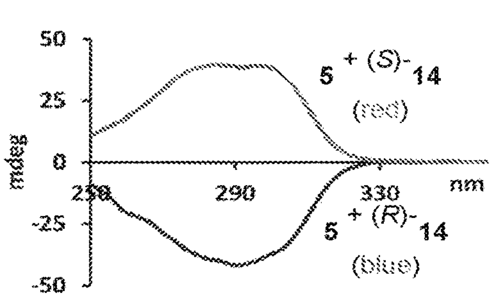
Figure 71D:
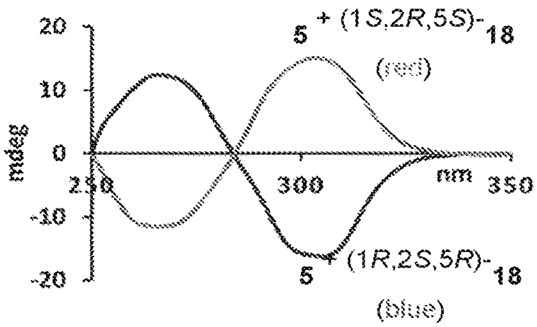
Figure 71E:
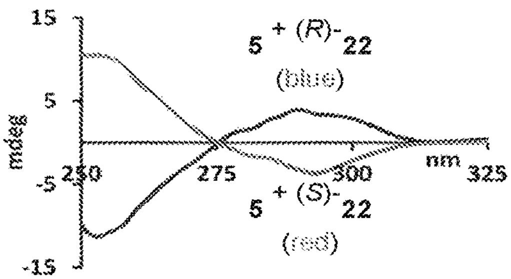
Figure 71F:
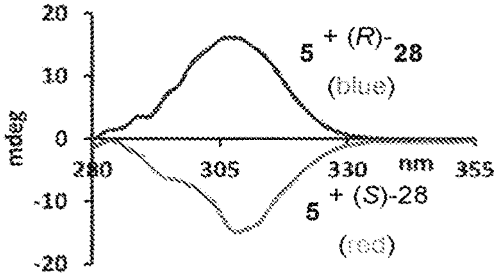
Figure 71G:
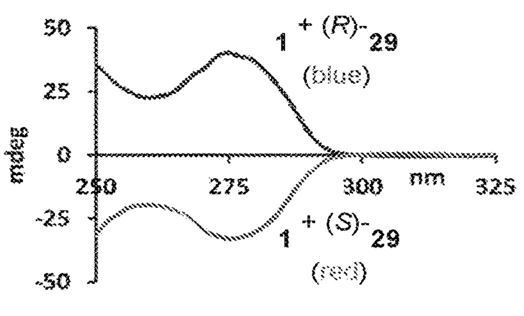
Figure 71H:
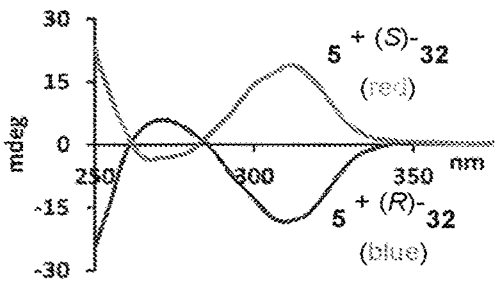

A calibration curve was constructed using samples containing 1-phenylethanol (6) with varying enantiomeric composition. Probe 1 (25.0 mM) and 1-phenylethanol (6) (20.0 mM) with varying ee's (+100, +80, +60, +40, +20, 0, −20, −40, −60, −80, −100%) were stirred in 1.0 mL of acetonitrile for 30 minutes. p-Anisidine (25.0 mM) was then added as indicator and the solution was stirred for another hour. An aliquot of 65 μL was diluted with chloroform (2.0 mL) and the mixture was subjected to CD analysis (FIG. 69). The CD intensity at 273.0 nm was plotted against the enantiomeric excess of 1-phenylethanol (6) (FIG. 70).

Simultaneous Ee and Concentration Determination Using Probe 1

Seven scalemic samples of 1-phenylethanol (6) at varying concentrations in acetonitrile were prepared and subjected to simultaneous analysis of the concentration, enantiomeric excess and absolute configuration using probe 1 (see Table 2 infra). First, a UV spectrum was obtained as described above and the concentration was calculated using Equation 2 below using the regression analysis of the intensities at 308.0 nm (FIG. 68). Then, a CD spectrum was obtained as described above. The linear regression of the relevant intensities at 273.0 nm (FIG. 70) were applied in Equation 3 below to determine the enantiomeric composition. The absolute configuration was determined based on the sign of the Cotton effect.

(Equation 2)

Concentration of 1-phenylethanol (in mM) =

$$x = \frac{(y - 0.1994)}{0.0106}$$

(Equation 3)

Enantiomeric excess of 1-phenylethanol =

$$\%\ ee = \frac{\left(\frac{(mdeg \times 20)}{x} + 0.064\right)}{0.1781}$$

Discussion of Examples 1-7

To date, a wide range of optical chirality assays operating on the principles of dynamic covalent chemistry, in particular systems involving reversible Schiff base formation, or metal coordination, multicomponent assemblies, host-guest complexation, hydrogen bonding interactions and irreversible substrate binding have surfaced (Herrera et al., *J. Am. Chem. Soc.* 140:10385-10401 (2018), which is hereby incorporated by reference in its entirety). Stereochemical analysis with a phosphite or amidophosphite probe has not previously been demonstrated. It was envisioned that fast binding of alcohol substrates with aromatic chlorophosphite probes 1-5 would be possible and would enable complicated stereochemical sensing tasks e.g., allowing simultaneous determination of the concentration and enantiomeric composition/absolute configuration of small sample amounts and would also be compatible with high-throughput multi-well plate technology (see FIG. 16). Although initial focus was placed on the challenging group of alcohols 6-18, the possibility of optical sensing of diols and hydroxy acids 19-22, amino alcohols 23-28 and amines 29-33 (see FIG. 16) was also investigated.

The chlorobenzodioxaphosphite 1 was commercially available and the analogues 2-4 were prepared in a single step from the corresponding diols and phosphorous trichloride. The N,N'-dibenzyl chlorobenzodiazaphophite 5 was synthesized in three high-yielding steps as shown in Scheme 1 supra. The ability of the sensors 1-5 to differentiate between the enantiomers of 1-phenylethanol, 6, and 1-phenylbutanol, 7, was then tested under various conditions. All probes generated CD signals that are easily obtained by mixing stoichiometric amounts of the chlorophosphite and the analyte in the presence of diisopropylethylamine. The phosphite formation was verified with several substrates by ESI-MS analysis. Importantly, the sensing reaction is very fast, it is complete within 3 minutes and readily occurs in common organic solvents, including $CHCl_3$, $CH_2Cl_2$, THE and ACN, at room temperature which underscores the potential of this sensing assay in high-throughput screening applications.

Encouraged by these initial findings, the suitability of the chloroamidophosphite 5 was tested for enantioselective recognition and analysis of the enantiomeric ratio of samples with various amounts of 6 (see Table 1 infra). In all cases, the formation of the amidophosphite 37 allowed correct identification of the absolute configuration of the major enantiomer by comparison with a reference sample and determination of the enantiomeric composition of the non-racemic samples with high accuracy. For example, the sensing of the samples containing the (R)- and (S)-6 in a 95.0:5.0 and 35.0:65.0 ratio gave 94.6:5.4 and 34.9:65.1, respectively, entries 1 and 4.

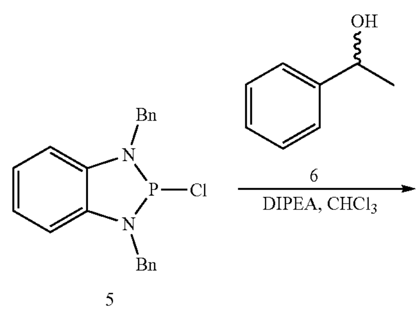

5

-continued

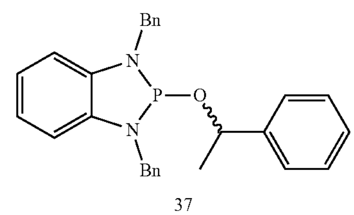

37

TABLE 1

Chiroptical determination of the enantiomeric ratio and absolute configuration of samples of 1-phenylethanol, 6, using probe 5.

| | Actual composition | | | Sensing results | |
|---|---|---|---|---|---|
| Entry | Concentration (mM) (x) | Abs config. | er | Abs config.[a] | er[b] |
| 1 | 5 | R | 95.0:5.0 | R | 94.6:5.4 |
| 2 | 10 | S | 15.0:85.0 | S | 18.8:81.2 |
| 3 | 15 | R | 75.0:25.0 | R | 78.3:21.7 |
| 4 | 18 | S | 35.0:65.0 | S | 34.9:65.1 |
| 5 | 19 | R | 95.0:5.0 | R | 95.5:4.5 |

[a]Based on the sign of the induced Cotton effects.

[b]The er was calculated based on the CD signal at 300 nm.

The evaluation of the substrate scope was further continued by applying the standard sensing protocol with probes 1 and 5 to a large variety of alcohols 6-18 including aliphatic substrates and natural products such as menthol and isopulegol. In all cases, it was found that the alcohol binding induces a characteristic CD signal that can be utilized for enantioselective analysis. Representative sensing results with 11, 12, 14 and 18 are shown in FIGS. 71A-71D. Based on the general usefulness with mono-alcohols, it was expected that the application spectrum of our sensors would extend to other important target compounds and therefore the chiroptical assay was applied to the diols, hydroxy acids, amino alcohols and amines 19-33. Again, a smooth phosphite formation was observed under mild conditions in the presence of base and simultaneous induction of strong chiroptical signals at submillimolar concentrations, representative examples are shown in FIGS. 71E-71H. The successful testing with a total of 28 structurally diverse analytes demonstrates that chirality sensing with aromatic chlorophosphites is broadly useful and a practical tool for the determination of the absolute configuration and enantiomeric composition of several compound classes.

To develop a robust optical assay that can accomplish on-the-fly sensing of the enantiomeric ratio and total concentration of chiral compounds the tandem use of sensor 1 and aniline derived UV indicators was explored. The general concept of this relay assay is shown in Scheme 4 below.

Scheme 4. Workflow of the comprehensive UV/CD sensing of 1-phenylethanol using probe 1 and p-anisidine as indicator. Chiroptical probe responses are shown in FIGS. 67-70 (FIGS. 67 and 68: UV response at 308 nm to different concentrations of 1-phenylethanol in the prescence of sensor 1 and the indicator; FIGS. 69 and 70: CD response of probe 1 at 273 nm to scalemic samples of 1-phenylethanol).

Relay assay workflow

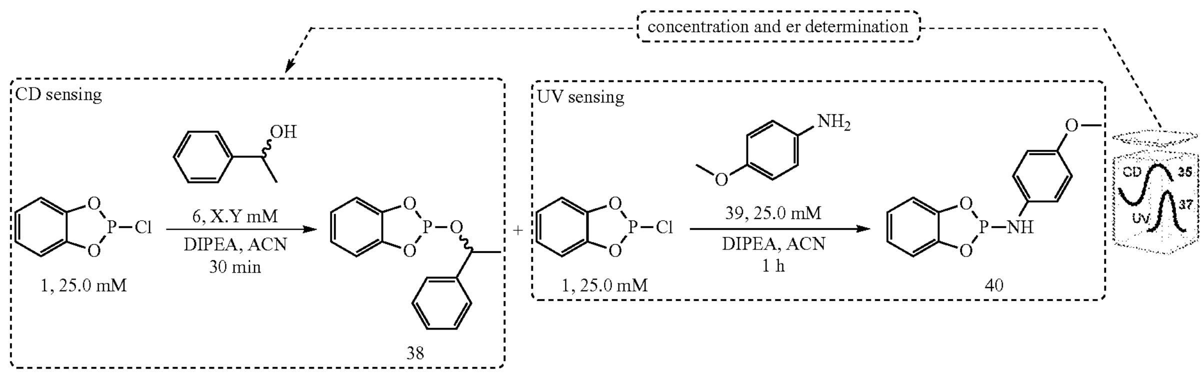

First, the phosphite formation of an unknown amount of the alcohol substrate that may be present in up to 25.0 mM with a full equivalent of 1 matching the maximal possible analyte concentration is used for the determination of the absolute configuration and enantiomeric ratio via CD analysis as described above. The remaining excess of unreacted 1 is then captured with an aniline indicator to generate a quantifiable UV signal that is correlated to the original analyte concentration. Several candidates were screened for this purpose and the shortest reaction time together with a distinct UV change that can be used for accurate determination of the original alcohol amount were obtained with para-anisidine indicator 39. This chiroptical sensing workflow was first tested with samples containing the alcohol 6 in varying amounts and enantiomeric ratios to quantitatively correlate the variation in the corresponding chiroptical readouts to the change of the analyte concentration and er. Having established the relay flow, the comprehensive sensing analysis of several alcohol mixtures was then attempted. The samples were subsequently treated with the chlorophosphite and the aniline probe and the resulting mixtures containing 38 (probe bound to analyte) and 40 (probe bound to indicator) in varying quantities were then subjected to CD/UV analysis (see Table 2 below).

TABLE 2

Simultaneous chiroptical sensing of the concentration, absolute configuration and enantiomeric ratio of nonracemic samples of 6

| | Actual composition | | | Sensing results | | |
|---|---|---|---|---|---|---|
| Entry | Concentration (mM) | Abs config. | er | Conc.[a] (mM) | Abs config[b] | er[c] |
| 1 | 6.0 | S | 83.4:16.6 | 6.2 | S | 84.1:15.9 |
| 2 | 10.0 | S | 85.0:15.0 | 9.9 | S | 82.9:17.1 |
| 3 | 13.0 | R | 25.0:75.0 | 13.8 | R | 22.3:77.7 |
| 4 | 16.0 | S | 71.9:28.1 | 15.6 | S | 67.5:32.5 |
| 5 | 18.0 | R | 33.3:66.7 | 18.6 | R | 34.1:65.9 |
| 6 | 20.0 | S | 62.5:37.5 | 20.5 | S | 61.8:38.2 |
| 7 | 24.0 | S | 97.9:2.1 | 22.5 | S | 96.9:3.1 |

[a]Based on the UV change at 308 nm.
[b]Based on the sign of the induced Cotton effects.
[c]The er was calculated based on the CD amplitude measured at 273 nm.

The results prove that the optical relay sensing concept is very reliable and generates accurate concentration and er data. The analysis of a nonracemic solution of 6 with an S:R ratio of 83.4:16.6 and a total concentration (both enantiomers combined) of 6.0 mM gave 84.1:15.9 and 6.2 mM, see entry 1. The sensing of other mixtures with vastly different amounts and enantiomeric compositions was also successful and relatively small error margins that are acceptable for high-throughput screening purposes were obtained, entries 2-7. The recording of CD and UV spectra can be accomplished simultaneously by modern CD spectrophotometers which takes full advantage of the inherent speed of the underlying reactions and the continuous relay workflow.

In summary, introduced in this application are a new class of chiroptical probes and a relay assay sensing strategy that enable accurate on-the-fly stereochemical analysis of monoalcohols, diols, hydroxy acids, amines and amino alcohols—a variety that stands out among previously reported UV, fluorescence and CD assays. The chlorophosphite CD probes 1-5 and several aniline derived UV indicators were evaluated and the commercially available chlorobenzodioxaphosphite and para-anisidine were combined into a continuous sensing workflow. The practicality of this approach and the accuracy of the chiroptical concentration and enantiomeric ratio analysis were demonstrated with seven 1-phenylethanol samples. If desired, this assay can be easily adapted to high-throughput equipment and multiwell plate technology which would allow fully automated operation and simultaneous screening of hundreds of samples in parallel Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. An analytical method comprising:

providing a sample containing a chiral analyte that can exist in stereoisomeric forms;

providing a probe selected from the group consisting of aryl halophosphites, halodiazaphosphites, arylchlorophosphines, dinitrofluoroarenes, arylsulfonyl chlorides, and coumarin-derived Michael acceptors;

providing an indicator;

contacting the sample with an excess of the probe under conditions to permit irreversible covalent binding of the probe to the chiral analyte present in the sample;

contacting the sample with the indicator under conditions to permit covalent binding of the indicator to the excess probe that is not bound to the chiral analyte;

first determining, based on binding that occurs between the chiral analyte and probe, an absolute configuration of the analyte in the sample and/or an enantiomeric composition of the analyte in the sample using a chiroptical technique; and second determining, based on binding that occurs between the indicator and probe, a concentration of the chiral analyte in the sample using a non-chiroptical technique.

2. The analytical method of claim 1, wherein the probe is selected from the group consisting of:

(A) an aryl halophosphite of Formula I:

I

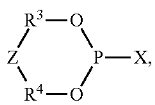

wherein X is a halogen; and (i) wherein:

$R^3$ and $R^4$ are each independently an aryl or heteroaryl, wherein the aryl or heteroaryl is optionally substituted with one or more groups selected from -alkyl, —O-alkyl, —N-alkyl, -alkenyl, -alkynyl, —O-aryl, —O-perfluoroaryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl; and Z is selected from the group consisting of a bond, —C(O)—, —O—, —$NR_a$—, —S—, and —$CH_2$—, wherein $R_a$ is H, alkyl, aryl, or heteroaryl; or (ii) wherein:

$R^3$ and $R^4$, together with the carbon atoms to which they are attached, form a monocyclic or bicyclic ring system selected from the group consisting of cycloalkyl, heterocycloalkyl, aryl, and heteroaryl, wherein the ring system is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl; and Z is absent;

(B) a halodiazaphosphite of Formula II:

II

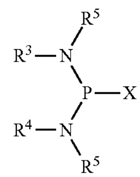

wherein:

X is a halogen;

$R^3$ and $R^4$:

(i) are each independently -aryl or -heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl; or (ii) together with the carbon atoms to which they are attached, form a monocyclic or bicyclic ring system selected from the group consisting of cycloalkyl, heterocycloalkyl, aryl, and heteroaryl, wherein the ring system is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl;

and each $R^5$ is independently selected from -alkyl, -aryl, —$CH_2$-aryl, —$CH_2$-heteroaryl, -cycloalkyl, -heterocycloalkyl, and -heteroaryl, wherein the alkyl, aryl, $CH_2$-aryl, $CH_2$-heteroaryl, cycloalkyl, heterocycloalkyl, or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2$Ar, and wherein Ar is an aryl or heteroaryl;

(C) an arylchlorophosphine or analog thereof of Formula III:

III

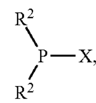

wherein:

X is selected from the group consisting of -halogen, —O-aryl, —O-heteroaryl, —O-cycloalkyl, —O-heterocycloalkyl, —O-alkyl, —O-perfluoroalkyl, and —O-perfluoroaryl; and each $R^2$ is independently an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2Ar$, and wherein Ar is an aryl or heteroaryl;

(D) a dinitrofluoroarene of Formula IV:

IV

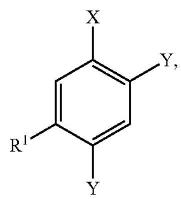

wherein:

each Y is independently selected from the group consisting of —$NO_2$, —CN, —C(O)$R_a$, and —$SO_2R_a$; wherein each $R_a$ is independently selected from the group consisting of —H, -alkyl, —O-alkyl, —N-alkyl, -alkenyl, -alkynyl, -perfluoroalkyl, -aryl, -perfluoroaryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl;

X is a leaving group selected from halogen, —$OR_b$, —OC(O)$R_b$, —OS(O)$_2R_b$, —S(O)$_2$—O—$R_b$, —$N_2^+$, —$N^+(R_b)_3$, —$S^+(R_b)$ 2, and —$P^+(R_b)_3$; wherein each $R_b$ is independently selected from the group consisting of -alkyl, —O-alkyl, —N-alkyl, -alkenyl, -alkynyl, -perfluoroalkyl, -perfluoroalkenyl, -perfluoroalkynyl, -aryl, -perfluoroaryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl; and $R^1$ is selected from the group consisting of —$NH_2$, —NHC(O)$CH_2Ar$, —NHC(O)Ar, -hydrogen, -alkyl, —O-alkyl, —N-alkyl, -alkenyl, -alkynyl, -aryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, —N-heterocycloalkyl, —CN, —C(O)$R_c$, —$CO_2R_c$, —$SO_2R_c$, —C(O)NH$R_c$, —S-alkyl, —S-aryl, and —S-heteroaryl; wherein each $R_c$ is independently —Ar, -alkyl, or —$CH_2Ar$; and wherein each Ar is independently an aryl, heteroaryl, cycloalkyl, heterocycloalkyl, perfluoroalkyl, or perfluoroaryl;

(E) an arylsulfonyl chloride of Formula V:

V

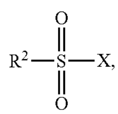

wherein:

X is selected from the group consisting of -halogen, —O-aryl, —O-heteroaryl, —O-cycloalkyl, —O-heterocycloalkyl, —O-alkyl, —O-perfluoroalkyl, —O-perfluoroaryl, —N-aryl, —N-heteroaryl, —N-cycloalkyl, —N-heterocycloalkyl, —N-alkyl, —N-perfluoroalkyl, —N-perfluoroaryl, —N(Ar)$SO_2Ar$, —NH$SO_2Ar$, and —NHAr; wherein Ar is an aryl or heteroaryl; and $R^2$ is an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2Ar$, and wherein Ar is an aryl or heteroaryl; and (F) a coumarin-derived Michael acceptor of Formula VI:

VI

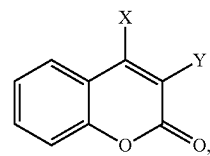

wherein:

Y is hydrogen or an electron withdrawing group selected from the group consisting of —$CF_3$, —C(O)$R_a$, —$SO_2R_a$, —CN, and —$NO_2$; wherein each $R_a$ is independently selected from the group consisting of —H, -alkyl, —O-alkyl, —N-alkyl, -alkenyl, -alkynyl, -aryl, —O-aryl, —N-aryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl; and X is a leaving group selected from halogen, —$OR_b$, —OC(O)$R_b$, —OS(O)$_2R_b$, —S(O)$_2$—O—$R_b$, —$N_2^+$, —$N^+(R_b)_3$, —$S^+(R_b)_2$, and —$P^+(R_b)_3$; wherein each $R_b$ is independently selected from the group consisting of -alkyl, —O-alkyl, —N-alkyl, -alkenyl, -alkynyl, -perfluoroalkyl, -perfluoroalkenyl, -perfluoroalkynyl, -aryl, -perfluoroaryl, —O-aryl, —N-aryl, —O-perfluoroaryl, —N-perfluoroaryl, -heteroaryl, —O-heteroaryl, —N-heteroaryl, -cycloalkyl, —O-cycloalkyl, —N-cycloalkyl, -heterocycloalkyl, —O-heterocycloalkyl, and —N-heterocycloalkyl.

3. The analytical method of claim 1, wherein the analyte is selected from the group consisting of primary amines, secondary amines, amino alcohols, alcohols, diols, carboxylic acids, hydroxy acids, amino acids, thiols, amides, and combinations thereof.

4. The analytical method of claim 1, wherein the indicator has the formula A-B, wherein A is a nucleophile and B is a non-chiroptical signaling moiety.

5. The analytical method of claim 4, wherein:

A is a nucleophile selected from the group consisting of —OH, —$NH_2$, and —$NHR^1$;

wherein $R^1$ is H, $C_{1-6}$-alkyl, cycloalkyl, —$(CH_2)_n$Ar, or —$CHAr_2$;

wherein:

Ar is an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2Ar$, and wherein Ar is an aryl or heteroaryl; and n is an integer from 1-4; and B is a non-chiroptical signaling moiety selected from the group consisting of —$(CH_2)_n$Ar' and —CHAr'$_2$; wherein:

Ar' is an aryl or heteroaryl, wherein the aryl or heteroaryl is optionally substituted with one or more groups selected from -alkyl, —O-alkyl, —N-alkyl, -alkenyl, -alkynyl, —O-aryl, —O-heteroaryl, —N-aryl, —N-heteroaryl, -aryl, -heteroaryl, —C(O)$R_c$, —$CO_2R_c$, —O—C(O)$R_c$, —NHC(O)$R_c$, —NRCC(O)$R_c$, —$NO_2$, —CN, -halogen, and —$SO_2R_c$; wherein each $R_c$ is independently Ar, alkyl, or $CH_2Ar$, and wherein Ar is an aryl or heteroaryl; and n is an integer from 0-4.

6. The analytical method of claim 4, wherein the non-chiroptical signaling moiety is a UV/Vis chromophore.

7. The analytical method of claim 4, wherein the non-chiroptical signaling moiety is a fluorophore.

8. The analytical method of claim 1, wherein said contacting the sample with an excess of the probe and said contacting the sample with the indicator are carried out simultaneously.

9. The analytical method of claim 1, wherein said contacting the sample with an excess of the probe occurs before said contacting the sample with the indicator.

10. The analytical method of claim 1, wherein said contacting the sample with the indicator occurs before said contacting the sample with an excess of the probe.

11. The analytical method of claim 1, wherein said contacting is carried out in a solvent selected from aqueous solvents, protic solvents, aprotic solvents, and any combination thereof.

12. The analytical method of claim 1, wherein said contacting is carried out in a solvent selected from chloroform, dichloromethane, acetonitrile, toluene, tetrahydrofuran, methanol, ethanol, isopropanol, water, dimethyl sulfoxide (DMSO), dimethylformamide (DMF), hexane, hexane isomers, ether, dichloroethane, acetone, ethyl acetate, butanone, and mixtures of any combination thereof.

13. The analytical method of claim 1, wherein said contacting is carried out in an aqueous environment.

14. The analytical method of claim 1, wherein said contacting is carried out for 1 to 300 minutes.

15. The analytical method of claim 1, wherein said contacting is carried out under ambient conditions.

16. The analytical method of claim 1, wherein said contacting is carried out at 50° C. to 100° C.

17. The analytical method of claim 1, wherein said contacting is carried out at below 25° C.

18. The analytical method of claim 1, wherein the enantiomeric composition of the analyte in the sample is determined.

* * * * *